(12) United States Patent
Bachman

(10) Patent No.: US 11,059,395 B2
(45) Date of Patent: Jul. 13, 2021

(54) POSITION CHANGING SYSTEM

(71) Applicant: Eugene Edward Bachman, Columbus, MI (US)

(72) Inventor: Eugene Edward Bachman, Columbus, MI (US)

( * ) Notice: Subject to any disclaimer, the term of this patent is extended or adjusted under 35 U.S.C. 154(b) by 146 days.

(21) Appl. No.: 16/452,515

(22) Filed: Jun. 25, 2019

(65) Prior Publication Data

US 2019/0315250 A1    Oct. 17, 2019

Related U.S. Application Data

(63) Continuation-in-part of application No. 13/901,568, filed on May 24, 2013, now Pat. No. 10,328,822.

(60) Provisional application No. 61/650,956, filed on May 23, 2012.

(51) Int. Cl.
*B60N 2/18* (2006.01)

(52) U.S. Cl.
CPC ................. *B60N 2/1825* (2013.01)

(58) Field of Classification Search
CPC .. B60N 2/1825; B60N 2/1615; B60N 2/1625; B60N 2/1821; B60N 2/24
See application file for complete search history.

(56) References Cited

U.S. PATENT DOCUMENTS 10,328,822 B2 * 6/2019 Bachman ............. B60N 2/1625

* cited by examiner

*Primary Examiner* — D Glenn Dayoan
*Assistant Examiner* — Melissa Ann Bonifazi
(74) *Attorney, Agent, or Firm* — Cargill & Associates, PLLC; Lynn E. Cargill

(57) ABSTRACT

A position control system is disclosed that replaces a parallelogram or quadrilateral movement system with greater efficiency, economy, stability and utility by eliminating one of the four links and providing a non-linear path to be followed. This system includes a dynamic triangular mechanism for movement from a first position to at least a second position, with at least three (3) link members interconnected by pivots with a first base link member defining a non-linear path, said first base link member having a fixed base pivot and a follower pivot that moves along the non-linear path, a second fixed length support link member pivotally connected to the fixed base pivot, and a third follower link member pivotally connected to, and located between, the follower pivot and a connector pivot, wherein the follower link member is adapted for following the non-linear path, thereby creating a virtual triangle defined by the three link members while the follower pivot, fixed base pivot and the connector pivot interconnect the first base link member, the second fixed length support link member and the third follower link member.

16 Claims, 71 Drawing Sheets

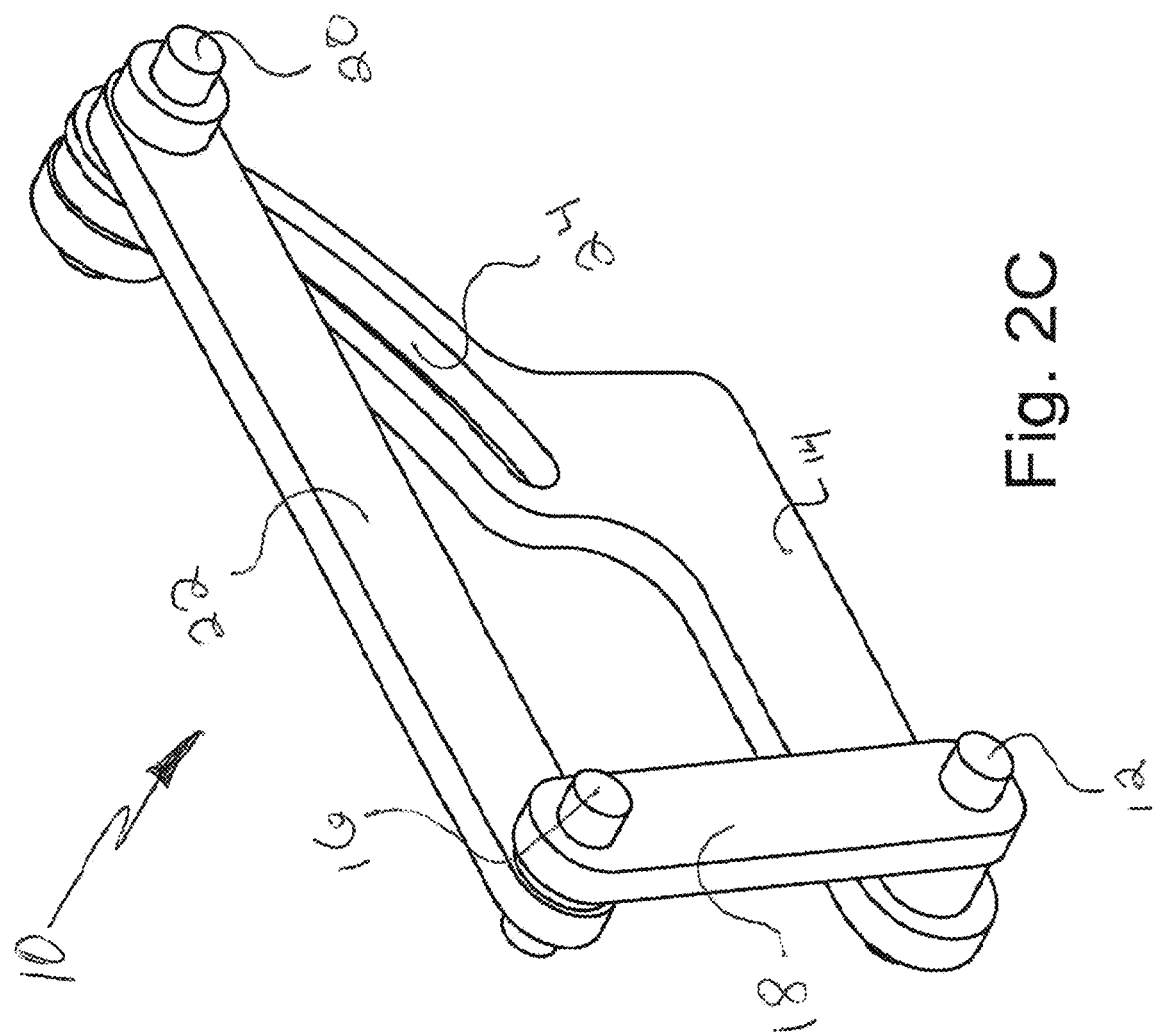

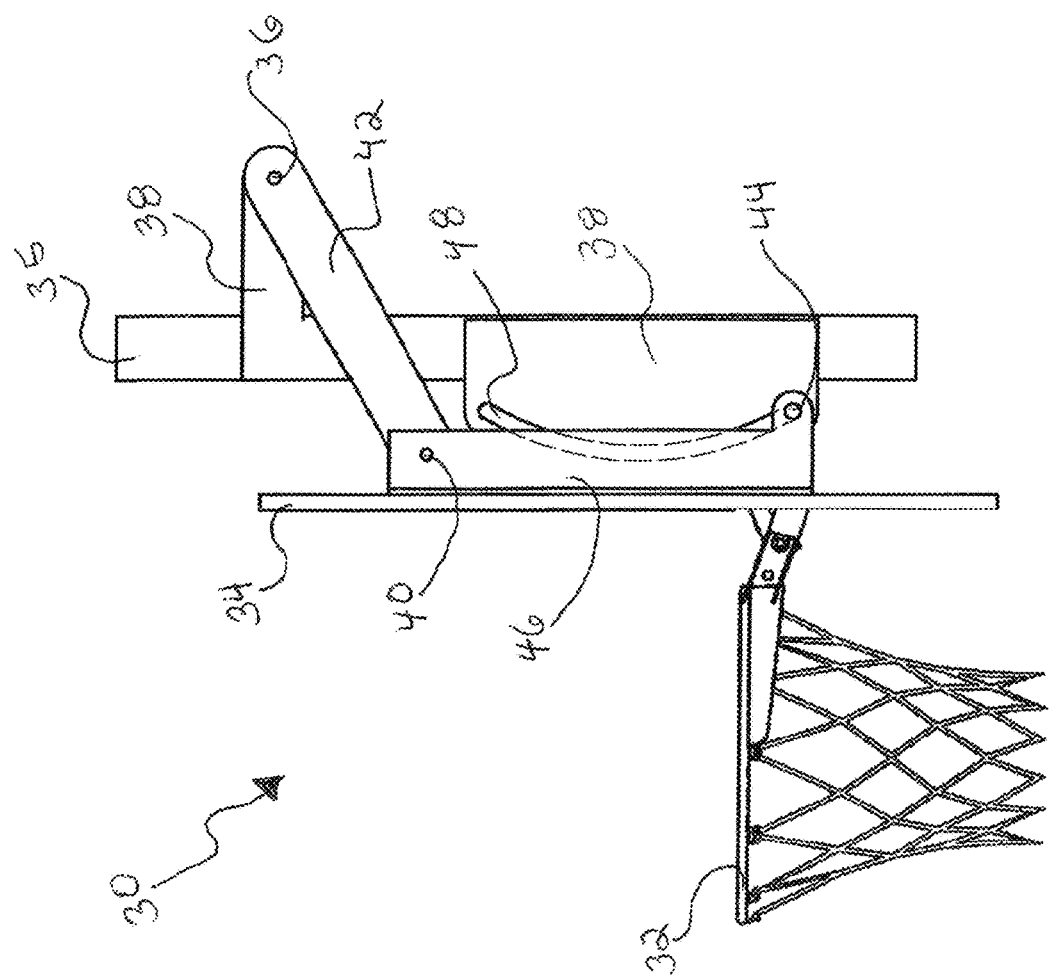

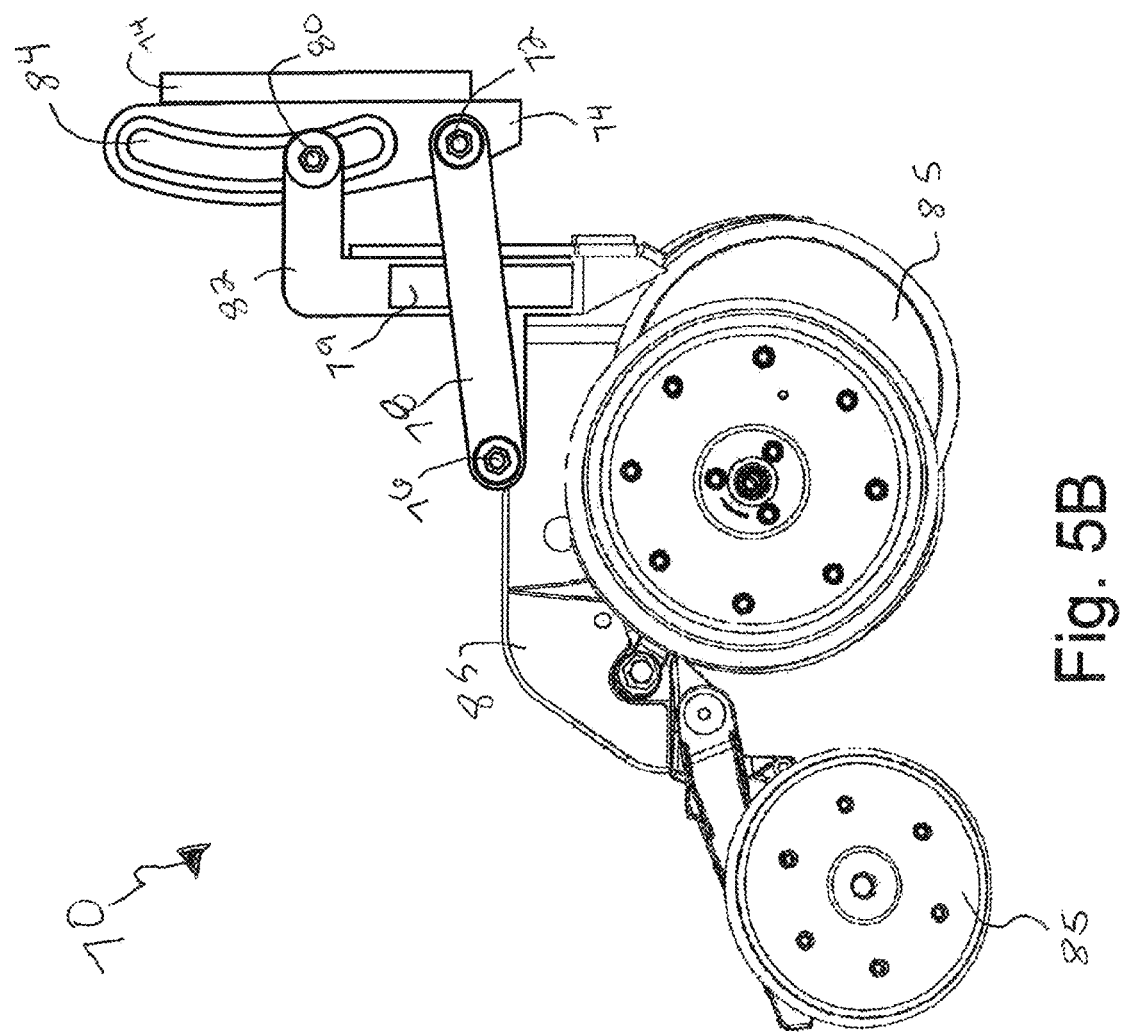

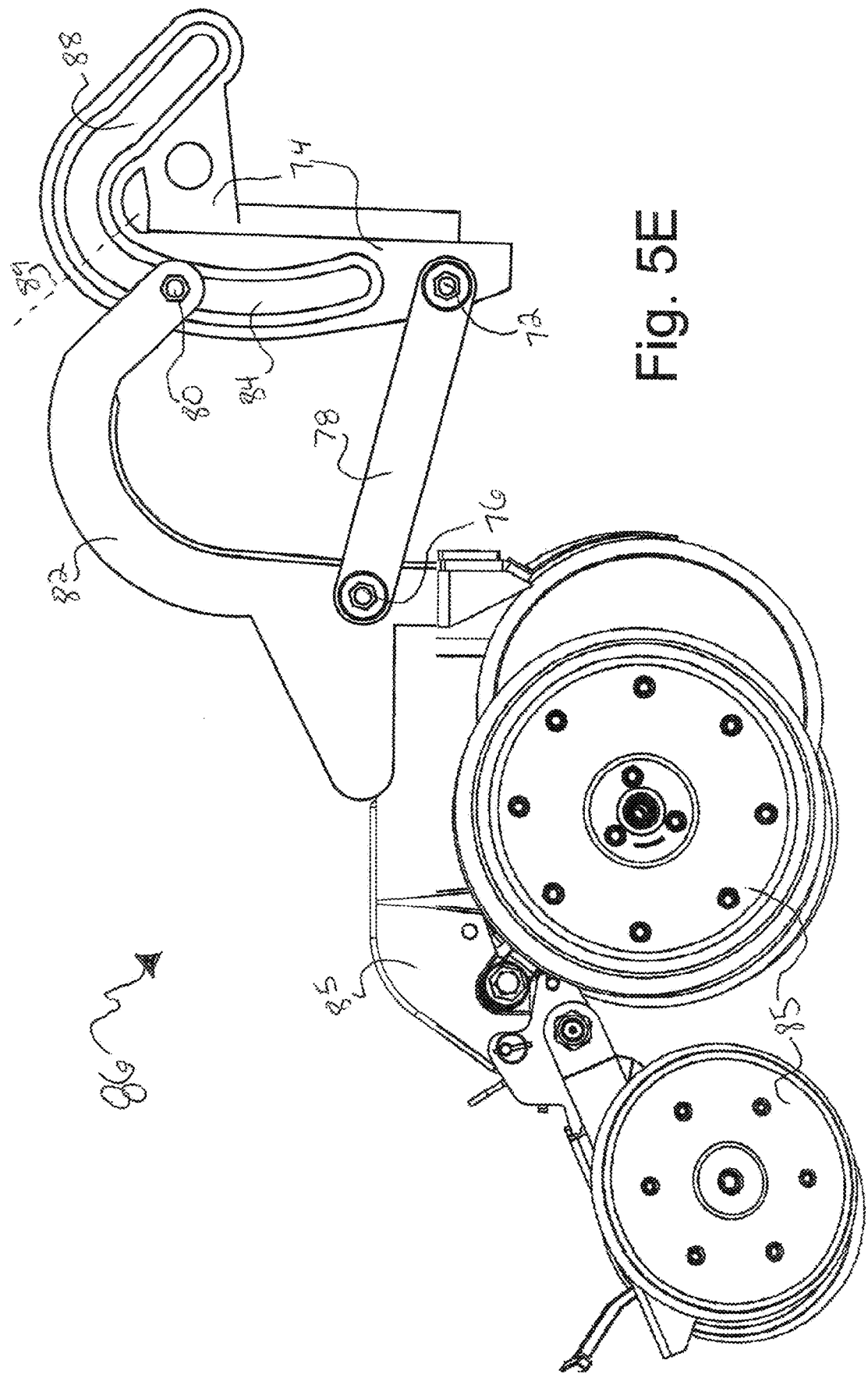

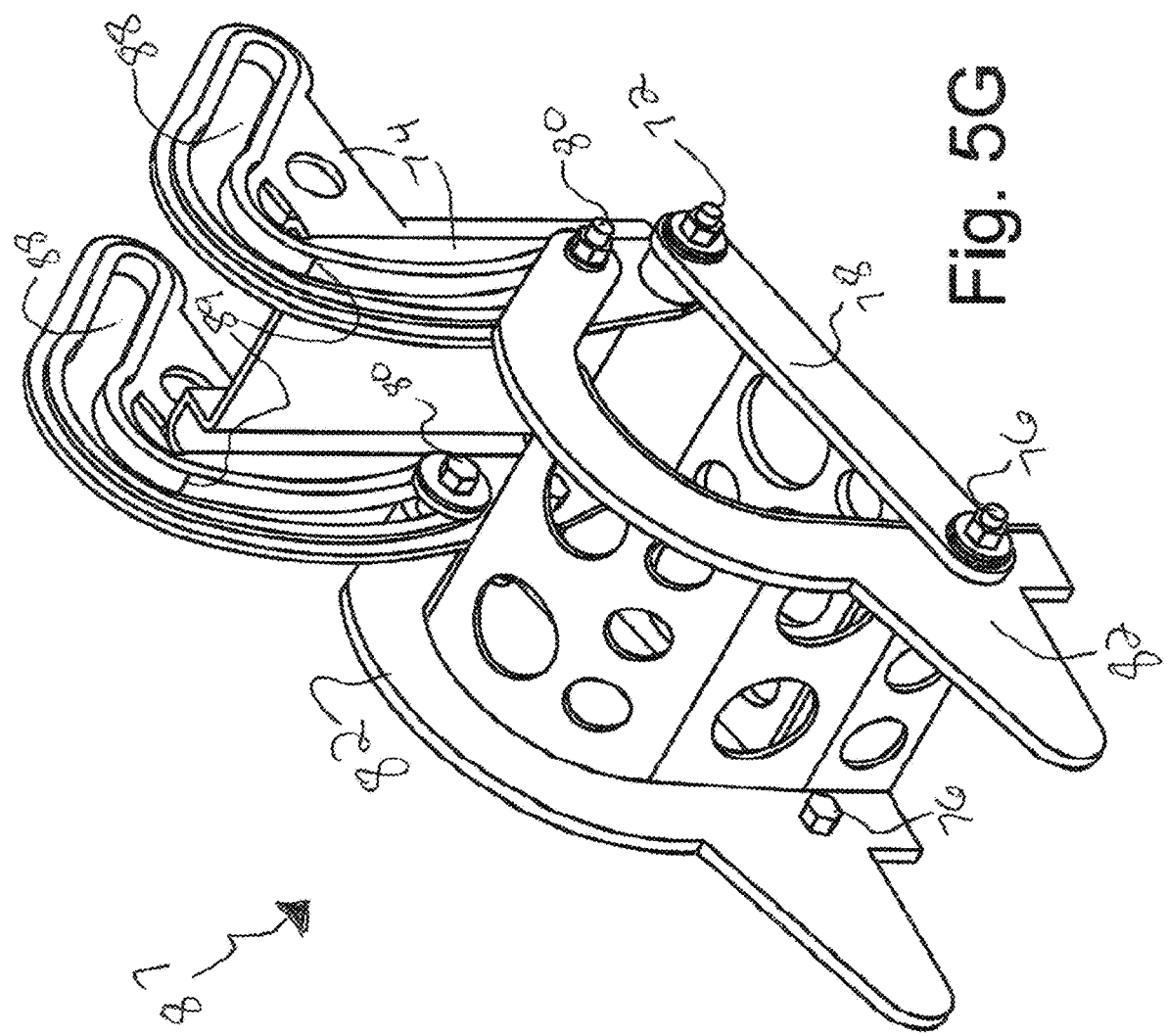

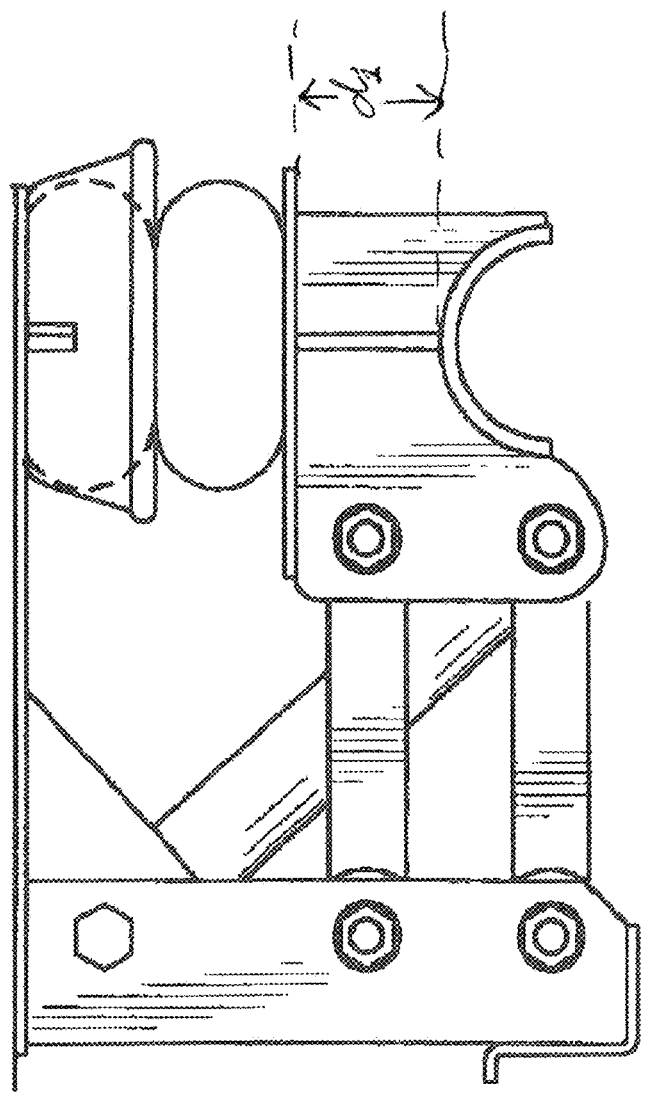

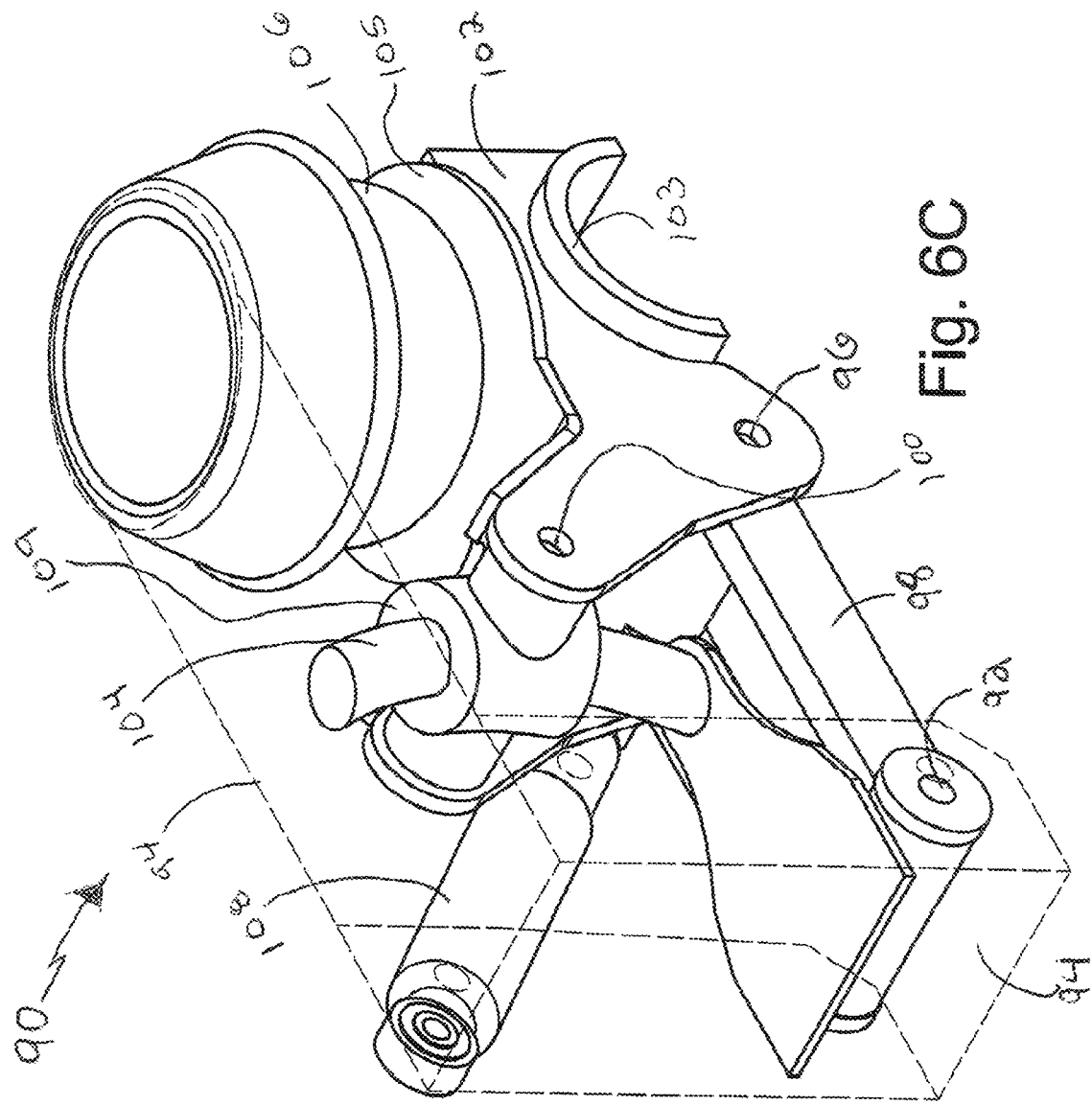

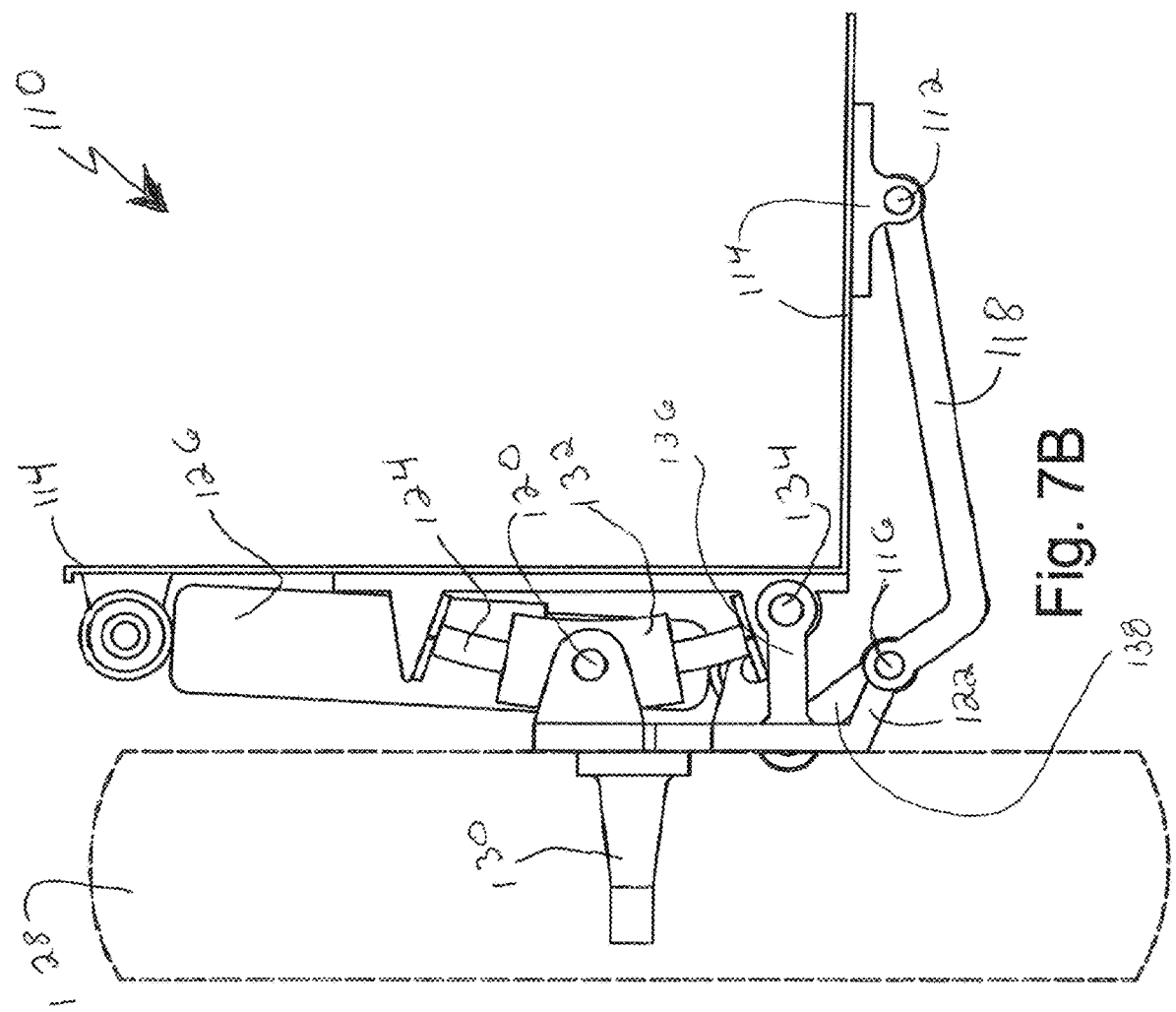

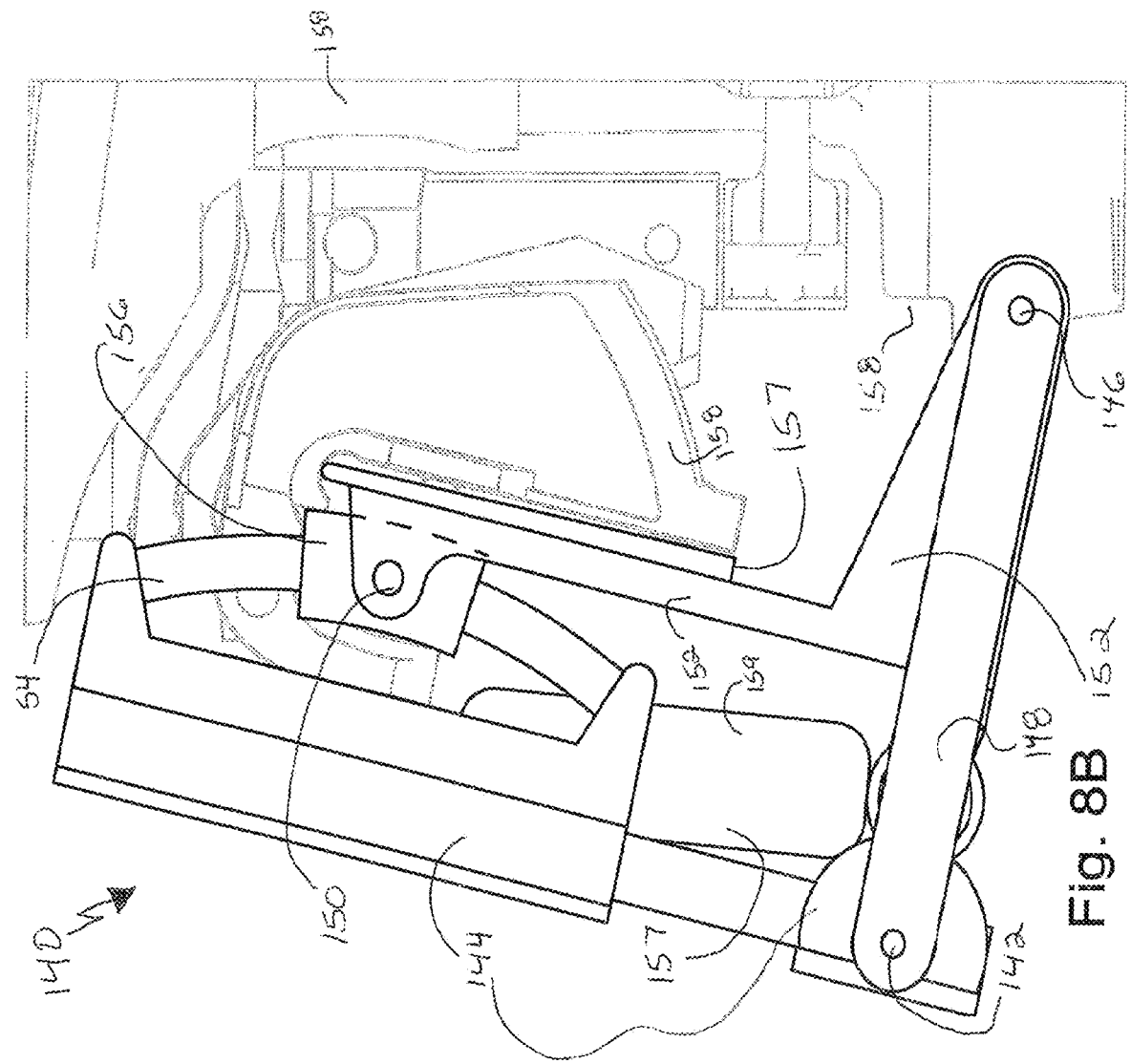

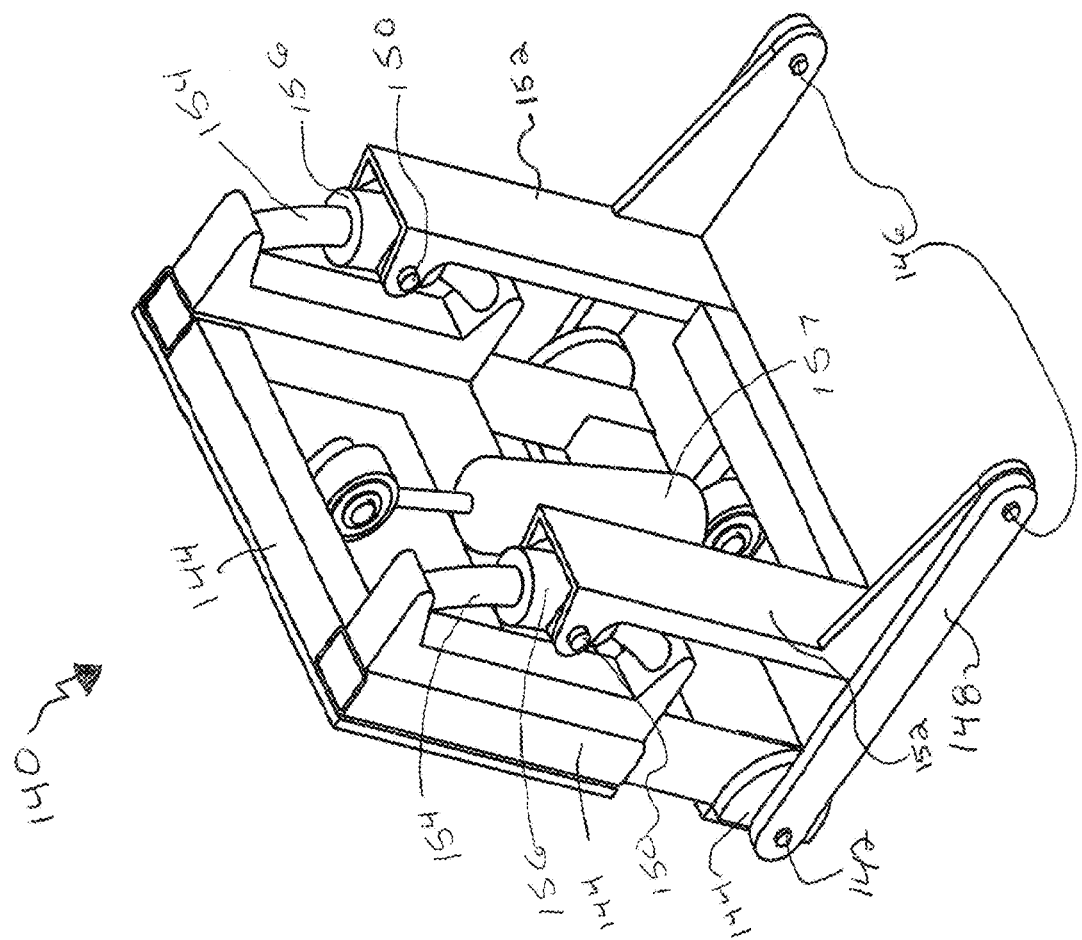

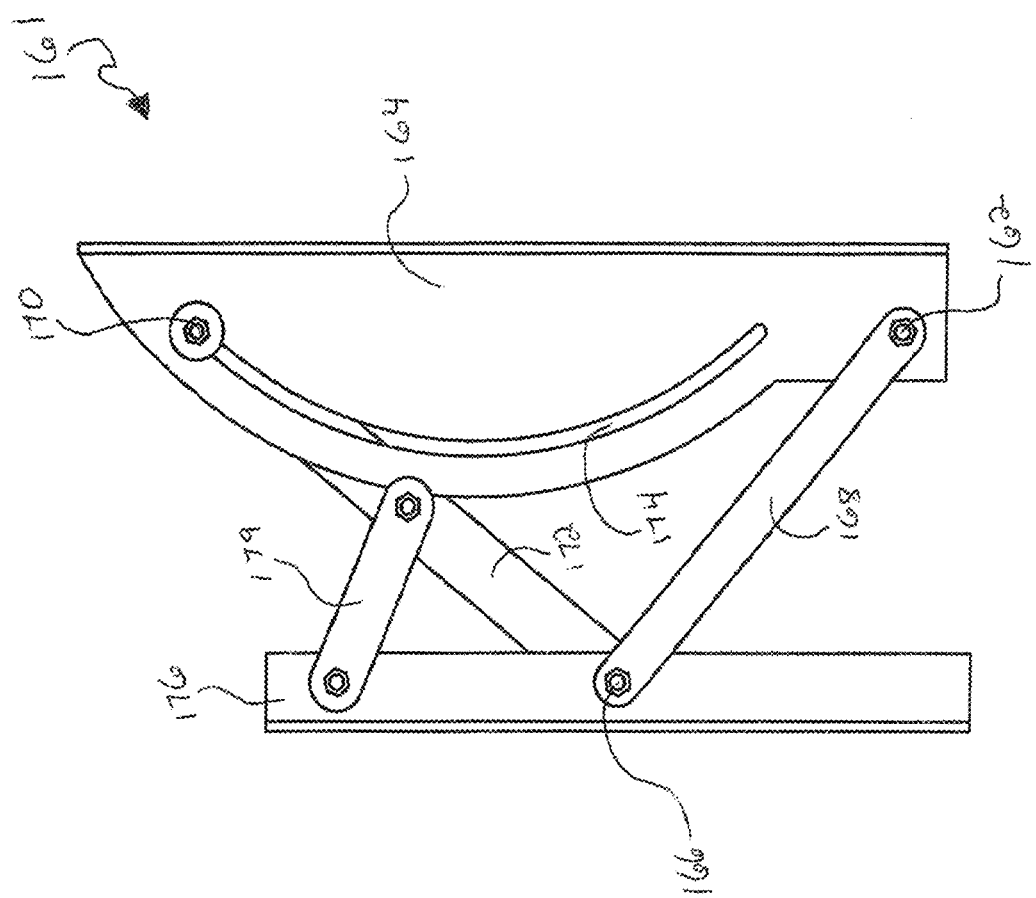

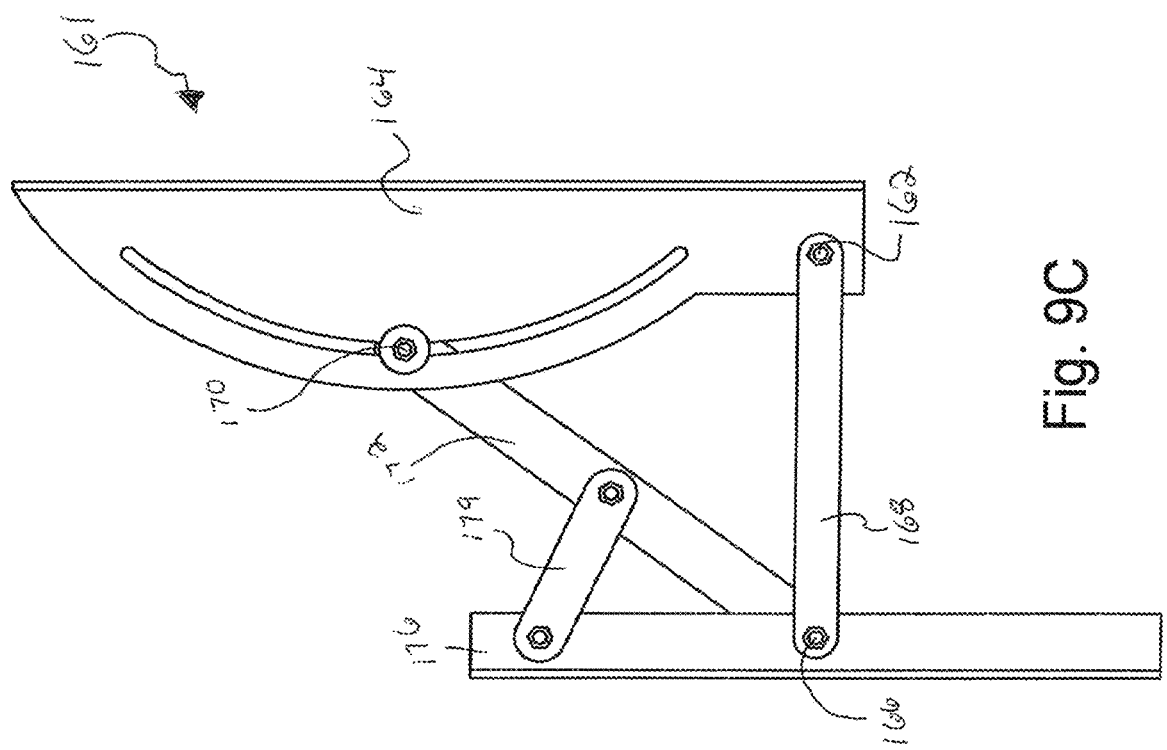

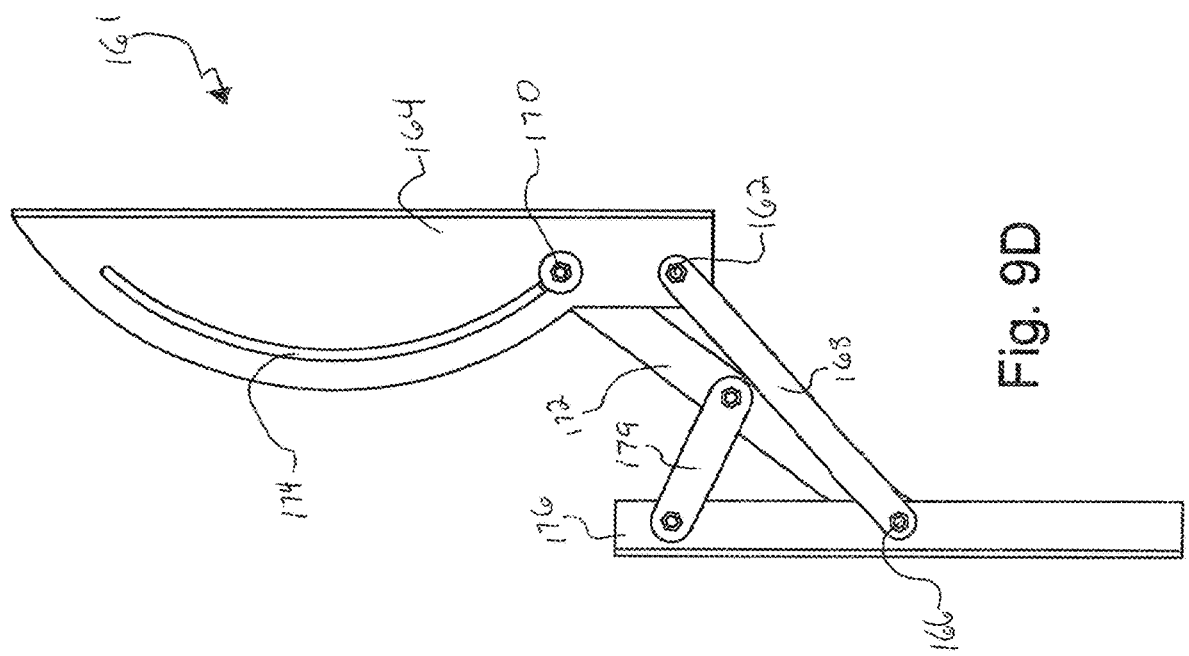

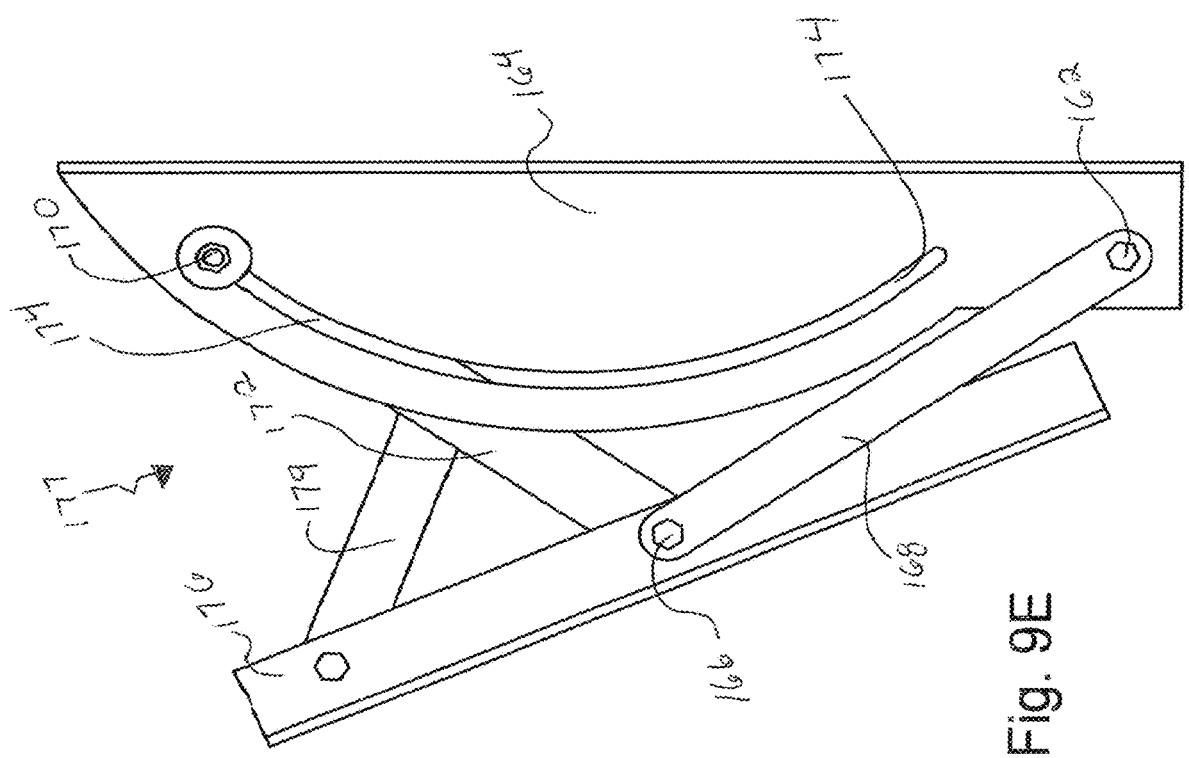

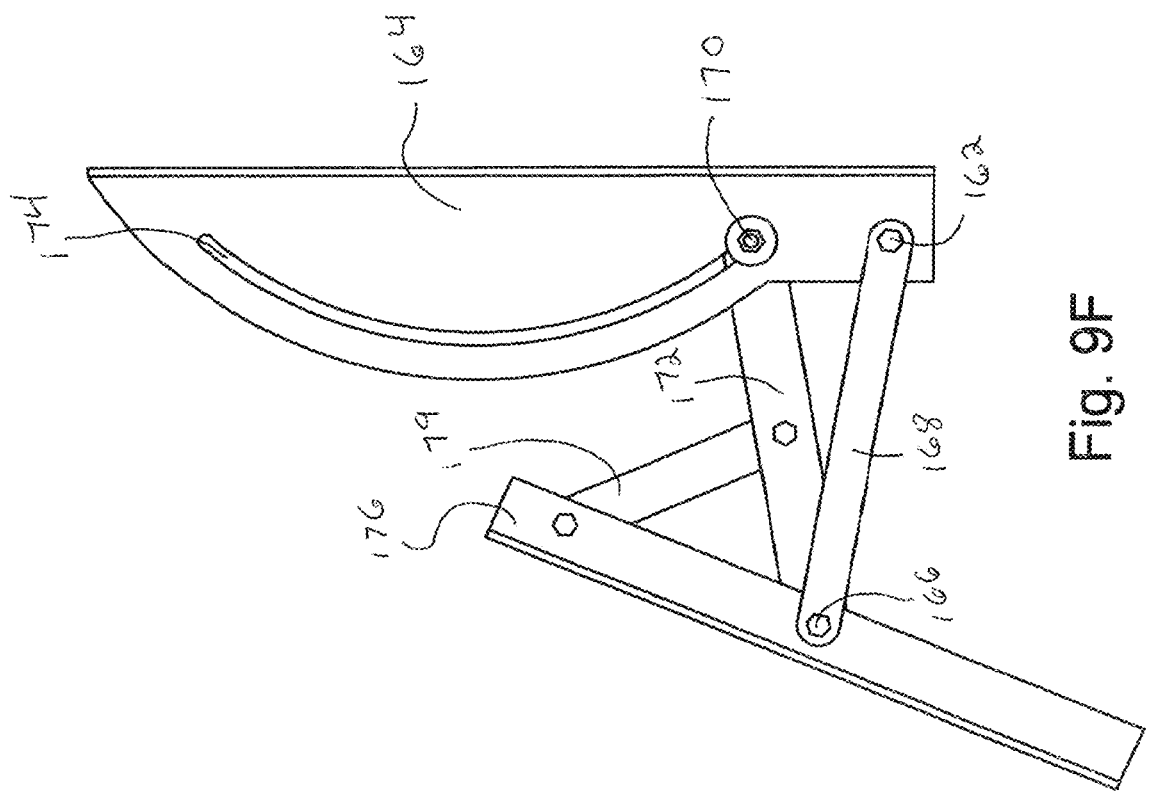

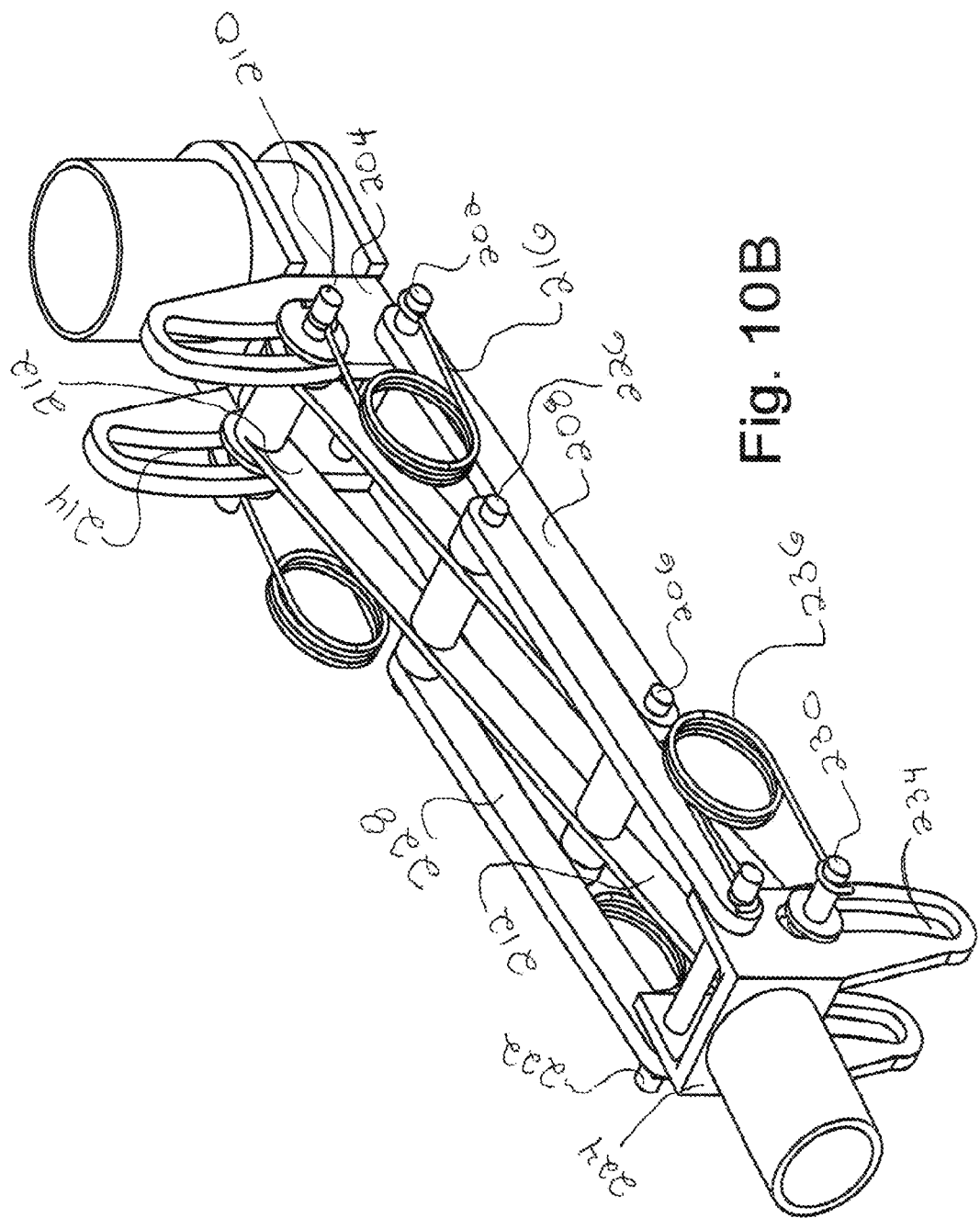

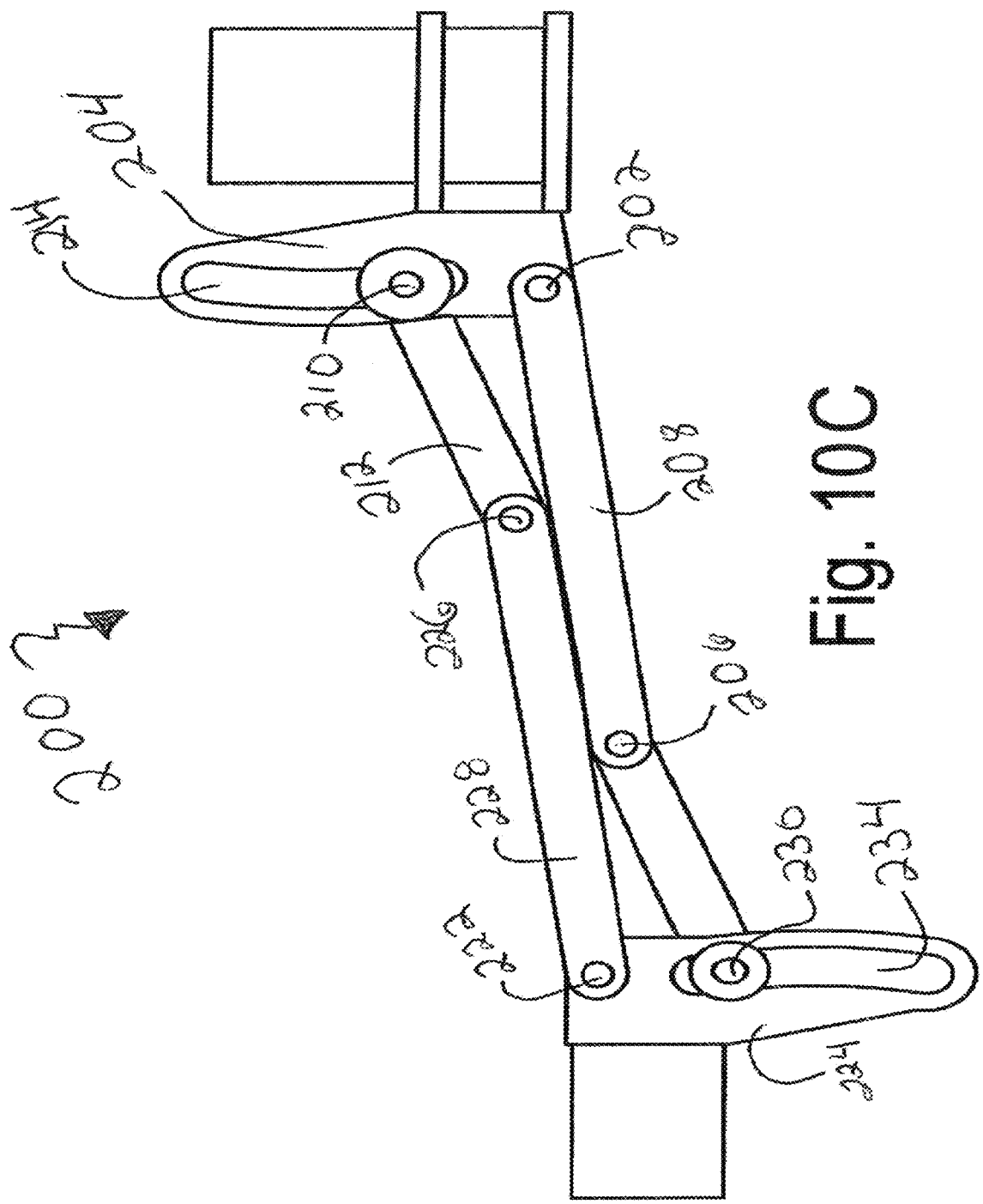

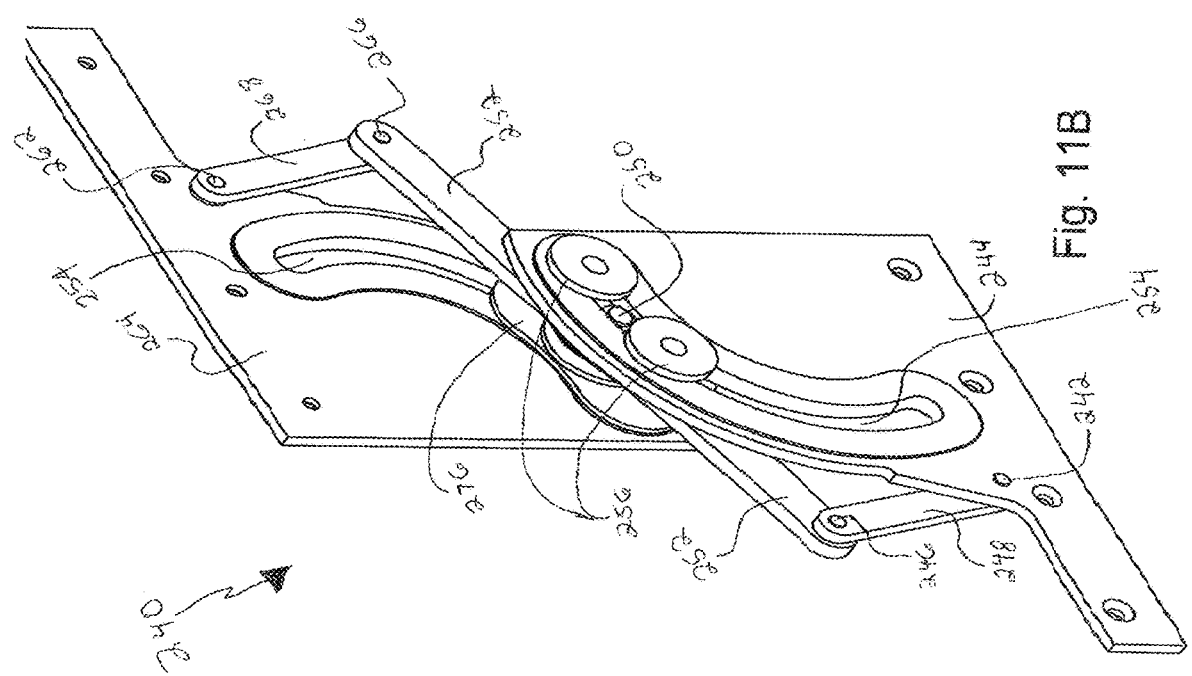

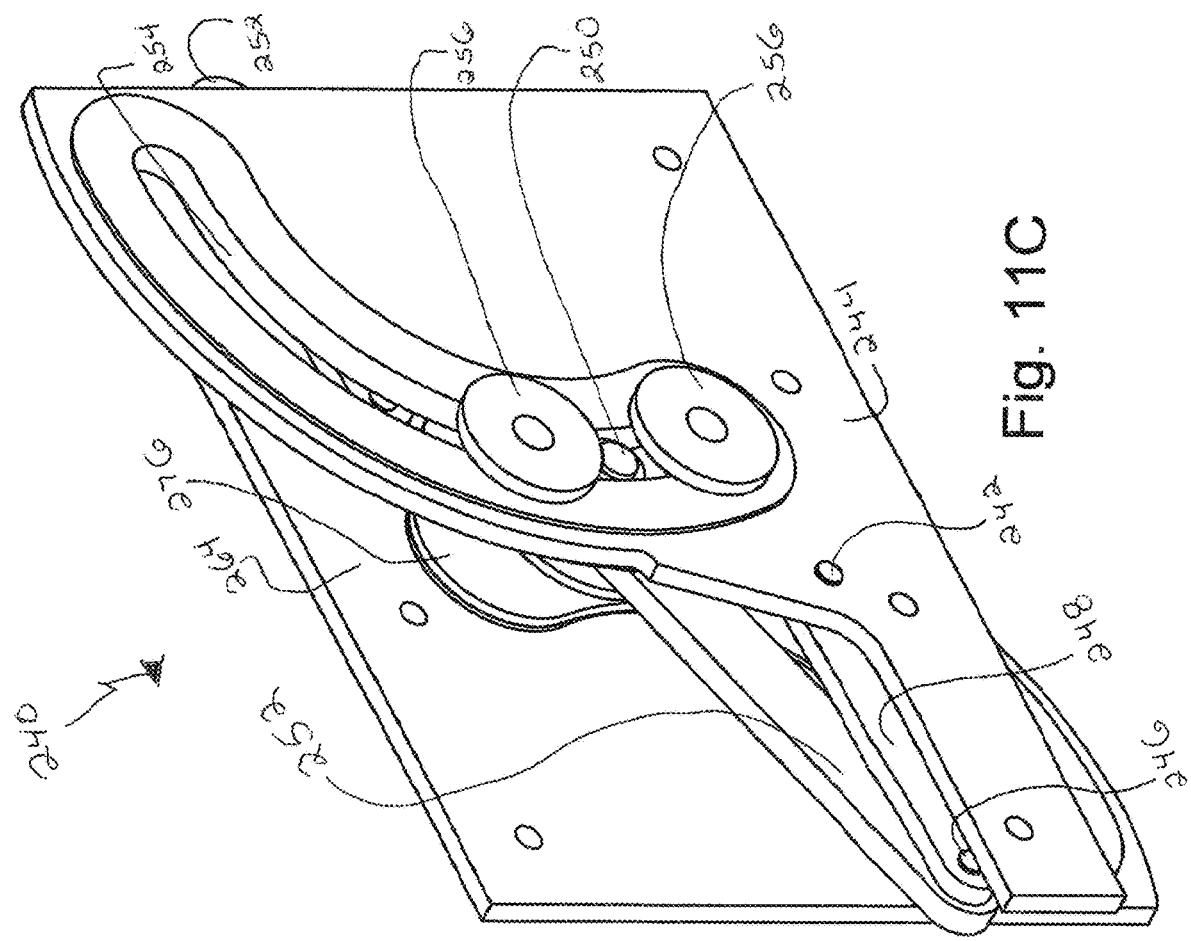

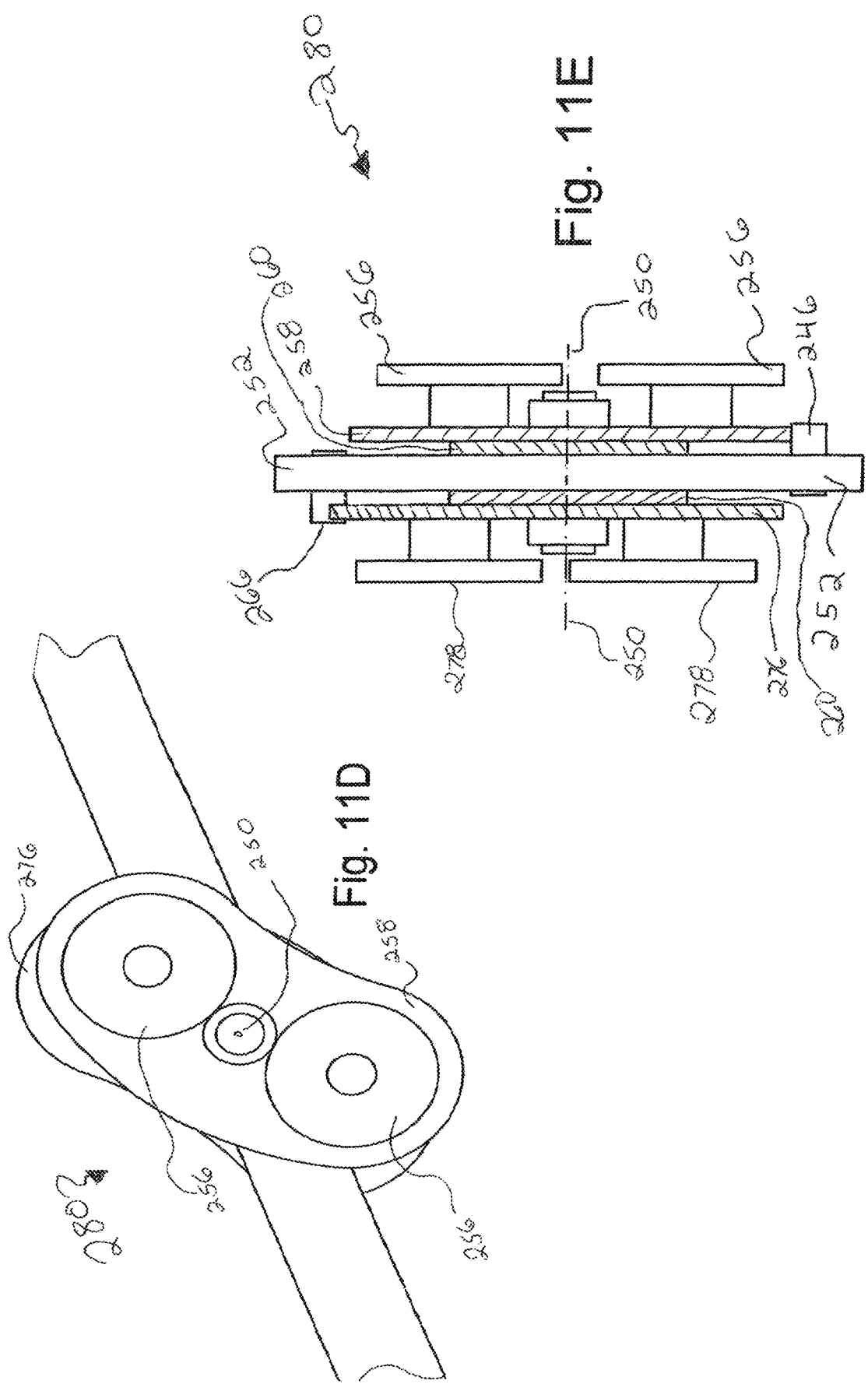

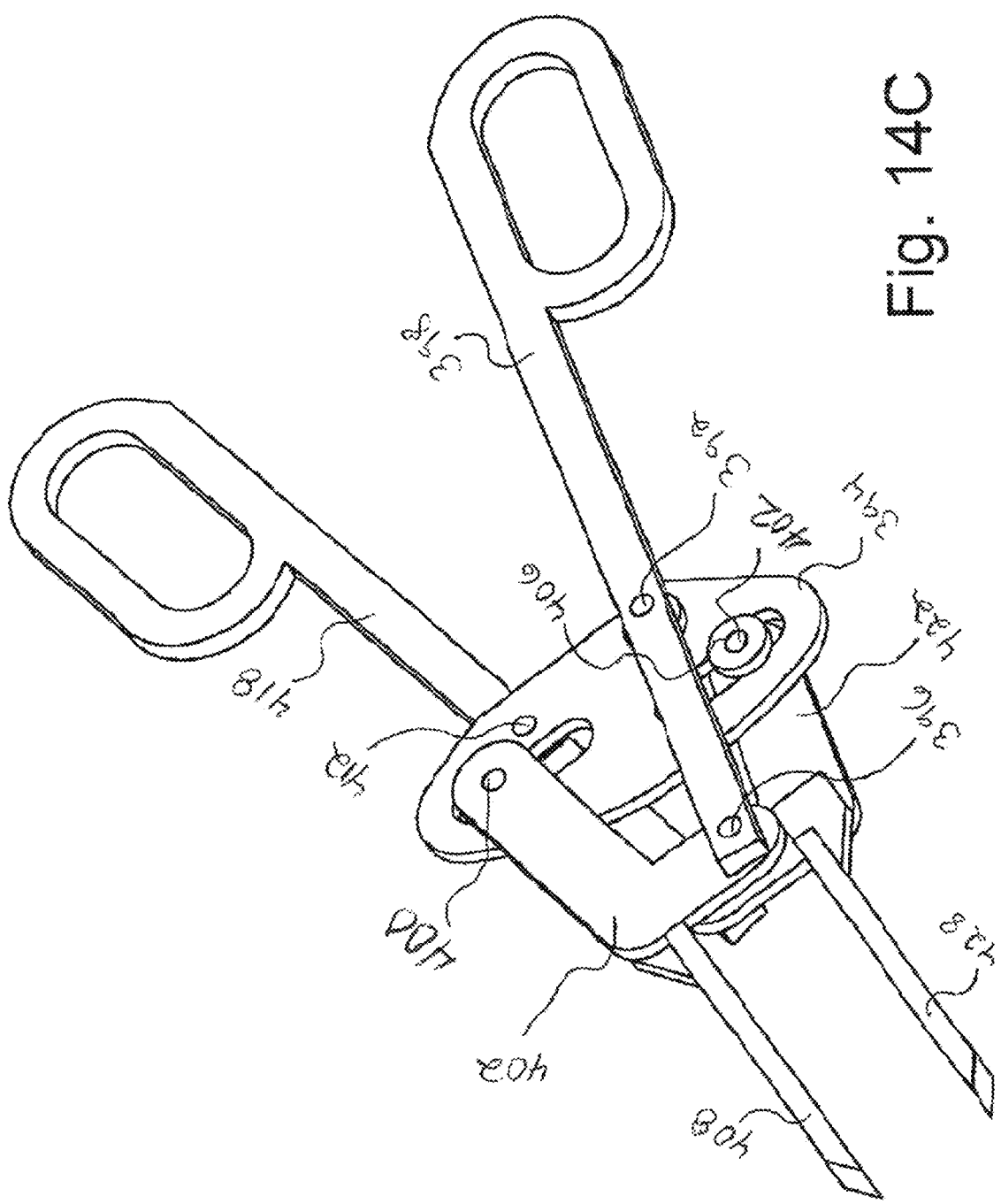

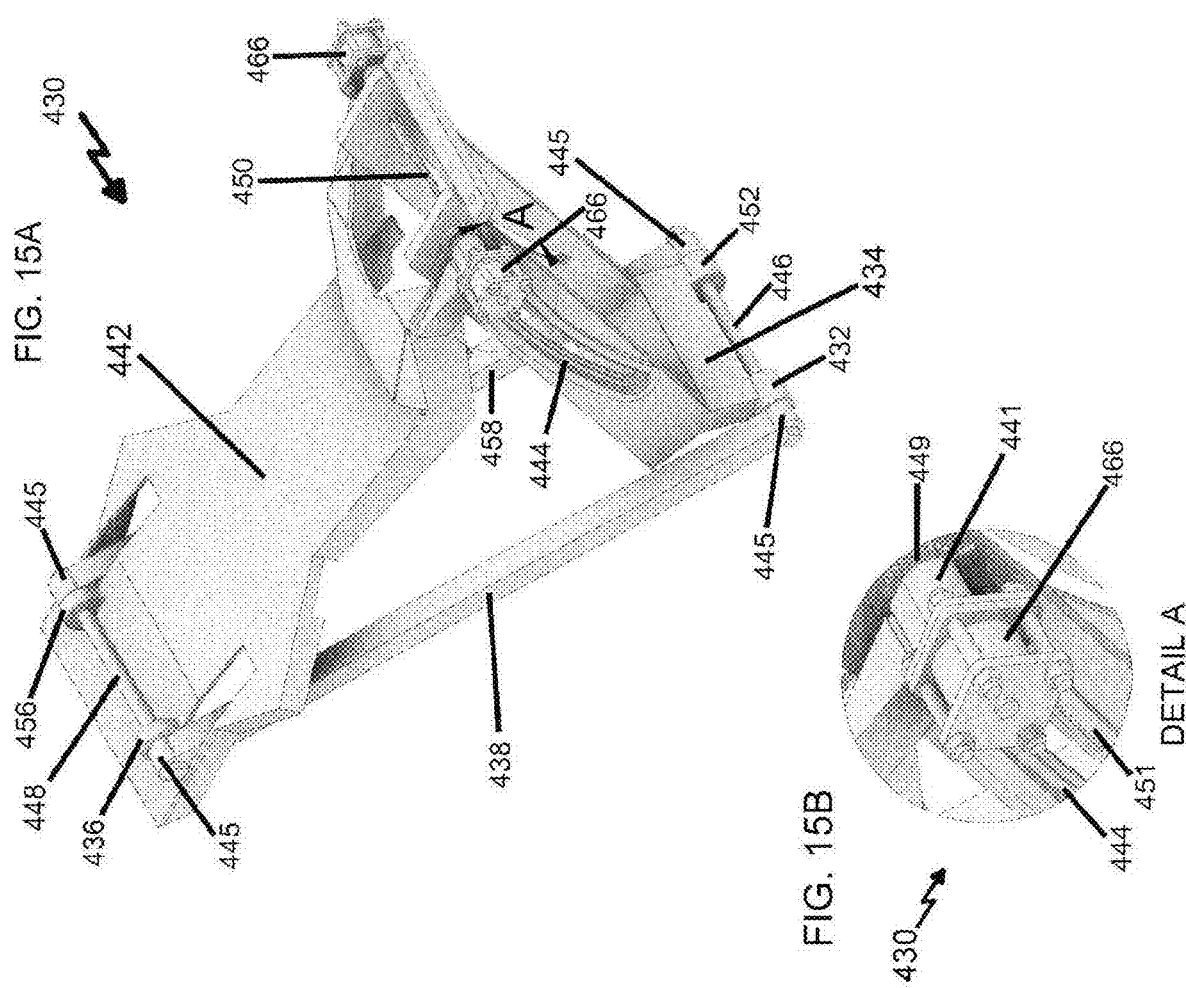

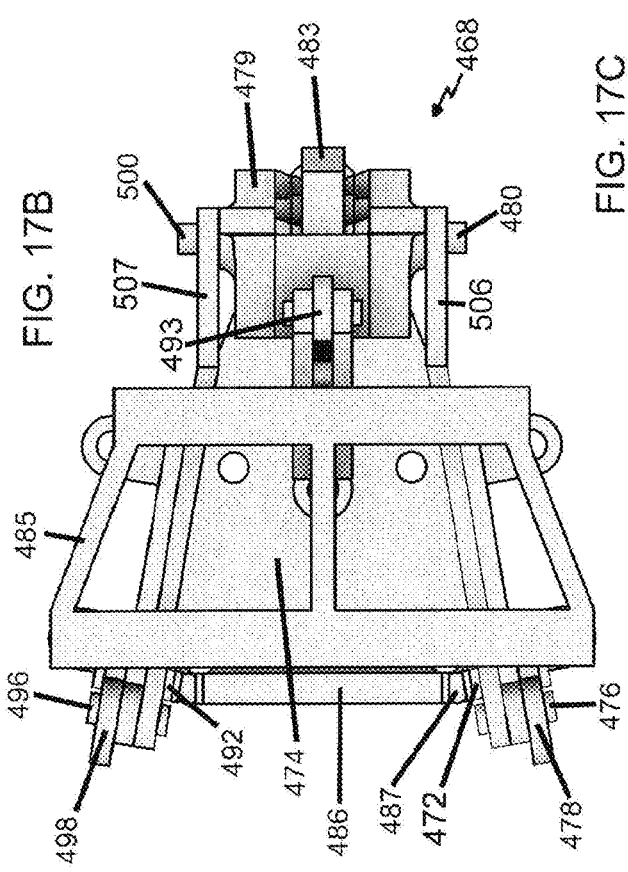
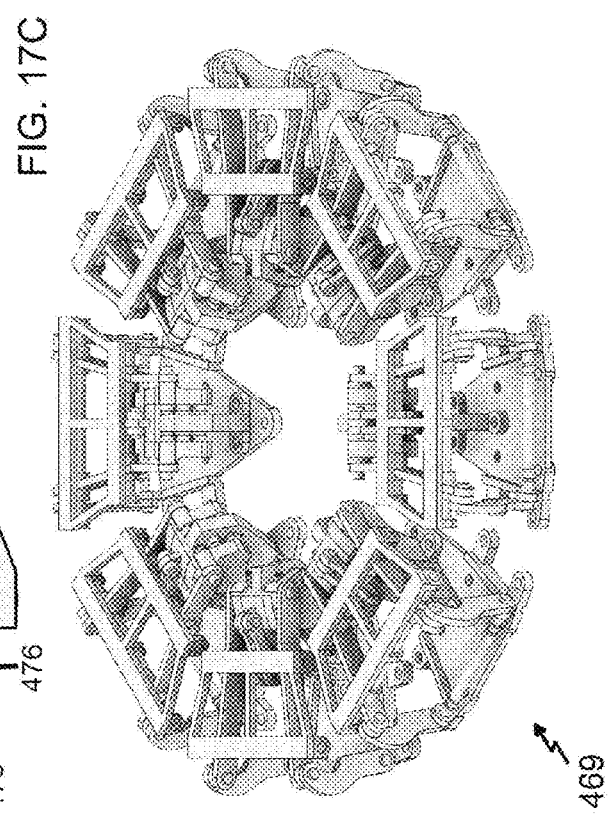

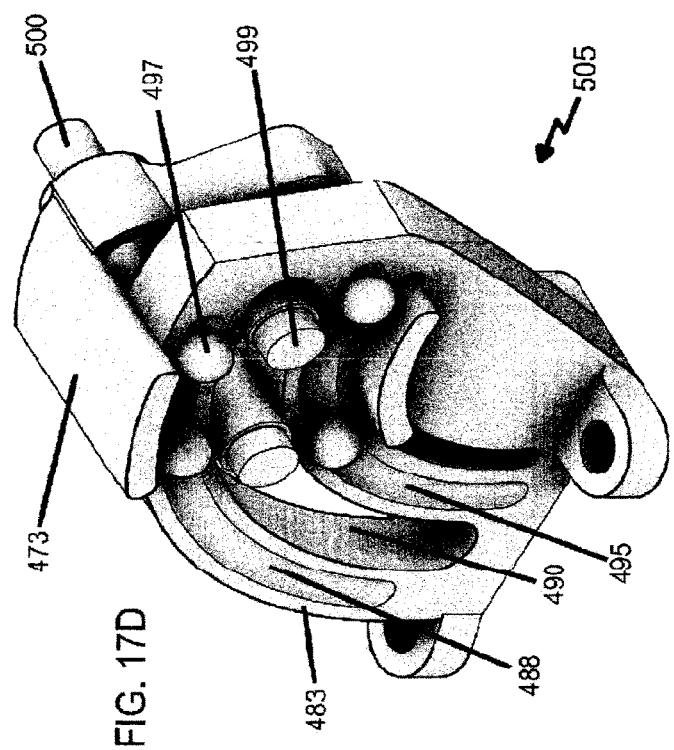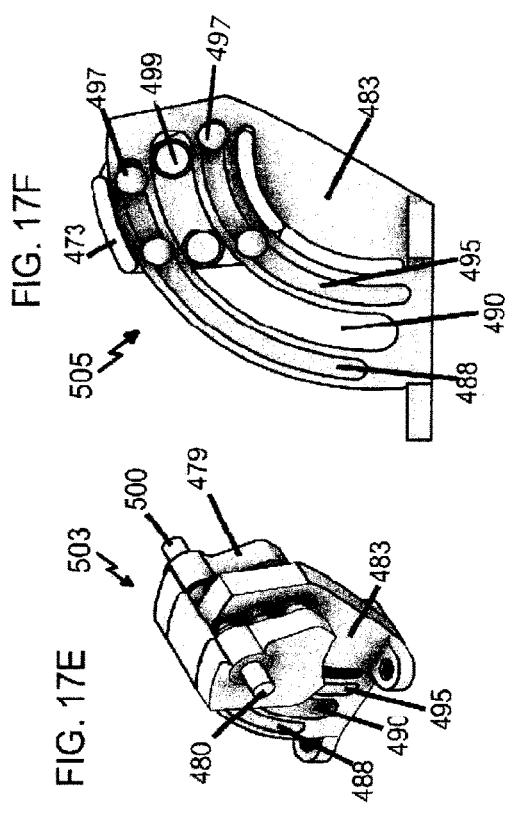

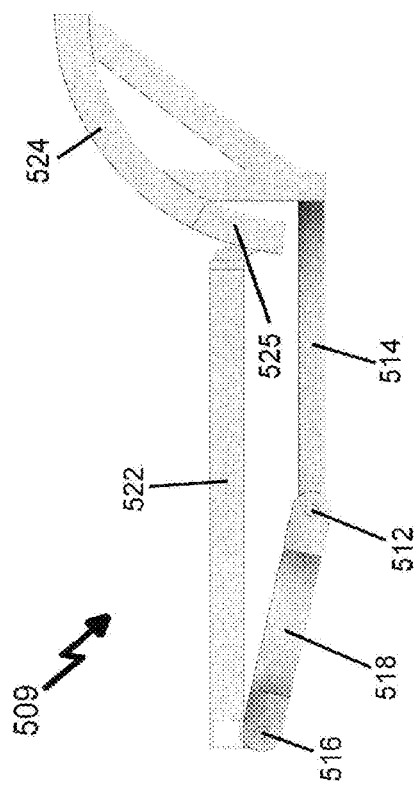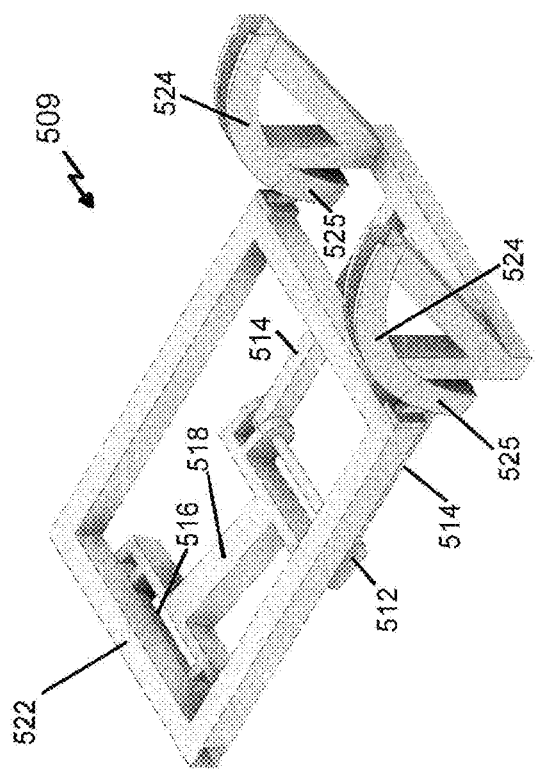

DETAIL R

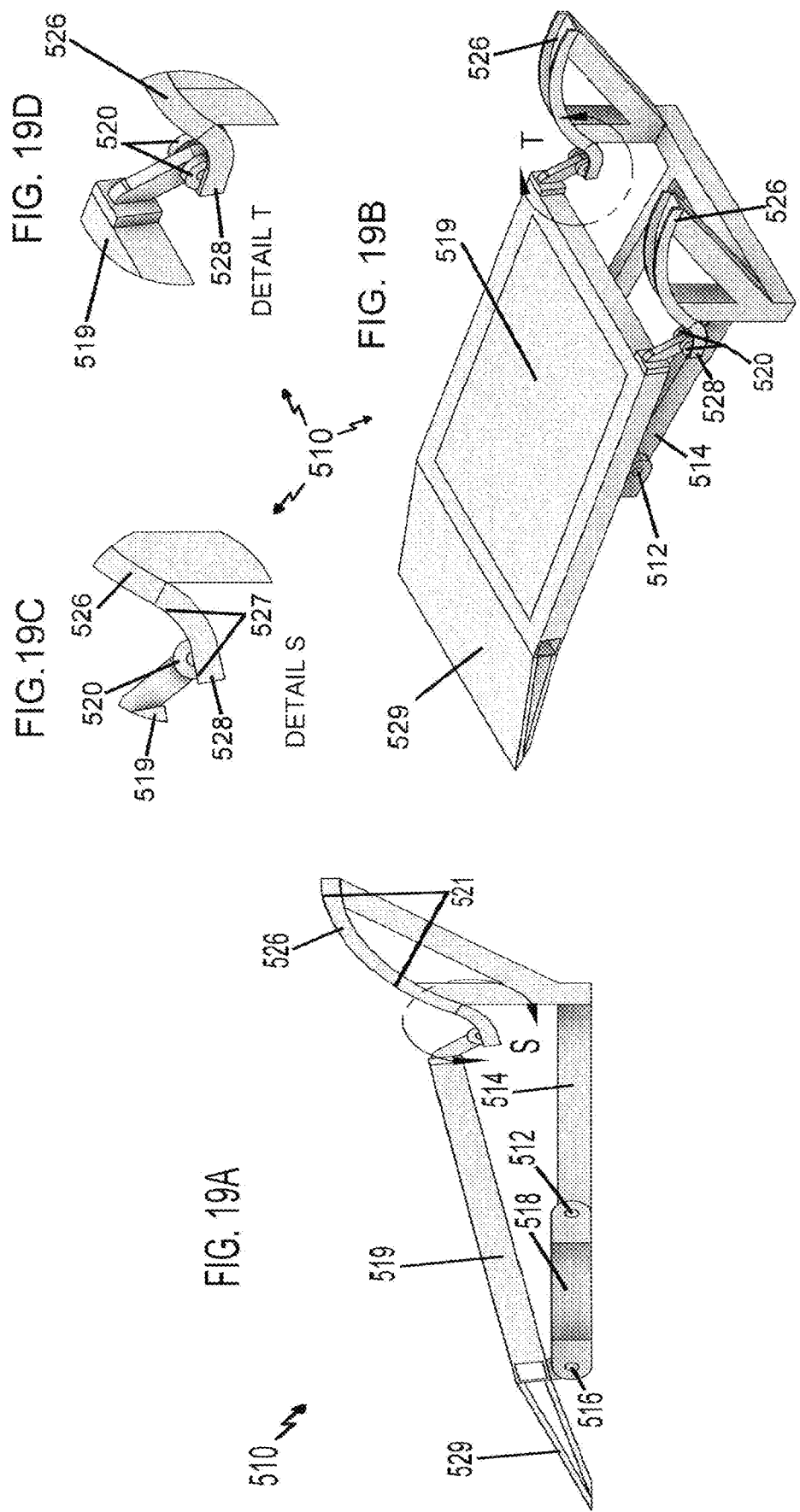

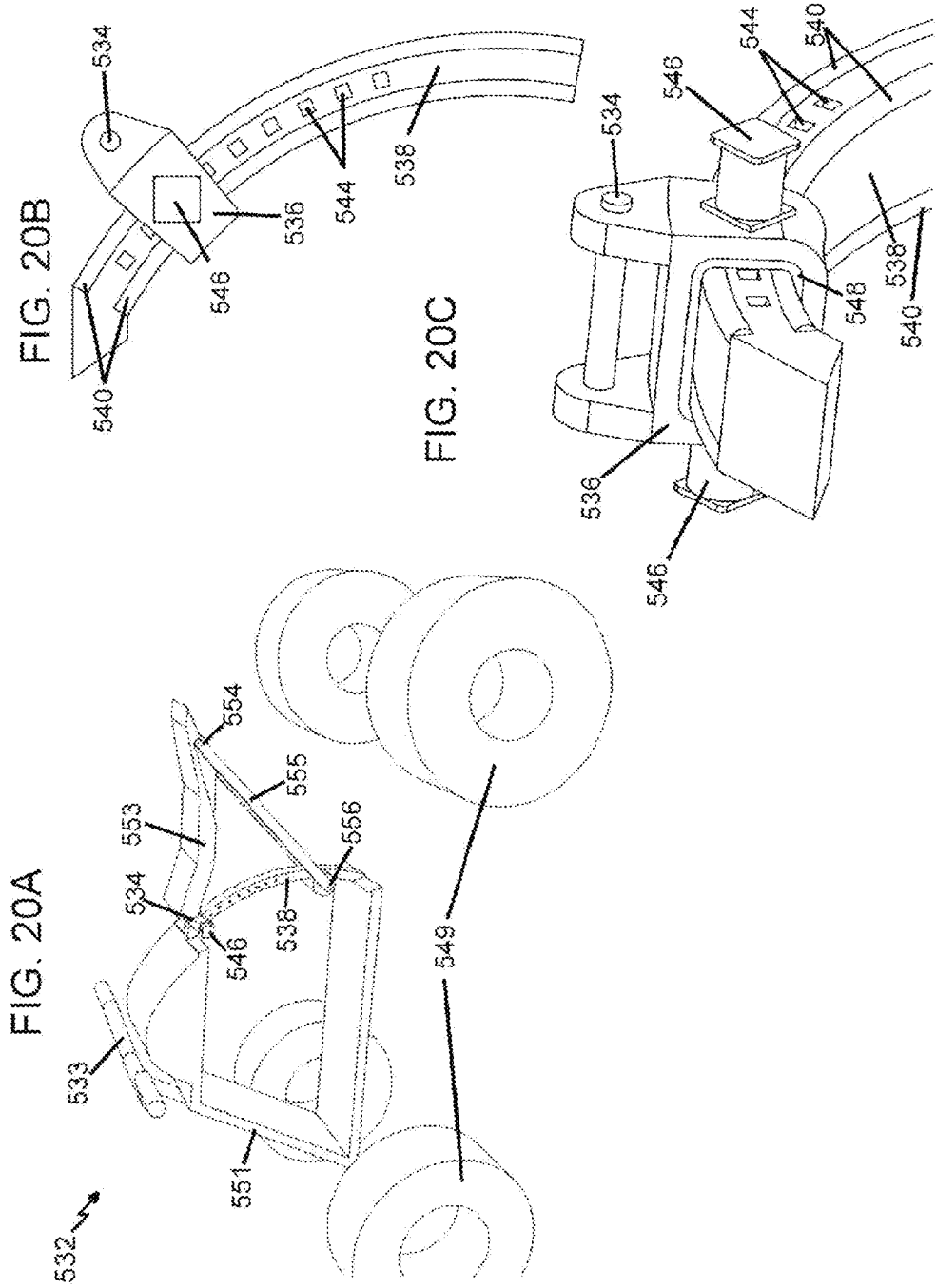

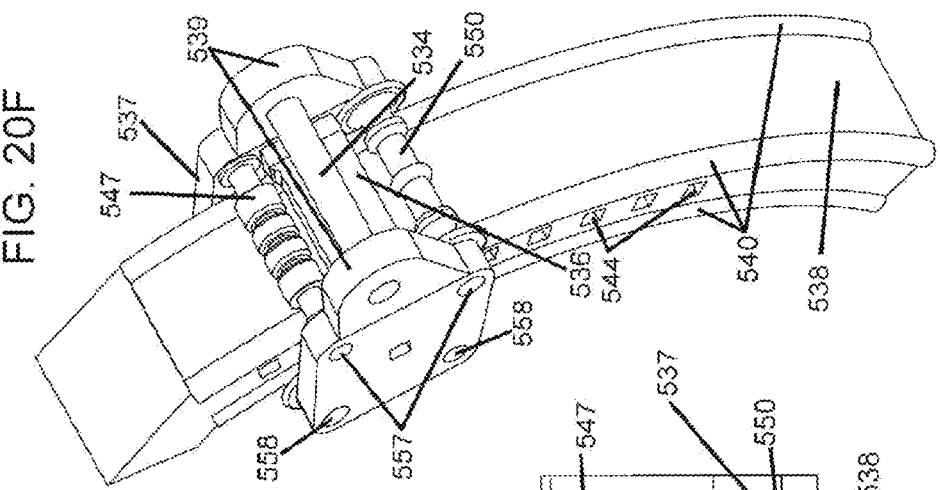
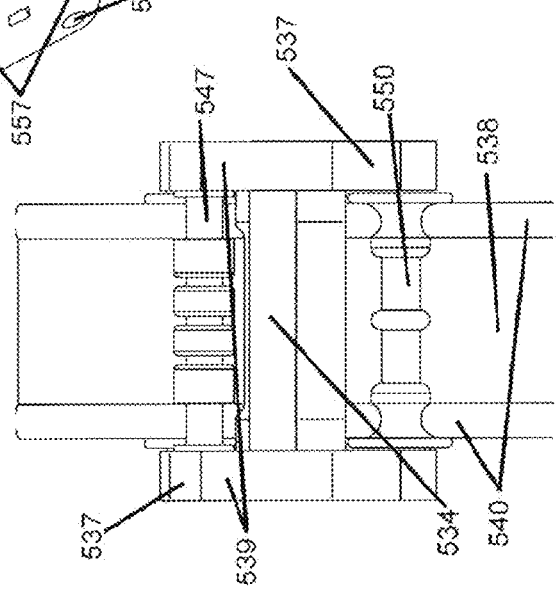
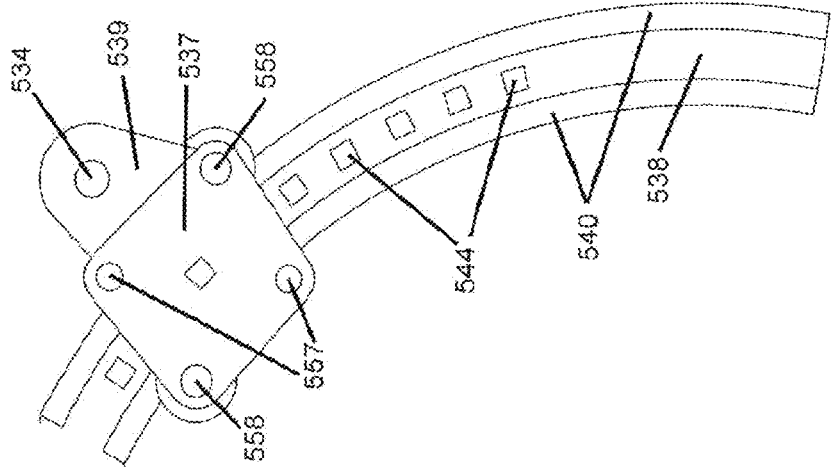

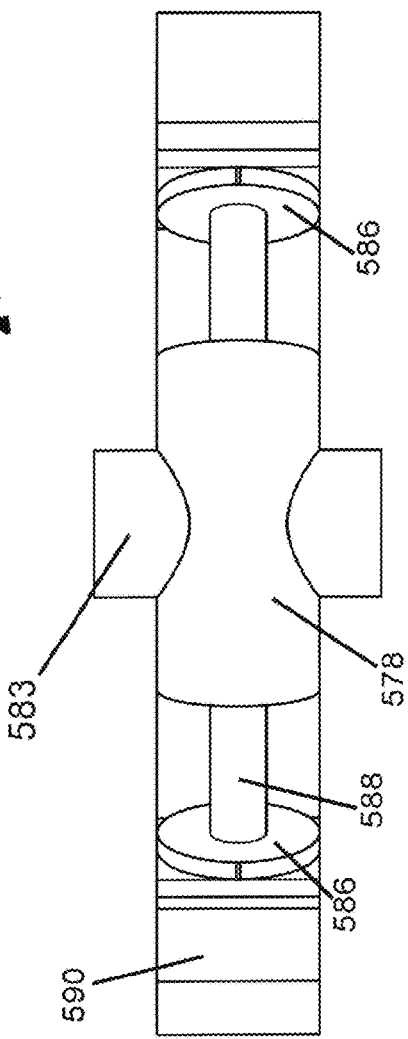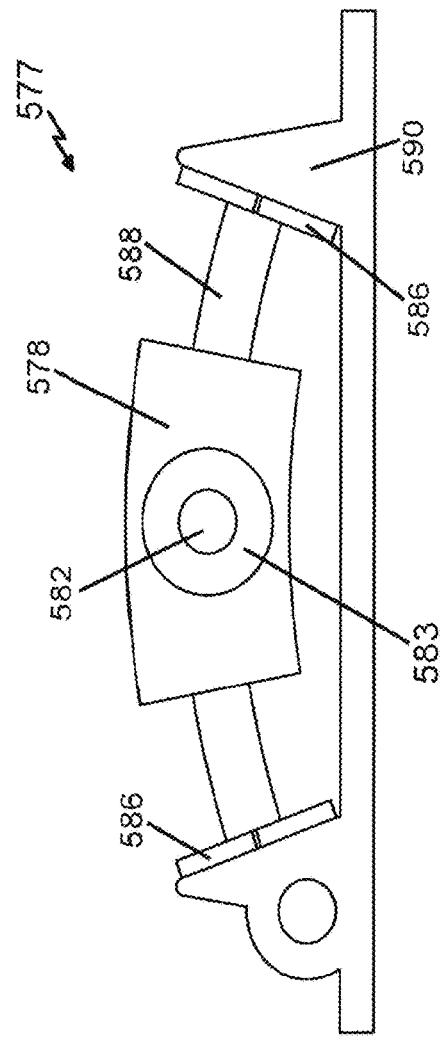

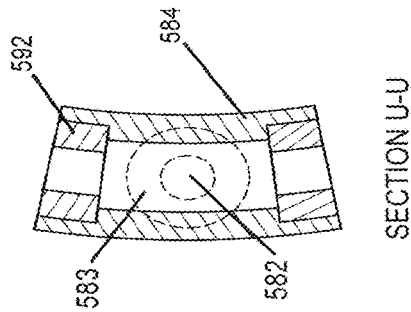
FIG. 21D SECTION U-U
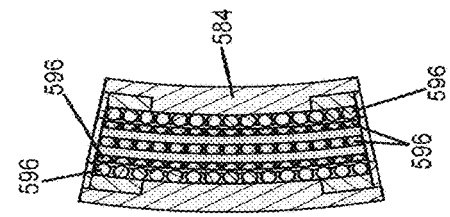
FIG. 21F SECTION U-U
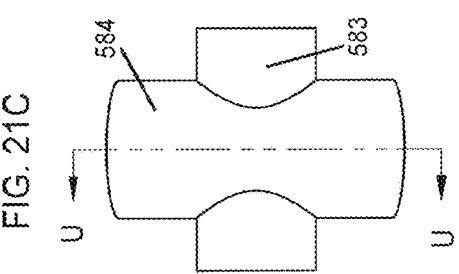
FIG. 21C
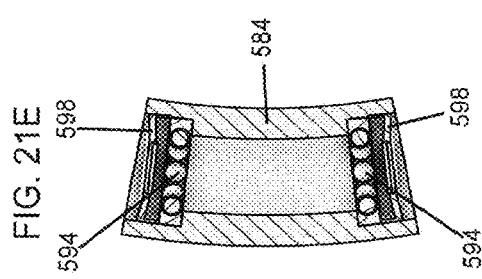
FIG. 21E SECTION U-U

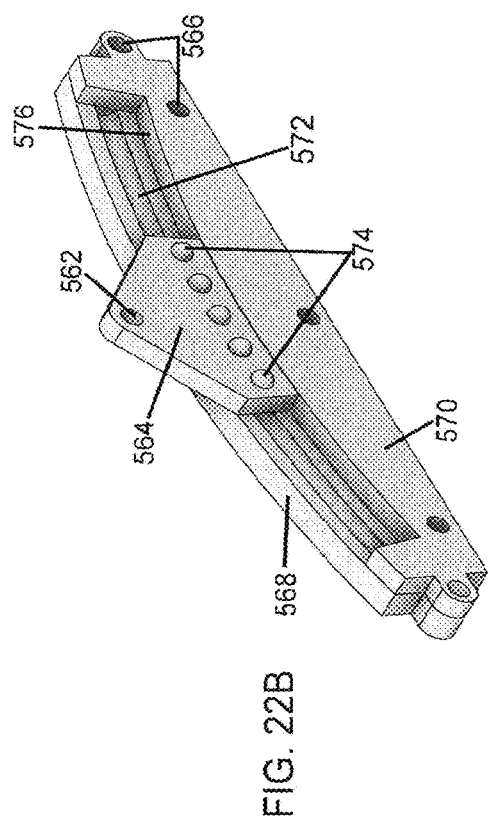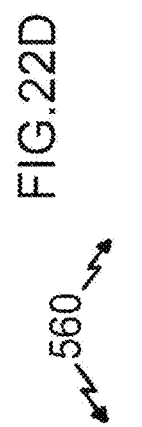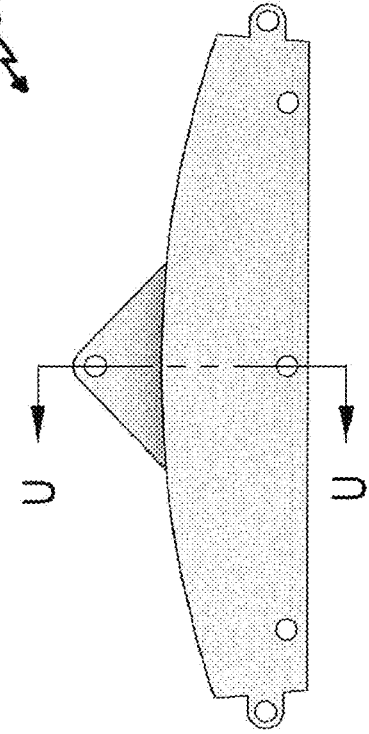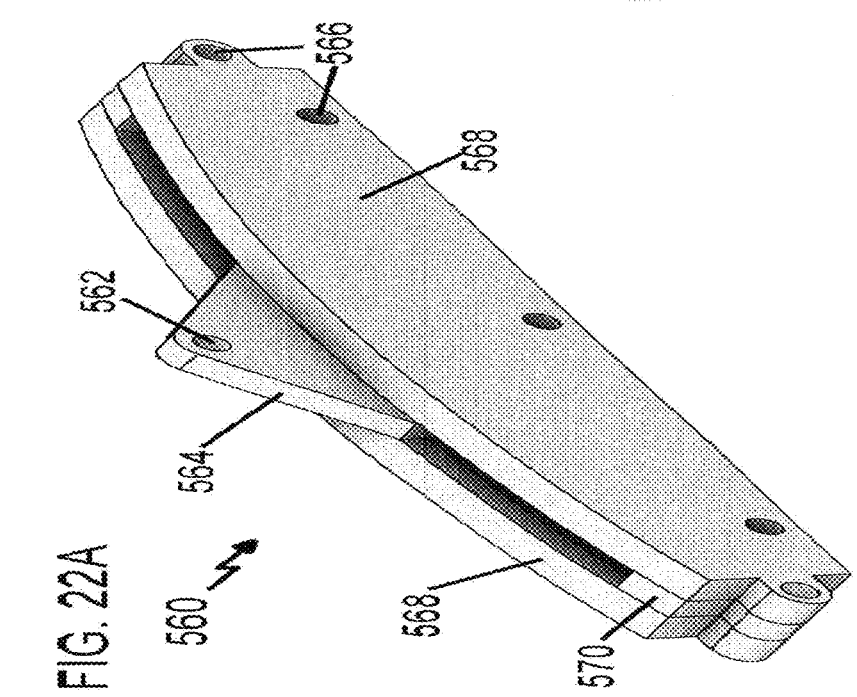
FIG. 22A
FIG. 22B
FIG. 22C
FIG. 22D Section U-U

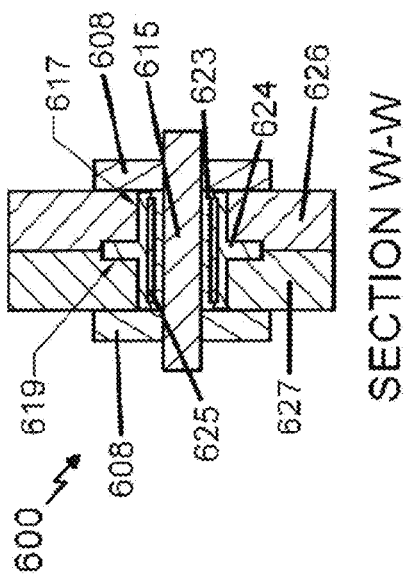
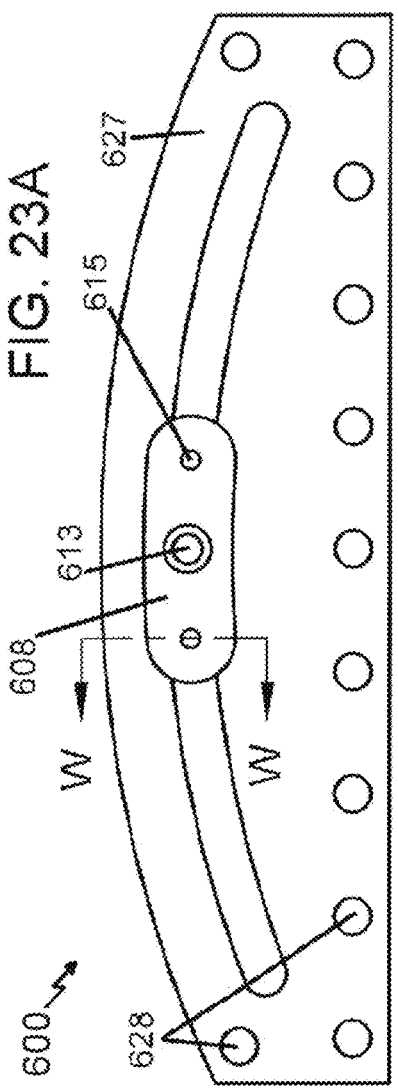
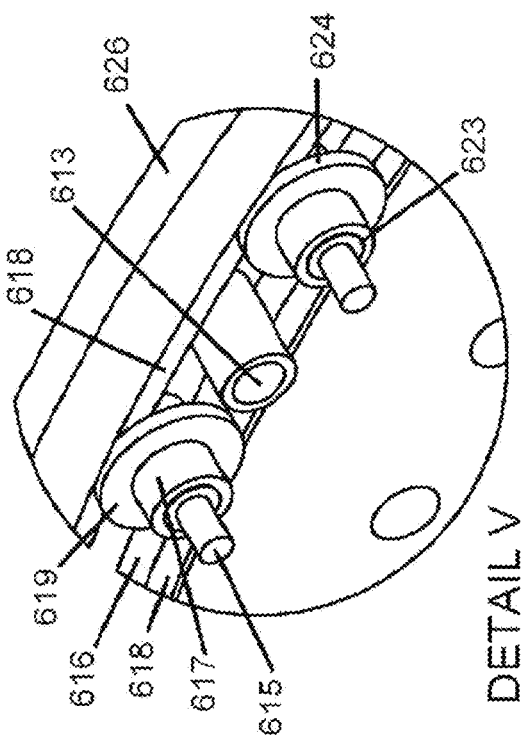
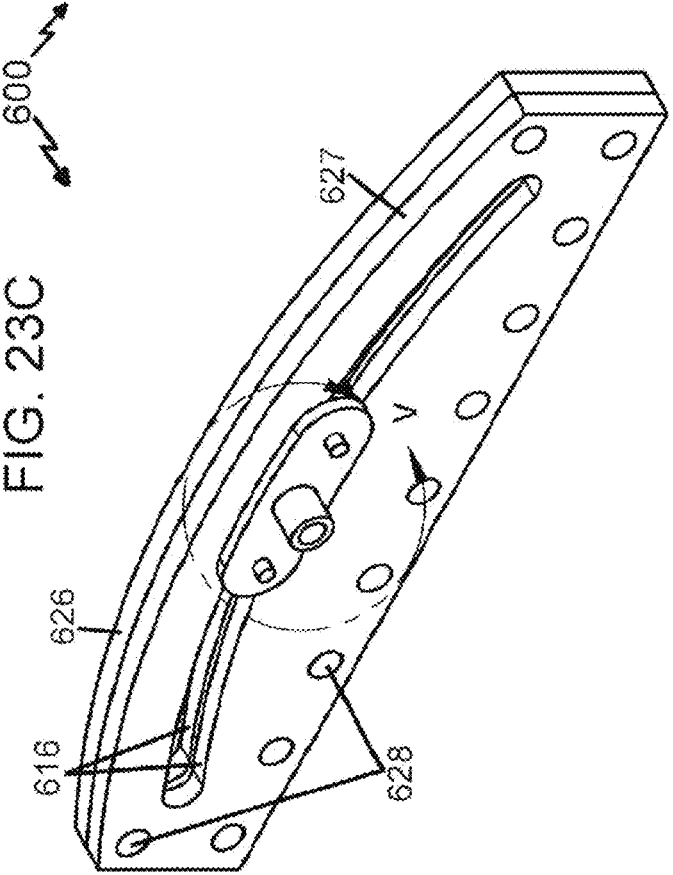

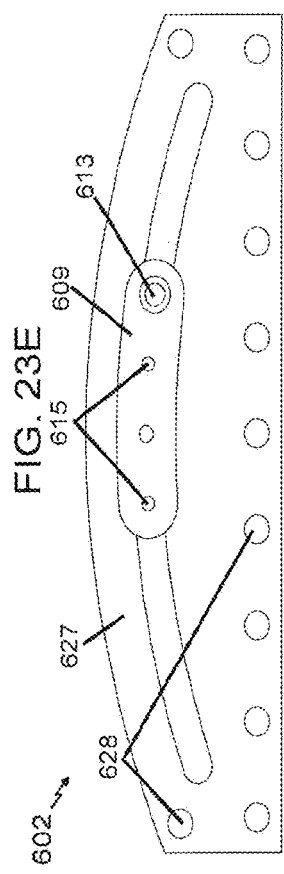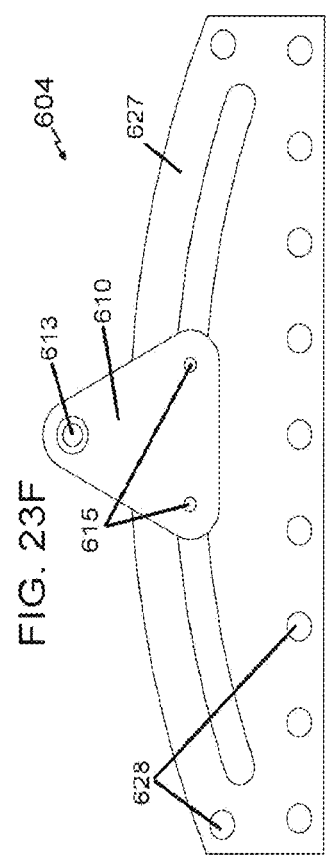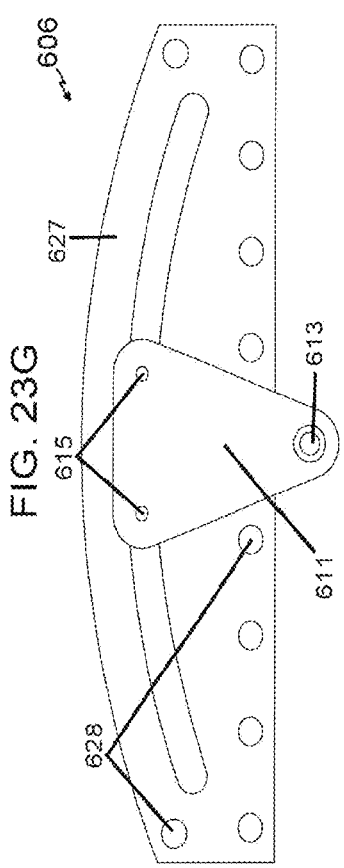

POSITION CHANGING SYSTEM

CROSS-REFERENCE TO RELATED APPLICATIONS

This application is a Continuation-In-Part (CIP) of parent U.S. Utility patent application Ser. No. 13/901,568, filed on May 24, 2013. This application claims the benefit of priority of the parent application and priority of the provisional patent application U.S. Ser. No. 61/650,956, filed on May 23, 2012 claimed in the parent application. The prior filed application U.S. Ser. No. 13/901,568 is incorporated in its entirety into this CIP herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a new position changing system, methods of manufacturing same, and methods of using same. More particularly, the invention relates to a dynamic triangular movement mechanism and incorporations into various aspects.

2. Description of the Prior Art

Conventional quadrilateral and parallelogram position changing mechanisms are well known in the art, including one of the most common types of position changing systems for moving products that includes a four link, four pivot movement mechanism. For example, an electric vehicle seat moves the seat forward and back when one pushes a button. Typically, the seat is moved by the use of a quadrilateral or parallelogram movement system. Robotic systems use parallelogram configurations to thrust out a robotic arm to move product from a first position to a second position. Conveyor belts use parallelogram systems to push boxes off to one side or the other for sorting purposes. The number of applications is too large to exhaustively describe here.

However, practitioners of those inventions have become aware of certain problems which are presented by those prior art inventions. One particular problem that has plagued users has been that a quadrilateral uses more space and incurs more weight than is desirable for certain applications. Furthermore, extra stabilizers may be needed to prevent side to side wobble. There are complexities which give rise to additional weight, space and complexity.

It would be desirable to mechanical movement industries if there was provided a new position changing system that weighed less, provided more stability, along with methods of making, and methods of using.

SUMMARY OF THE INVENTION

In accordance with the above-noted desires of the industry, the present invention provides various aspects, including a dynamic triangular movement mechanism, a method of making same, and a method of using the dynamic triangular movement mechanism in various aspects and/or applications. This dynamic triangular movement mechanism overcomes many of the aforementioned problems with the prior art because in my main design, there are three (3) interconnecting links and three (3) pivots.

A first aspect of the present invention includes certain features including a dynamic triangular movement mechanism for a position changing system and applications for the same.

This technique of dynamic triangular movement may therefore be extended to include not only the moving of product, but also the changing of position in many different industrial applications.

In accordance with the present invention, a position control system is disclosed that replaces a parallelogram or quadrilateral movement system with greater efficiency, economy, stability and utility by eliminating one of the four links and providing a non-linear path to be followed. This system includes a dynamic triangular mechanism for movement from a first position to at least a second position, with at least three (3) link members interconnected by pivots with a first base link member defining a non-linear path, said first base link member having a fixed base pivot and a follower pivot that moves along the non-linear path, a second fixed length support link member pivotally connected to the fixed base pivot, and a third follower link member pivotally connected to, and located between, the follower pivot and a connector pivot, wherein the follower link member is adapted for following the non-linear path, thereby creating a virtual triangle defined by the three link members while the follower pivot, fixed base pivot and the connector pivot interconnect the first base link member, the second fixed length support link member and the third follower link member.

In the present position control system, a first base link member is adapted for moving from a first position to a second position along the non-linear path while the second fixed length support link member remains pivotally connected to the fixed base pivot. The non-linear path may be of any configuration, but may be an arcuate path for many applications. Further, the non-linear path may includes a path defined by a rail, track, slotted opening, route, way, course, or any other designated path of movement to be followed. The second and third link members may have a fixed length and a constrained dimension.

A position changing system may also have at least 3 pivots and at least 2 linking members interconnected by the at least three pivots and having constrained dimensions, along with a follower. A third linking member can perform as a track defining a substantially circular arcuate path. One of said at least two linking members may act as a base, while one of the other two linking members would be a support link. The track and two links would be connected by the at least 3 pivot points so that the follower follows a substantially circular arcuate path, such that the position changing system is capable of substantially parallelogram-like movement without 4 linking members.

This position changing system is also adapted for exhibiting substantially quadrilateral-like movement is a dynamic triangular movement device. There are many applications, including automotive seats, farm equipment, robotics, conveyors, and anywhere loads and products need to be moved from one place to another.

In a preferred aspect, the base of the position changing system comprises a fixed base, an arcuate path/track that is non-linear or non-circular, depending upon the application. To guide the follower along the non-linear or arcuate path, slide or roller bearings, track/ball bearing/worm screw or the like may be employed. An offset follower may be adapted for radial adjustment.

The invention is particularly useful for applications of autonomous vehicle seating; robotics and autonomous suspension systems, sporting equipment, mounting support and lift systems; food production using less energy and maintenance; and medical equipment.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein;

FIG. 2C is a backside perspective view of the basic dynamic triangular mechanism of FIGS. 2A and 2B showing the specific components made in accordance with the present invention;

FIG. 3B is a side elevational view of a position changing movement of the basketball net of FIG. 3A, showing the dynamic triangular movement position changing mechanism of the present invention, now in the down position;

FIG. 5B is a side perspective view of the agricultural seed planter, now with a dynamic triangular movement;

FIG. 5E is a side perspective view of the planter portion of the agricultural seed planter, now with a non-linear path dynamic triangular movement moving toward a second position;

FIG. 5G is a side perspective view of just the planter portion of the agricultural seed planter, now with a non-linear path dynamic triangular movement in the first position;

FIG. 6A is a side elevational view of a prior art suspension arm for a semi-trailer with a conventional quadrilateral movement mechanism;

FIG. 6C is a perspective view of the suspension arm for a semi-trailer with the dynamic triangular movement replacing the suspension of FIG. 6A;

FIG. 7B is a front elevational view of the vehicle suspension system of FIG. 7A replaced with the dynamic triangular movement of the present invention;

FIG. 8B is also a side elevational view of the outboard boat motor positioning system of FIG. 8A, but with the conventional quadrilateral system replaced with the dynamic triangular movement of the present invention;

FIG. 8C is a perspective of FIG. 8B;

FIG. 9B is a side elevational view of the up position of the dynamic triangular movement of FIG. 9A;

FIG. 9C is a side elevational view of the midway down position of the dynamic triangular movement of FIG. 9A;

FIG. 9D is a side elevational view of the final down position of the dynamic triangular movement of FIG. 9A;

FIG. 9E is a side perspective view of the dynamic triangular movement position changing mechanism of FIG. 9A made in accordance with the present invention, but with a downward tilted component;

FIG. 9F is a side perspective view of the dynamic triangular movement position changing mechanism of FIG. 9A made in accordance with the present invention, but with an upward tilted component;

FIG. 10B is a top perspective view of the camera mount vertical stabilizer of FIG. 10A, but replacing the conventional parallelogram/quadrilateral mechanism with a dynamic triangular movement of the present invention in the down position;

FIG. 10C is a side elevational view of the camera mount vertical stabilizer of FIG. 10A, with a replacement of the conventional parallelogram/quadrilateral mechanism with a dynamic triangular movement of the present invention in the down position;

FIG. 11B is a perspective view of a fully opened dual dynamic triangular movement;

FIG. 11C is a perspective view of a fully retracted dual dynamic triangular movement;

FIG. 11D is a close up view of the dynamic triangular movement of FIG. 11C;

FIG. 11E is a side elevational view of FIGS. 11C-D;

FIGS. 14C-E shows FIG. 14B in perspective;

FIG. 15A shows yet another aspect of the arcuate path aspect of the present invention;

FIG. 15B shows detail of FIG. 15A

FIG. 17B shows a top plan view FIG. 17A;

FIG. 17C shows a combination of position changing components for industrial applications;

FIGS. 17D-F are different views of another aspect of the present invention with multiple arcuate paths;

FIGS. 18A-B show an arcuate path dynamic triangular movement with rails as follower paths;

FIGS. 19A-D show yet another aspect of the present invention with wheels in a rail;

FIGS. 20A-C show a dynamic triangular movement configuration in an all-terrain vehicle seat suspension aspect;

FIGS. 20D-F show a dynamic triangular movement configuration using roller bearings on an arcuate rail guide;

FIGS. 21A-D illustrates various views of another dynamic triangular movement aspect using an arcuate guide;

FIG. 21E is a side view of a roller bearing on an arcuate path;

FIG. 21F is a side view of another type of roller bearing on an arcuate path;

FIG. 22A shows a track guide aspect of the present invention;

FIG. 22B shows an exposed view of FIG. 22A;

FIG. 22C is a side view of FIG. 22A;

FIG. 22D is a section U-U of FIG. 22A;

FIGS. 23A-D show various views of another aspect of the present invention;

FIG. 23E is a side view of a track guide aspect of the arcuate path dynamic triangular movement;

FIG. 23F shows a side view of another aspect of the present invention; and

FIG. 23G shows a side view of another aspect of the present invention.

DETAILED DESCRIPTION OF THE INVENTION

Figure 1:
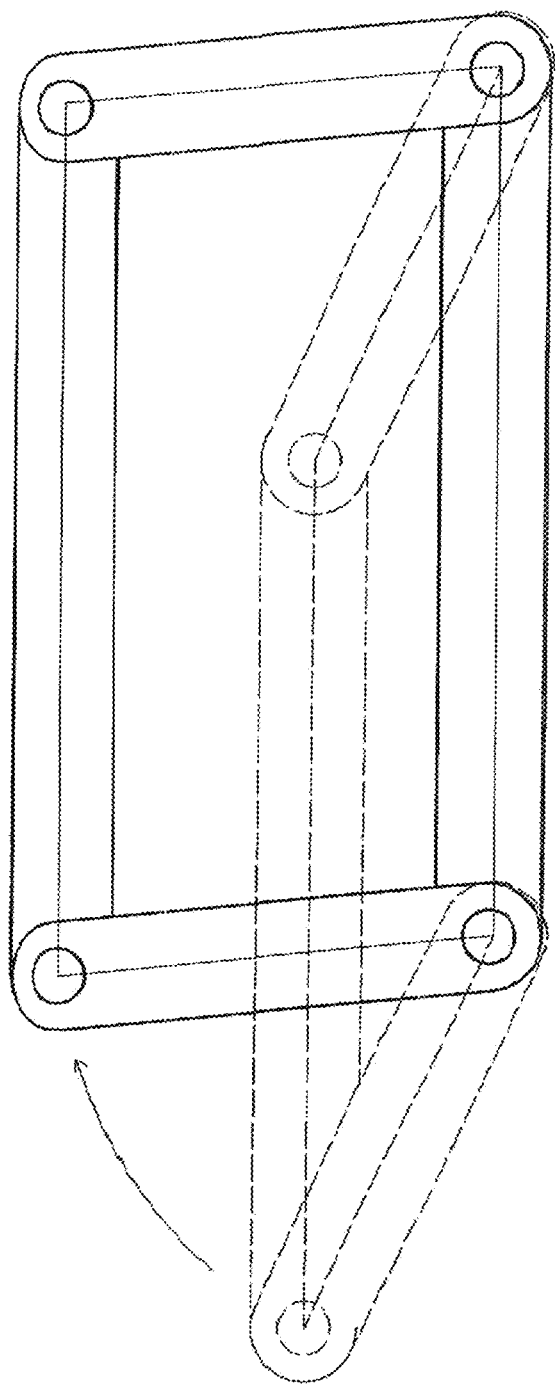
FIG. 1 is a view of a prior art quadrilateral position changing system

Referring now to the drawings in detail, FIG. 1 is a view of a basic prior art quadrilateral position changing system, illustrating how the quadrilateral moves back and forth on 4 pivots interconnecting four fixed length links. FIG. 1 shows that there is one directional movement possible with this configuration. Unless stabilizers are incorporated into this design, one can see that not only is forward and backward motion possible, an undesirable side to side motion may occur. A basic quadrilateral, possibly a parallelogram, is shown in FIG. 1. Essentially, this basic quadrilateral includes four links, four pivots and all four links are of fixed length, from pivot to pivot.

Figure 2A:
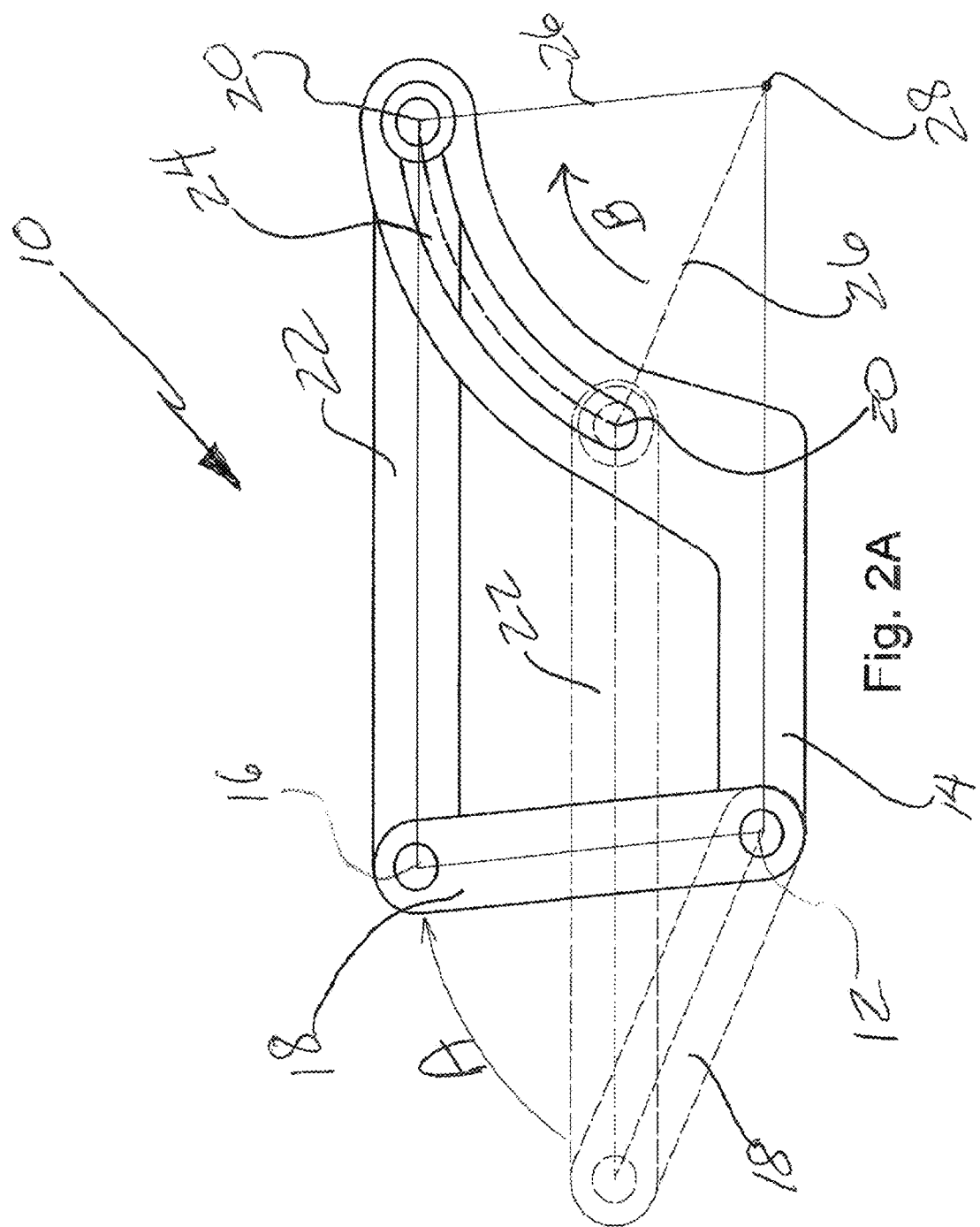
FIG. 2A illustrates a basic dynamic triangular movement mechanism showing relative movement that is made in accordance with the present invention.

FIG. 2A illustrates a very basic diagram of a dynamic triangular mechanism made in accordance with the present invention. This basic version of the dynamic triangular mechanism can duplicate the motion of a quadrilateral, or a parallelogram, even though it only includes three pivots, three links and a path. Two of the links are of fixed length, similar to the corresponding links in the quadrilateral of FIG. 1 above. However, the present invention provides a follower pivot, which follows a non-linear path, which is why the present invention exhibits quadrilateral movement without the fourth link and/or the pivot. In this aspect, the non-linear path is shown as a semicircular arc. The center of radius of the semicircular arc is in the same position as the missing pivot of the prior art quadrilateral. As can be seen in FIG. 1, the present invention shows a similar quadrilateral motion is being performed, while simplifying the conventional basic mechanism.

Even though the dynamic triangular mechanism of the present invention can duplicate the motion of a parallelogram, as described in more full detail below, it makes significant improvements in both reduction of weight, stability and regaining of space which might be important in smaller applications or applications with limited space.

Referring back to FIG. 2A, the dynamic triangular mechanism generally being indicated by the numeral 10, also includes a base pivot 12, base link 14, a connector pivot 16, a support link 18, a follower pivot 20, a follower link 22, and a non-linear path 24. The dynamic triangular position changing system of the present invention includes an axis that runs through the center of each of the pivots. In this aspect of the invention, there is a three (3) axis arcuate path defining the nonlinear path 24.

It is a basic aspect of the invention for creating movement between the base pivot to the connector pivot and from the connector pivot to the follower pivot as the follower pivot follows the non-linear path. The base pivot is fixed in the base. The nonlinear path is fixed in relationship to the base. The other two pivots move in harmony to one another, as when one moves, the other moves. In this aspect, the base link 14 is rigidly connected to or will contain, the base pivot 12 and the non-linear path 24. Connector pivot 16 connects support link 18 to the follower link 22. Connector pivot 16 moves when follower pivot 20 moves along the nonlinear path 24. A radius line 26 is shown emanating from a radial center 28 of the nonlinear path 24. Follower pivot 20 connects follower link 22 to base link 14. As follower pivot 20 moves along the path, the follower pivot axis follows nonlinear path 24. Although not all nonlinear paths will be semicircular, in this instance it is a semicircular arcuate path.

As one can see from FIG. 2A, the dynamic triangular mechanism designated as "A" shows that this can function in a similar fashion as a quadrilateral or parallelogram multi-axis position changing system as shown in the prior art FIG. 1, but with fewer components, and greater stability.

Figure 2B:
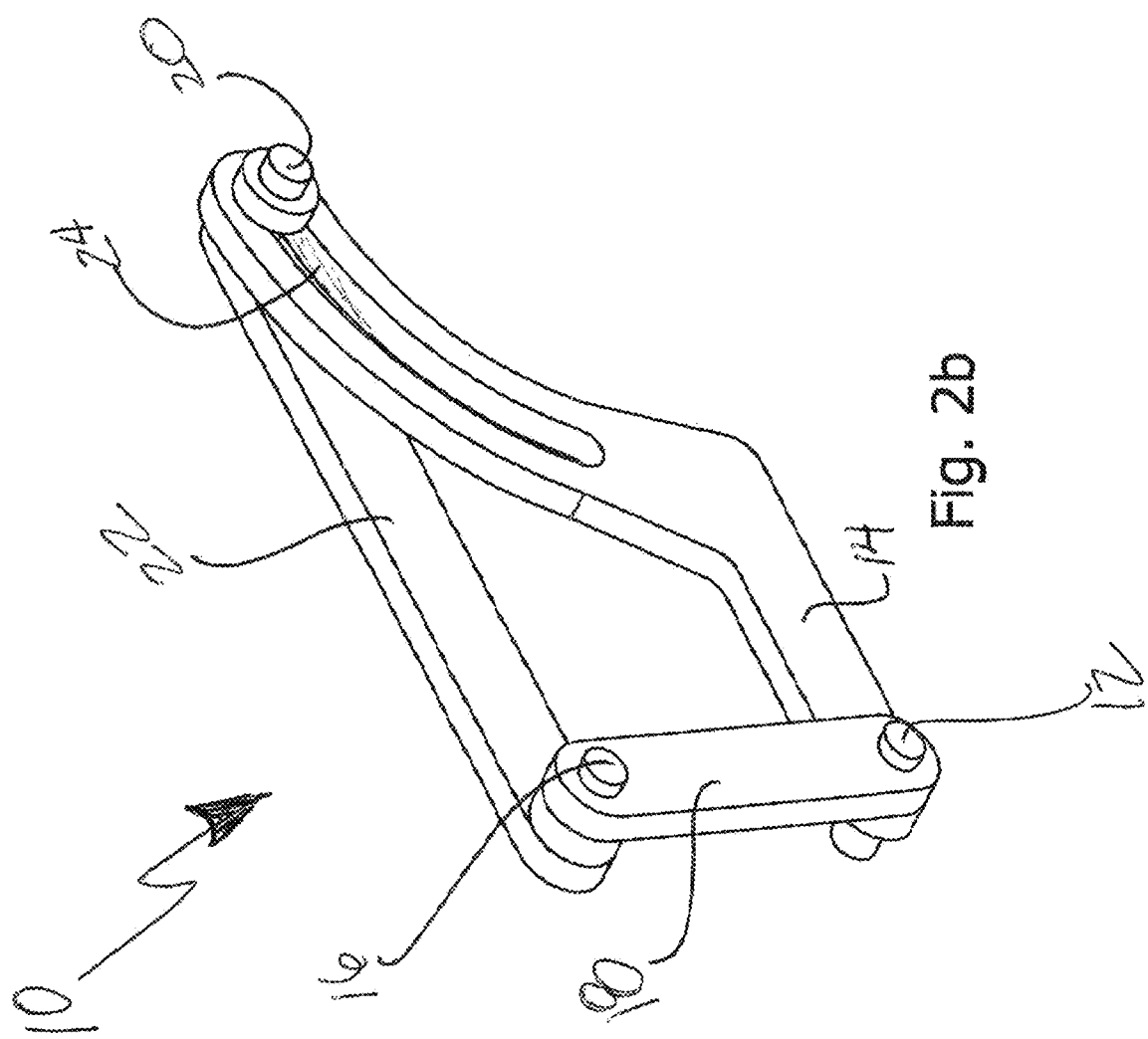
FIG. 2B is a side perspective view of the basic dynamic triangular mechanism of FIG. 2A showing the specific components made in accordance with the present invention.

Looking next to FIG. 2B, there is shown another view of the dynamic triangular mechanism of FIG. 2A from a front perspective view in order to provide clarity of the movement. Maintaining the element numbers, one can see the working components from a different view.

FIG. 2C illustrates a front perspective view of the present invention, again utilizing most of the same element numbers as the previous FIGS. 2A and 2B. Convex arcuate path 25 will not likely produce parallelogram movement, but could produce quadrilateral movement.

Figure 3A:
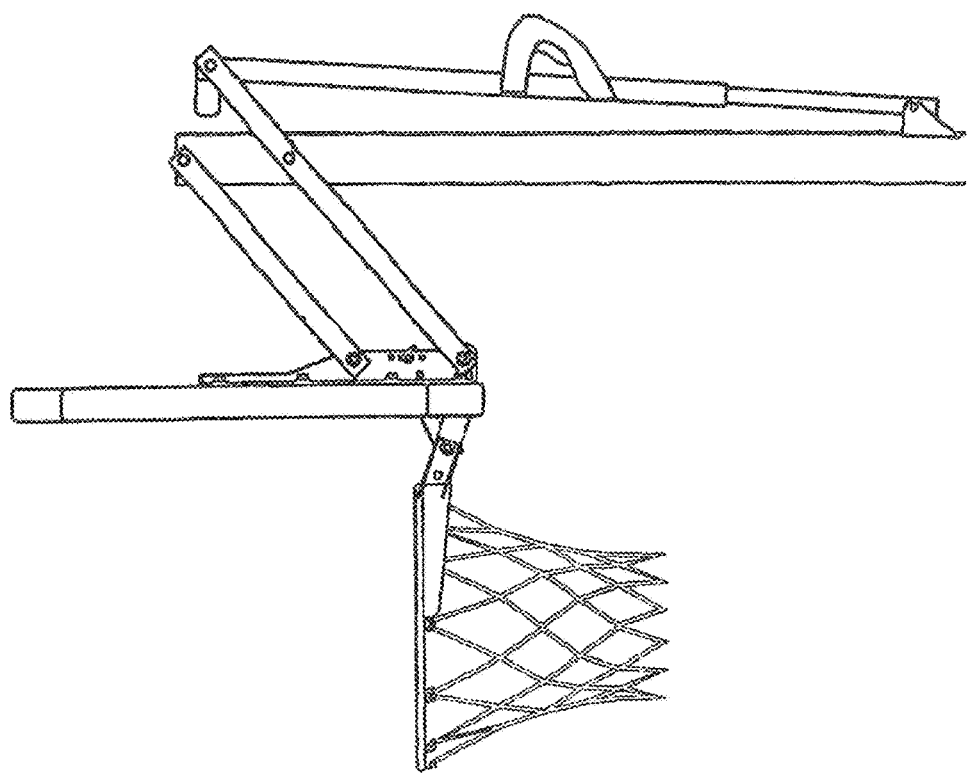
FIG. 3A is a side elevational view of a prior art quadrilateral position changing movement of a prior art basketball net in the up position.
Figure 3C:
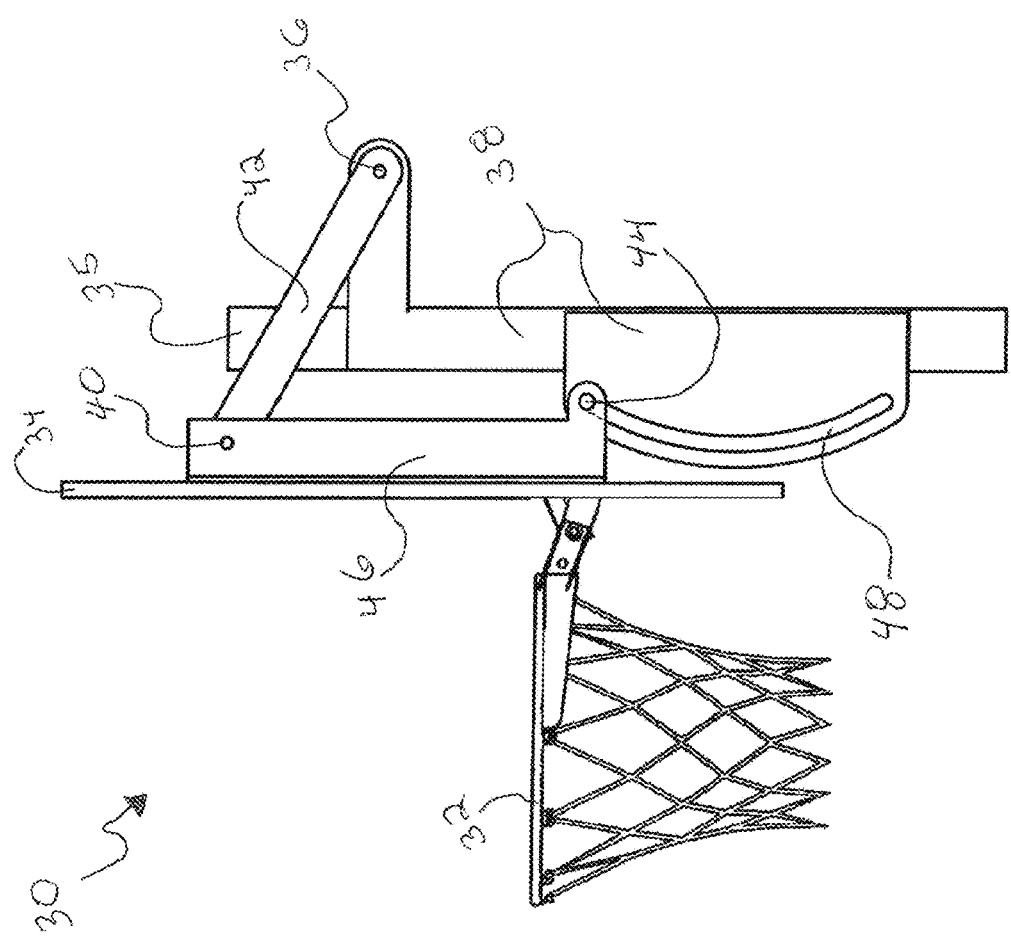
FIG. 3C is a side elevational view of a position changing movement of the basketball net of FIG. 3A, showing the dynamic triangular movement position changing mechanism of the present invention, now in the up position.

FIG. 3A is an illustration of a prior art basketball hoop support system, utilizing a quadrilateral position changing system. FIG. 3B shows basketball hoop 32 in a down position, while FIG. 3C shows the basketball hoop in an up position. A substitute dynamic triangular mechanism made in accordance with the present invention, wherein the basketball net support is generally denoted by numeral 30, supporting a basketball net 32 on a basketball backboard 34 with an upright support 35. In this aspect, base link 38 is rigidly connected to the upright support 35 as are base pivot 36 and an arcuate path 48. This creates a more rigid system then the parallelogram lift system by greatly reducing any side to side movement, which is inherent in a parallelogram lift system. Basketball backboard 34 can be adjusted to any position between the high and low positions, just like the prior art, but with less complication and more side to side stability. Connector pivot 40 connects support link 42 to follower link and backboard support 46 which contains follower pivot 44. Follower pivot 44 follows path 48. In the prior art, there were two (2) support links connecting the upright support to the basketball backboard. A pivot was at each end of these links. Three 3-dimensional wobbling is inherent in the pivot to both ends of this link. The distance between the pivots causes the wobbling from side to side to be greatly increased. By utilizing the present technology, and eliminating one pivot and one link, side to side motion is reduced at the bottom of the backboard.

Figure 4:
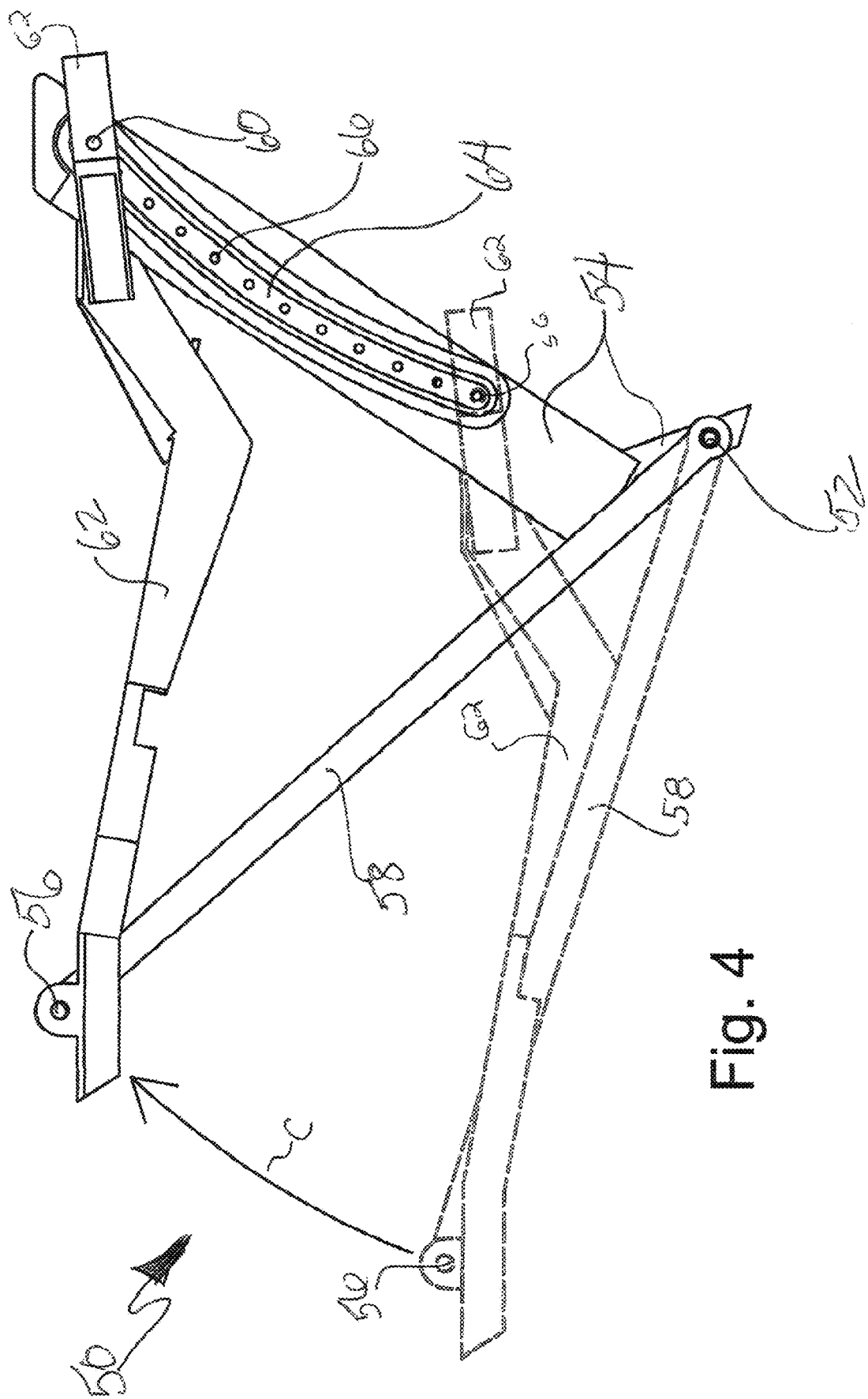
FIG. 4 is a side elevational view of the dynamic triangular movement in a vehicle seat, showing a first position in phantom, and a second up position.

FIG. 4 illustrates the bare bones of a multi-wheel straddle seat vehicle, such as an all-terrain vehicle or a three wheeled motorcycle or any type of other straddle seat vehicle. The straddle seat vehicle suspension and positioning system is generally described by numeral 50 and includes a base pivot 52 interconnected with base link 54 which includes the nonlinear path 64 therein. The vehicle engine would be in front of the nonlinear path 64. Connector pivot 56 is attached to support link 58 which is in turn connected to follower pivot 60 and follower link 62. Position latch pin receivers 66 hold the seating mechanism in a new position for a particular driver position secured by a latch pin. Part of the reason a few motorcycles and ATV's have adjustable seats is because there is not enough space for a typical four (4) axis parallelogram movement. The present system does the same movement as the four (4) axis parallelogram, although it leaves space for the engine.

Figure 5A:
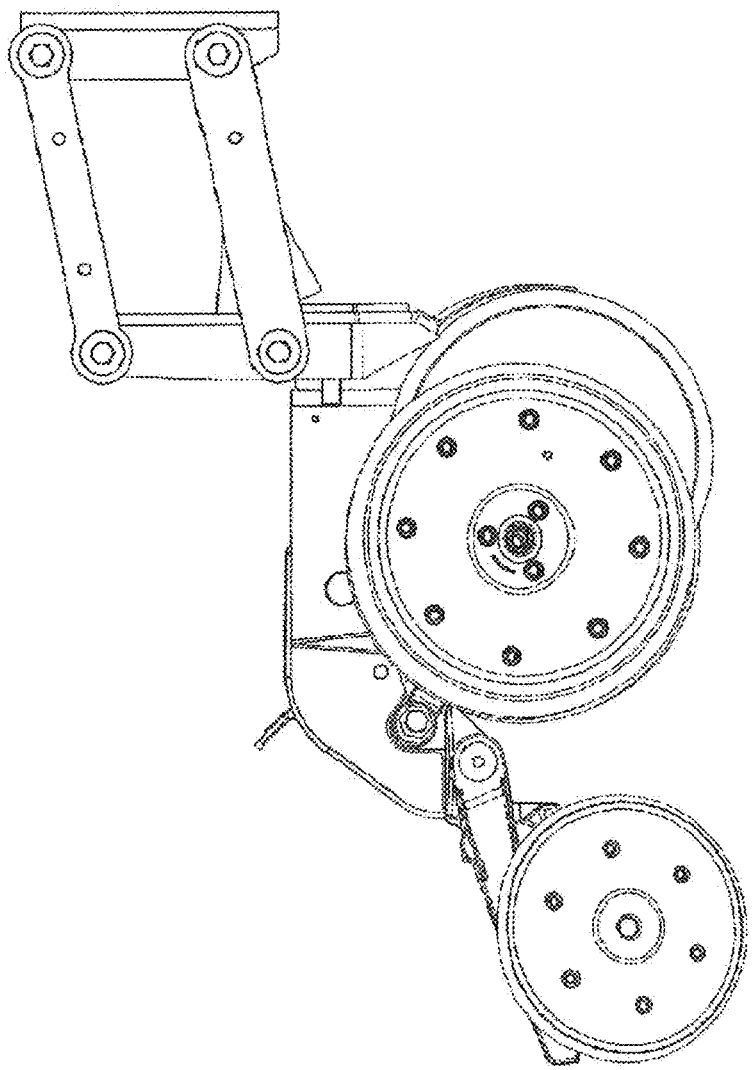
FIG. 5A is a side perspective view of a prior art agricultural seed planter with a prior art parallelogram seeder.
Figure 5C:
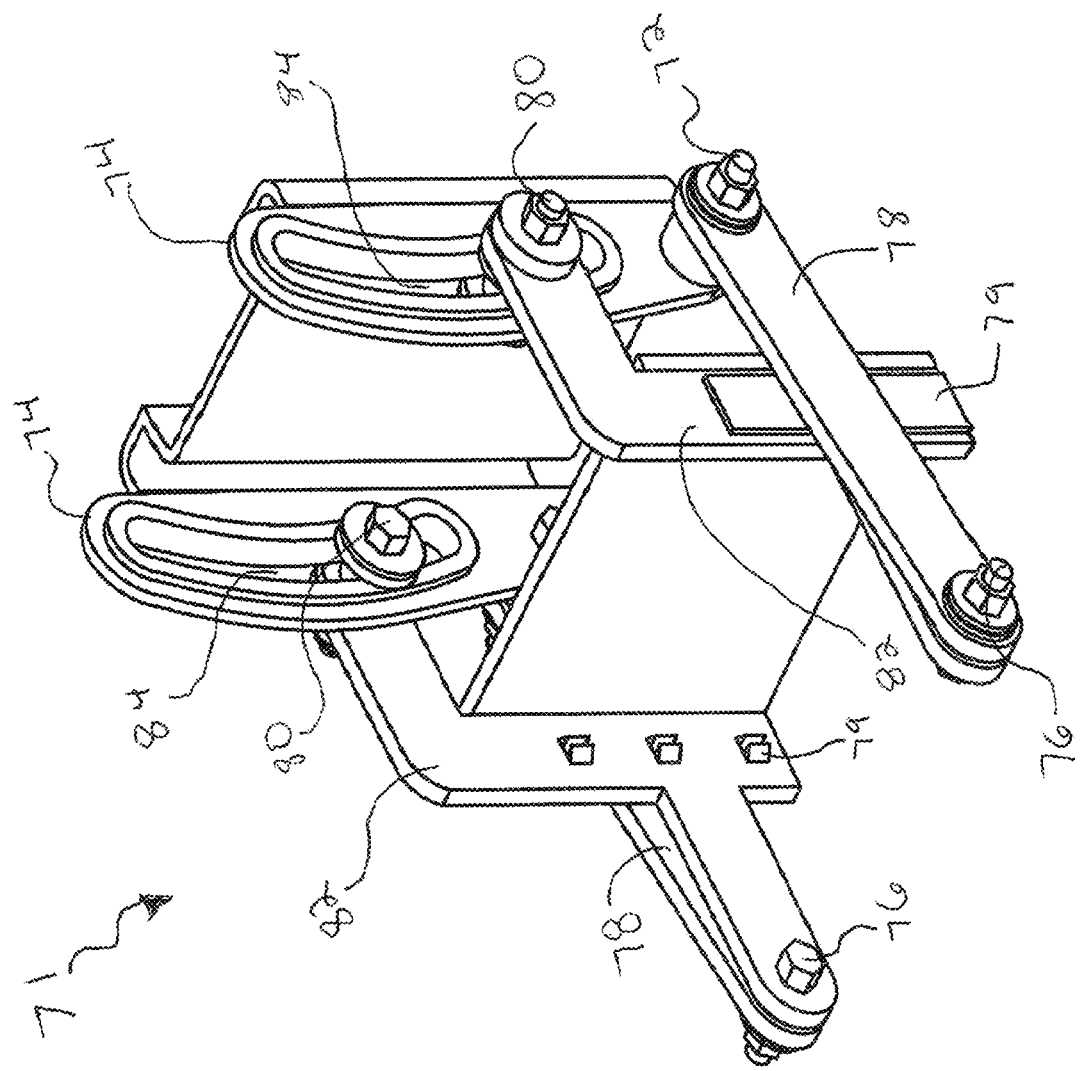
FIG. 5C is a side perspective view of just the planter portion of the agricultural seed planter, now with an arcuate path dynamic triangular movement.

FIG. 5A illustrates a prior art agricultural seed planter having a parallelogram for floating of the seed applicator. FIG. 5B shows the same agricultural seed planter, although the seed applicator mechanism has been replaced by the present invention. This agricultural seed planter is generally denoted by the numeral 70, and includes a base pivot 72 attached to a base link 74. Base link 74 has an arcuate path 84 formed therein for receiving follower pivot 80 attached to follower link 82. One can see the relative placement of connector pivot 76 attached to support link 78. An optional shim 79 may be used to provide a means for taking up the clearance between the support link in the follower link to alleviate side to side movement. The dynamic triangular mechanism is further defined by attachment to and frame assembly 85. FIG. 5C shows a perspective close-up of the mechanism and illustrates the dynamic triangular movement 71 that simulates parallelogram movement in a float system used in an agricultural planter subassembly.

Figure 5D:
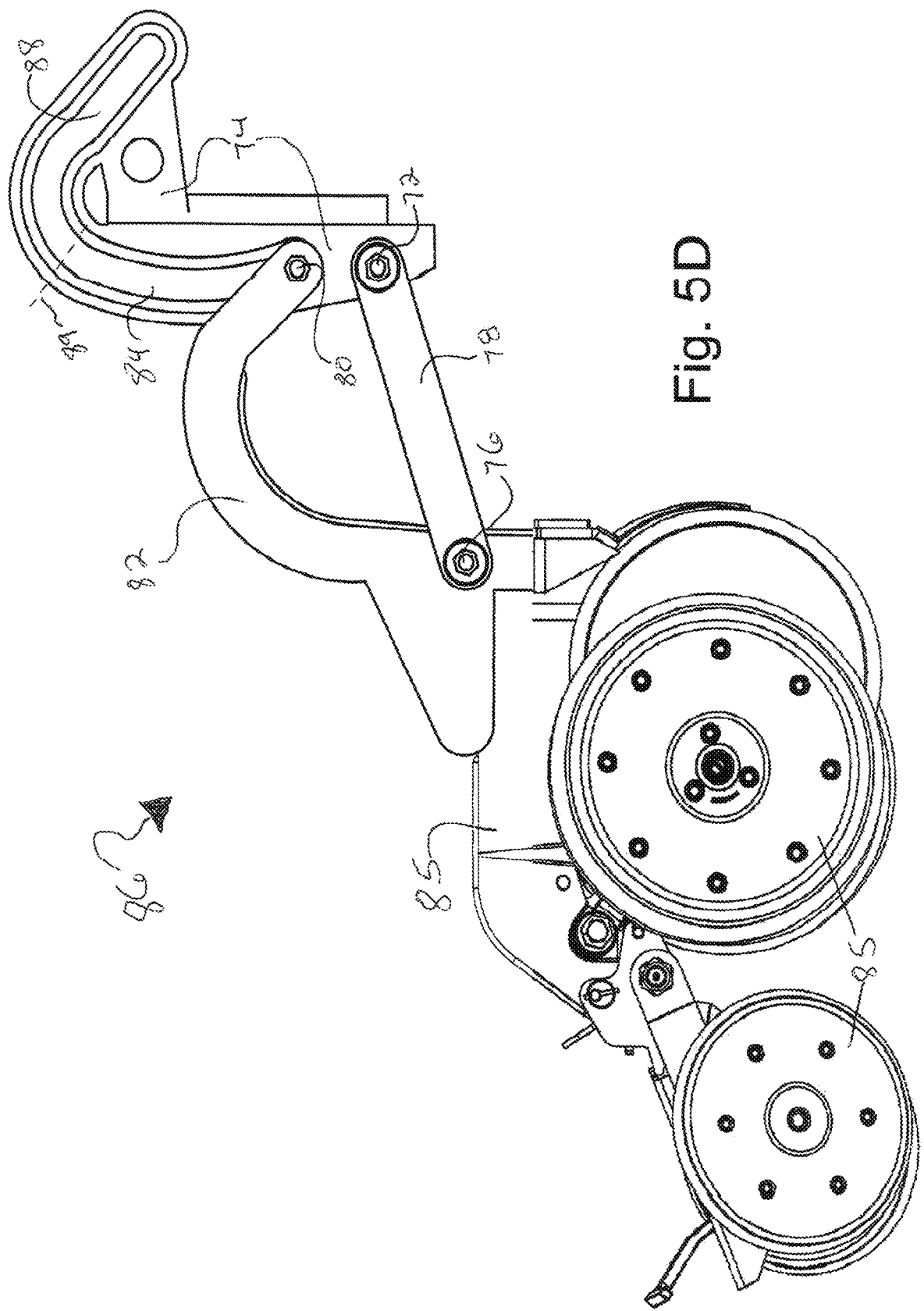
FIG. 5D is a side perspective view of the planter portion of the agricultural seed planter, now with a non-linear path dynamic triangular movement in a first position.

FIG. 5D shows another aspect of the possible dynamic triangular movement in another configuration generally denoted by the numeral 86, which differs from the previous agricultural seed planter with a non-linear extension of path 88 having a bisected region 89 of the arcuate and a non-arcuate portions of the path. Base link 74 remains in connection with base pivot 72 and connector pivot 76, while follower link 82 has a different configuration than previous FIG.'s.

Figure 5F:
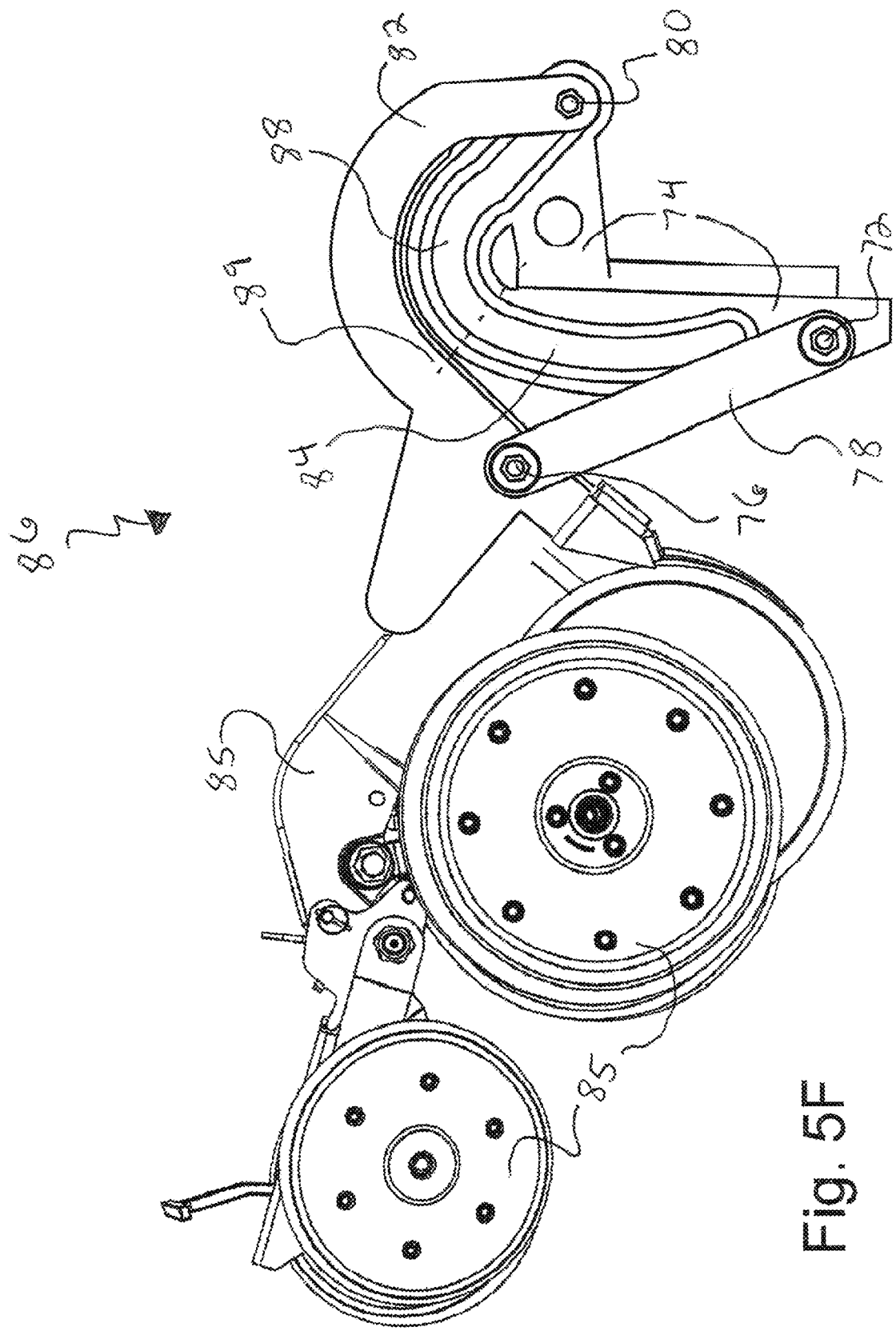
FIG. 5F is a side perspective view of the planter portion of the agricultural seed planter, now with a non-linear path dynamic triangular movement having moved into the second position.

FIG. 5E and FIG. 5F show the intermediate stages of movement of the aspect of FIG. 5D, which was in the down position. FIG. 5D is midway through the path, while FIG. 5F shows the dynamic triangular mechanism all the way at the end of the non-arcuate path portion.

Figure 6B:
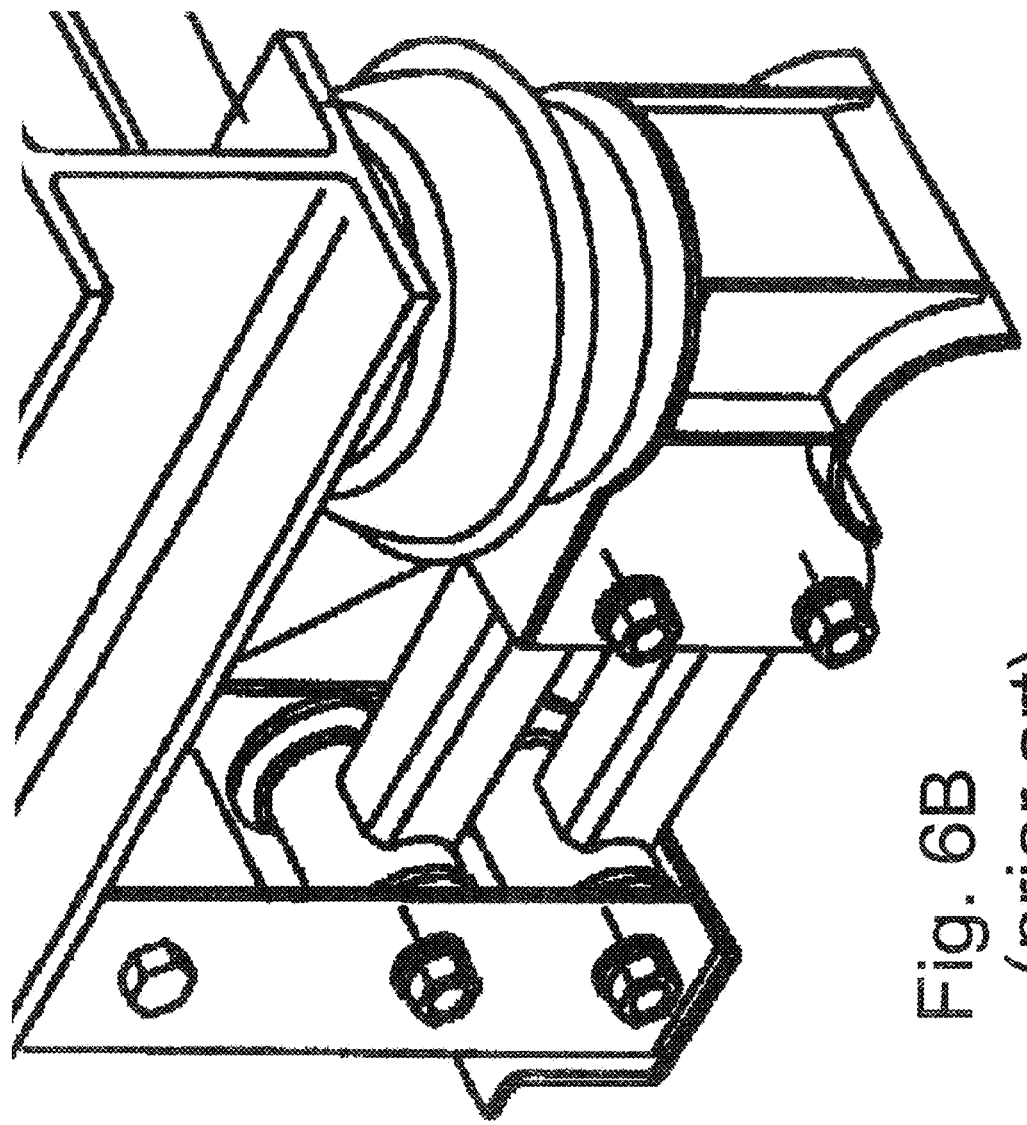
FIG. 6B is a side elevational perspective view of the prior art suspension arm for a semi-trailer with a conventional quadrilateral movement mechanism of FIG. 6A.

Looking next to FIG. 6A, a prior art, parallelogram configuration of the suspension arm for a semi-trailer is illustrated. FIG. 6B shows another perspective view of the same prior art suspension system of FIG. 6A. FIG. 6C shows a perspective view of the same suspension arm for a semi-trailer, although the parallelogram has now been replaced with the dynamic triangular movement mechanism 90 of the present invention. Looking back at FIG. 6A, the height of travel of the suspension system is limited to the dimension shown as D1. By substituting the present invention, including base pivot 92 attached to base assembly 94 and being interconnected to connector pivot 96, support link 98, follower pivot 100, follower link 102, movement on an arcuate path 104, which is rigidly mounted to the base, reduces side to side movement and decreases the height of the possible suspension travel. By eliminating a link and replacing it with an arcuate path, the semi-trailer axle is more directly connected to the base assembly. Distance between the rear pivots is increased, providing overall less tire and component wear and lower height for less wind resistance. The top seat 105 is directly underneath resilient member 106, illustrated here as an air spring. Shock absorber 108 is attached to and in communication with follower 109. In this illustration, a bottom saddle 103 is incorporated into the underside of the follower link 102.

Figure 6D:
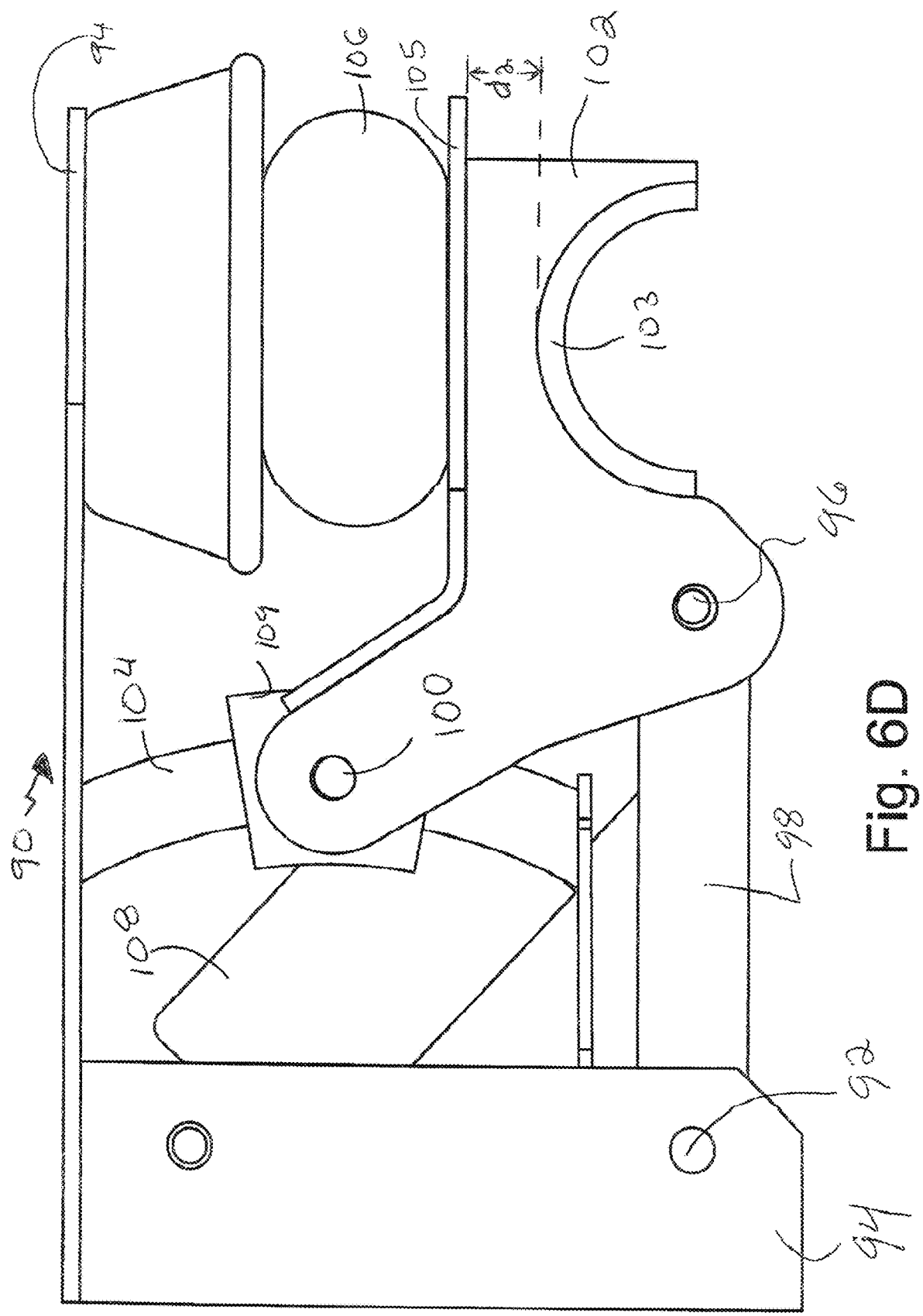
FIG. 6D is a side elevational view of FIG. 6C, illustrating the placement of the arcuate path of the dynamic triangular movement.

FIG. 6D is a side elevational view of the suspension arm of FIG. 6C, where the element numbers each referred to the same elements. However, in this FIG. 6D, the height distance D2 is noted, which is approximately one half (½) the height distance of D1 shown in FIG. 6A. This is the height savings obtained by using our dynamic triangular movement invention.

Figure 7A:
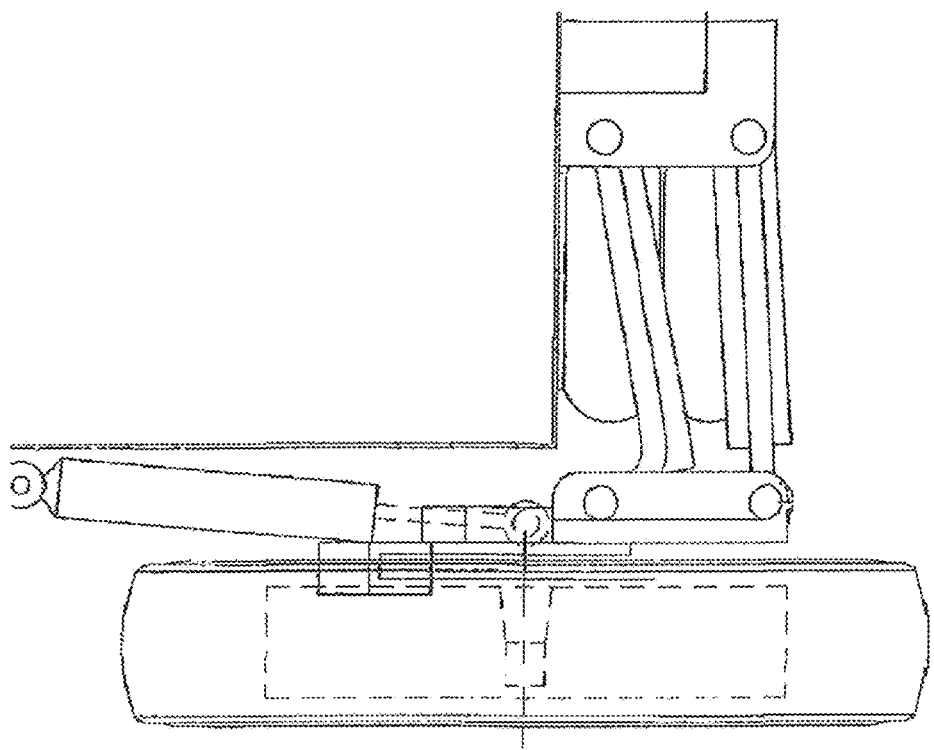
FIG. 7A is a front elevational view of a prior art vehicle suspension system utilizing a conventional strut suspension mechanism.

FIG. 7A is a front elevational view of a different prior art vehicle suspension system utilizing a parallelogram configuration, a resilient member and a shock absorber. As we have seen in the past, the prior art suspension system of FIG. 7A has been replaced with a dynamic triangular mechanism of the present invention, generally denoted by numeral 110. As can be seen in FIG. 7B, base pivot 112 is attached to base link 114, which is the vehicle body. Connector pivot 116 is attached to support link 118 and follower pivot 120 is connected to follower link 122, which in this case is a spindle mounting means and arcuate path 124 provides the path for follower 132 which is connected to shock absorber 126. A torsion bar 134 provides the spring and/or resilient action needed for suspension. Torsion bar bell crank 136 is connected to torsion bar link 138, which turns the linear motion of the torsion bar link into rotary motion to transfer it to torsion bar 134. Torsion bar link 138 transfers the linear motion of the connector pivot and the follower link to the torsion bar bell crank 136.

Figure 7C:
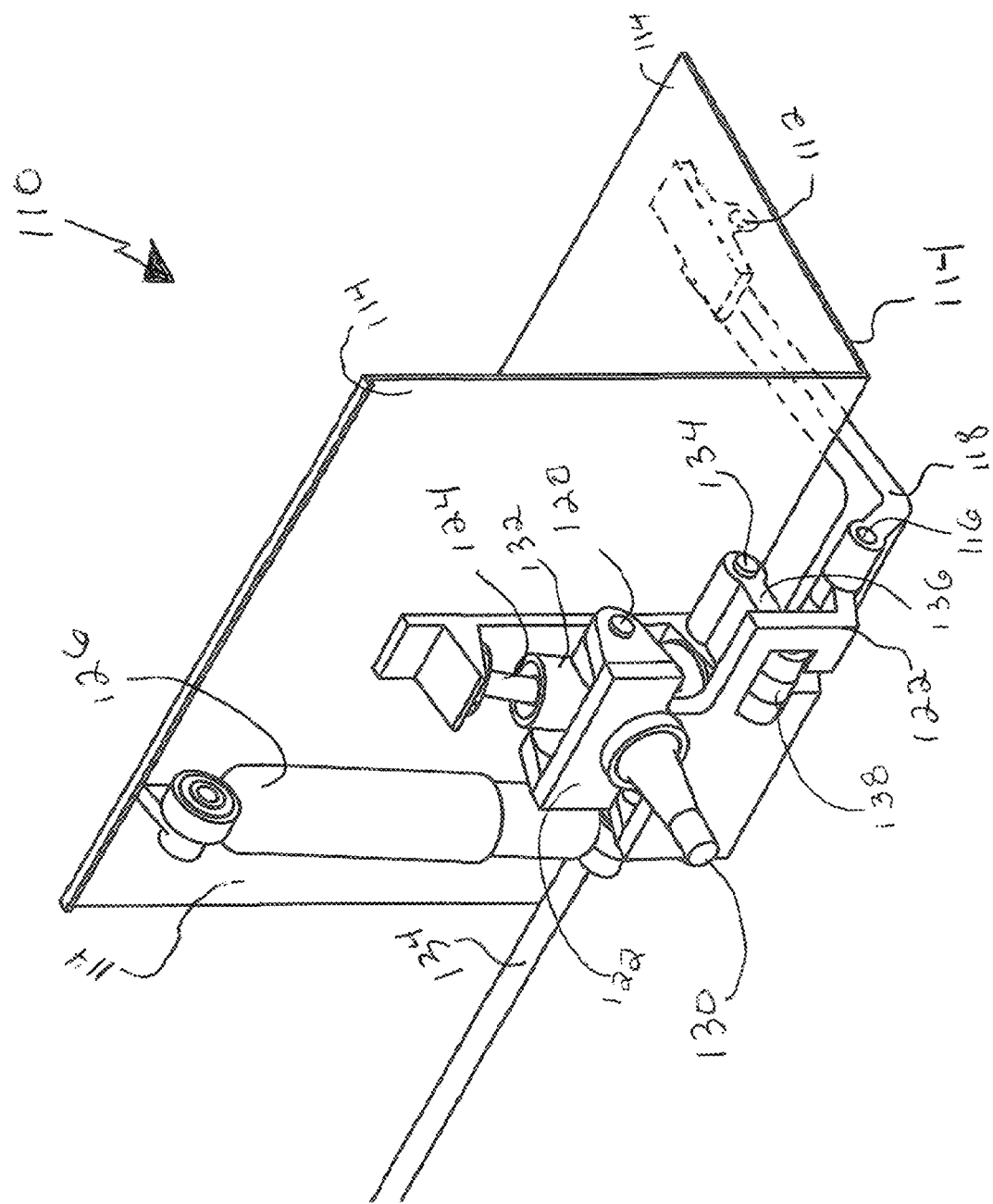
FIG. 7C is a perspective view of the vehicle suspension system of FIG. 7B, showing the arcuate path of the present invention.

FIG. 7C utilizes the same element number but is a perspective view to more clearly illustrate how all the components correspond with one another. Spindle 130 receives the tire 128 for rolling down the road.

Figure 8A:
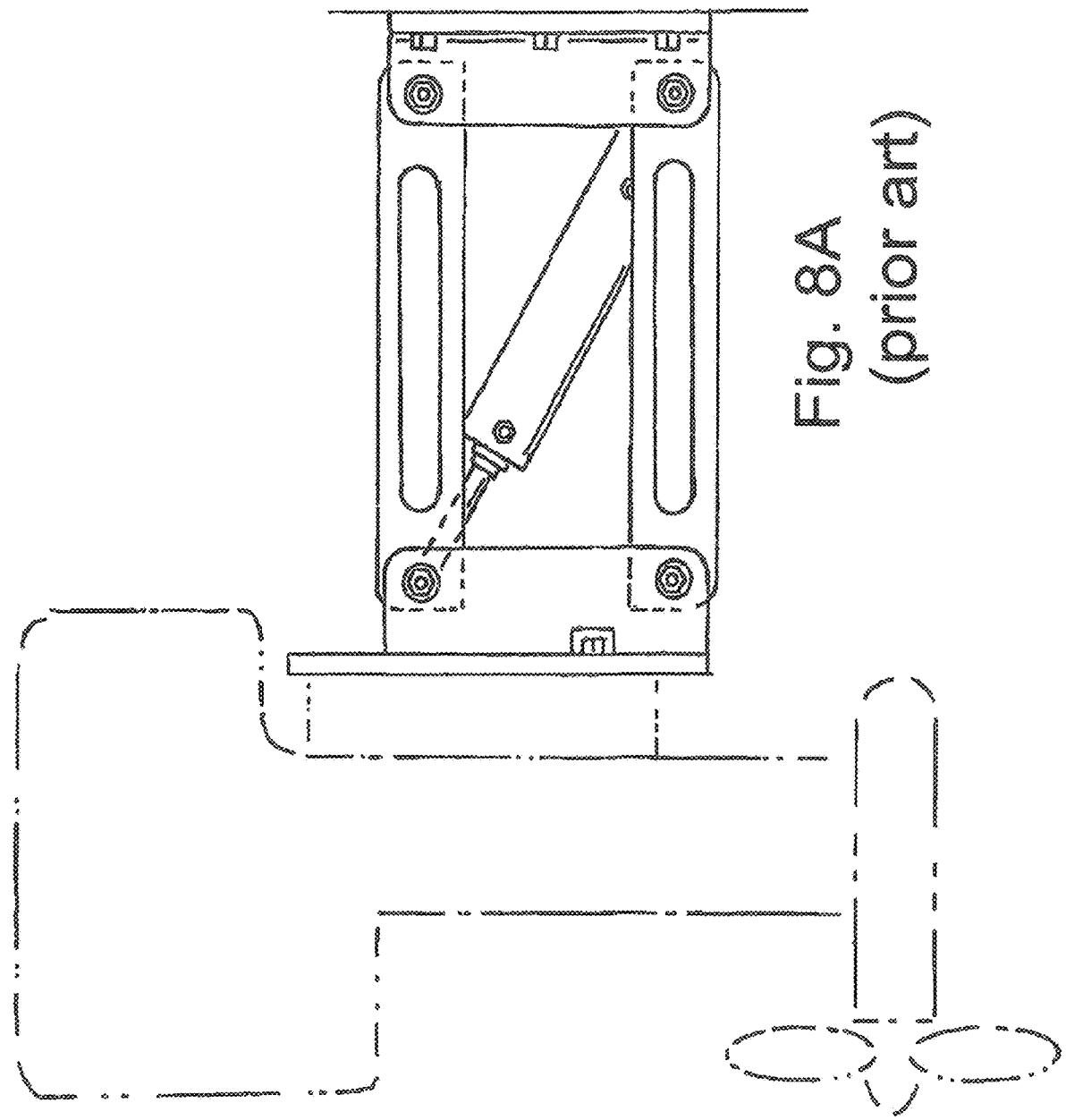
FIG. 8A is a side elevational view of a prior art outboard boat motor positioning system using a conventional quadrilateral.

FIG. 8A shows a prior art jack plate assembly with an outboard motor attached thereto in a parallelogram configuration. As one can imagine, we now substitute the present invention for the prior art parallelogram configuration, and the new invention can be seen in FIGS. 8B and 8C. By replacing the parallelogram with a dynamic triangular movement mechanism in the jack plate assembly of FIG. 8A, we now look at a new aspect generally denoted by the numeral 140. As before, we have a base pivot 142 connected to a base link 144, connector pivot 146 and support link 148. Follower pivot 150 is connected to follower link 152, which in this instance is the motor support frame and it is attached to the motor mount plate 157. Arcuate path 154 is followed by the follower 156. Motor 158 is moved from a first position to a second position by a cylindrical lifting device 159. FIG. 8C shows the dynamic triangular mechanism 140 in a back perspective view for clarification. Similar element numbers are used for similar parts.

Figure 9A:
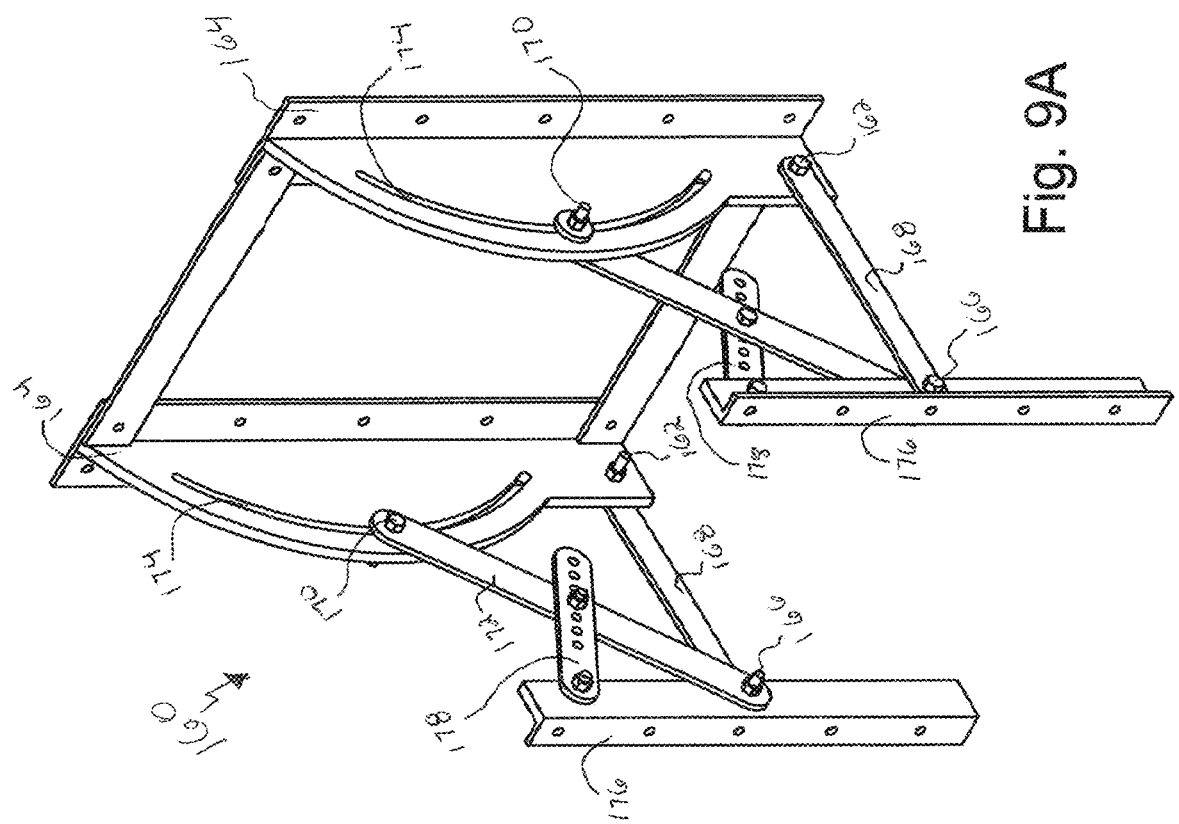
FIG. 9A is a side perspective view of a dynamic triangular movement position changing mechanism made in accordance with the present invention.

FIG. 9A shows a dynamic triangular movement mechanism parallelogram display mount with adjustable horizontal stabilizer link, generally denoted by numeral 160. This configuration is applicable to home goods, business goods, television mounts, picture mounts and the like. In this aspect, the bolts 166, 170 and 162 are the pivots. In intermediate stages of movement pivot bolt 162 is connected to base and wall mount 164, while connector pivot bolt 166 connects support link 168 to follower link 172. Follower pivot bolt 170 follows arcuate path 174 to change the position of vertical display mounting frame 176.

FIG. 9B is a side elevational view of the display mount 161, although it is shown as a fixed horizontal stabilizer link 179. Again, base and wall mount 164 is connected by base pivot and support link 168 to connector pivot bolt 166. Vertical display mounting frame 176 is attached to a fixed horizontal stabilizer link 179 while follower link 172 is in the fully up position. FIG. 9C again illustrates the fixed horizontal stabilizer link configuration 161 of FIG. 9B, although follower link 172 is midway along the arcuate path. FIG. 9D illustrates the same aspect of the present invention but shows the follower link in the most downward position. FIG. 9E illustrates another aspect of the invention with automatic view angle control 177. In this aspect, a shorter follower link and a longer horizontal stabilizer link makes the top tip out when the display mount is in and up position and when the display mount is in a down position. This can make for automatic comfortable viewing. If the television screen is above the viewer, the top of the display tips out away from the wall. If the screen is below the viewer, the bottom of the screen can tip out towards the viewer.

Figure 10A:
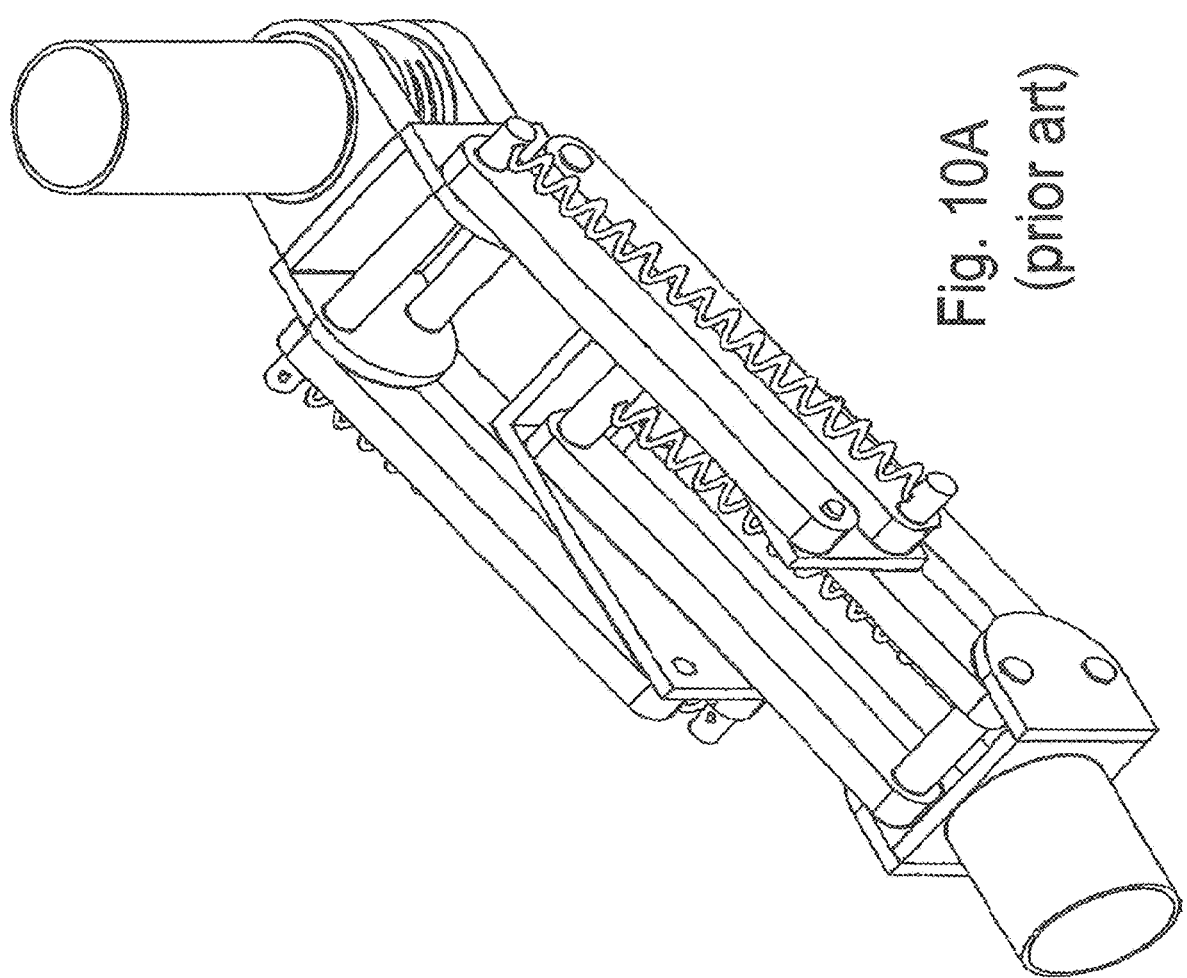
FIG. 10A is a top perspective view of a prior art camera mount vertical stabilizer utilizing a conventional parallelogram/quadrilateral mechanism.

FIG. 10A is a prior art camera mount vertical stabilizer with a conventional parallelogram configuration. FIG. 10B shows how the present invention can be incorporated to replace the parallelogram eight axis vertical stabilizer of the prior art shown in FIG. 10A with a six (6) axis dynamic triangular movement system. A first base pivot 202 is connected to a first base link 204, with a first connector pivot 206 attached to a first support link 208. Note that the prior art parallelogram configuration included 13 links plus a bulky center frame. The center frame replaced the parallelogram and would have as much mass and weight as 8 to 16 links. In order to provide a smooth handheld shot for movies and other professional videos, the industry would find the new configuration desirable because this simplified movement does not require any center frame and achieves the same movement with only 10 links. With a proper final design, there would be significant weight reduction, increasing control without affecting smooth operation.

Still referring to FIG. 10B, first follower pivot 210 is connected to a shared follower link 212 for following a first arcuate path 214. A first biasing spring 216 will provide a smoother operation due to reduced kinetic energy of six fewer links, and the removal of a bulky center frame. A second base pivot 222 is connected to second base link 224 and second connector pivot 226 is connected to the second support link 228. Second follower pivot 230 follows the second arcuate path 234 and is restrained by second biasing spring 236. Looking at this mechanism from another view, FIG. 10C shows the six pivot configuration of the present invention as generally denoted by numeral 200. As this is a side elevational view, it is a bit easier to see where first arcuate path 214 is followed by first follower pivot 210, while second arcuate path 234 is followed by second follower pivot 230. FIG. 10C illustrates the shared follower link 212 in the down position and second follower pivot 230 in an up position.

Figure 10D:
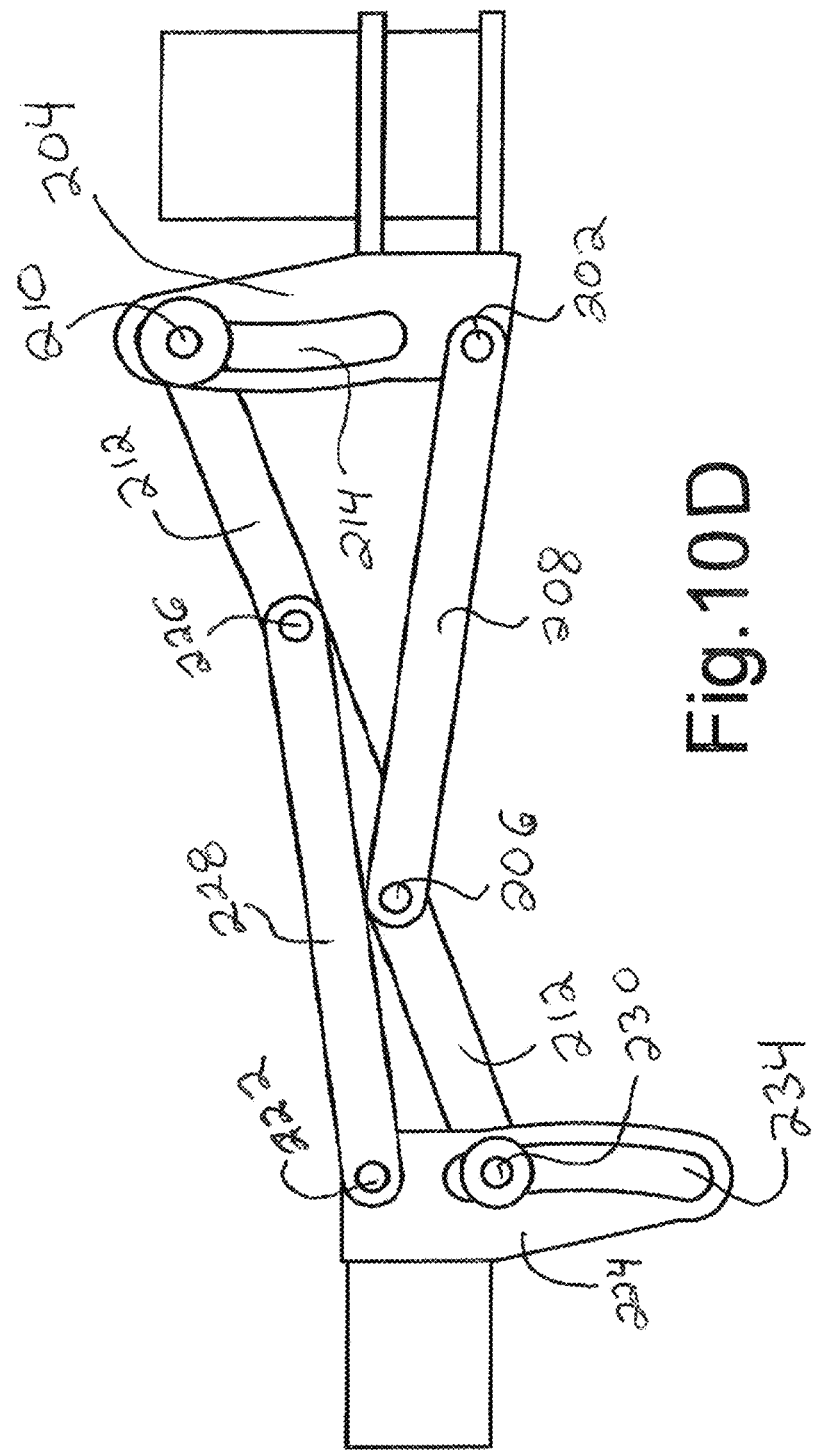
FIG. 10D is a side elevational view of the camera mount vertical stabilizer of FIG. 10C, with a replacement of the conventional parallelogram/quadrilateral mechanism with a dynamic triangular movement of the present invention in the up position.
Figure 10E:
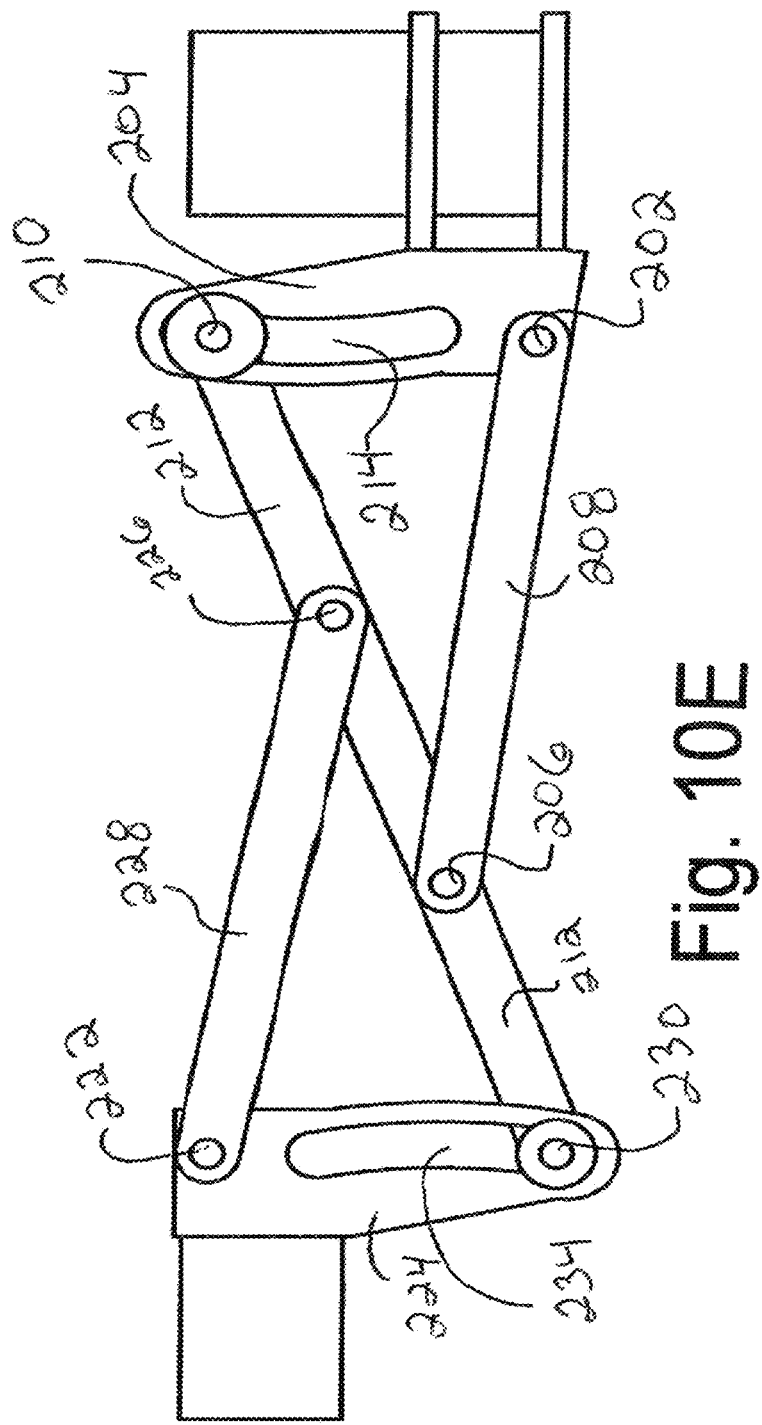
FIG. 10E is a side elevational view of the camera mount vertical stabilizer of FIG. 10C, with a replacement of the conventional parallelogram/quadrilateral mechanism with a pair of dynamic triangular movements of the present invention in the up position.

FIG. 10D, still referring to the same aspect, shows first follower pivot 210 in the up position while second follower pivot 230 remains in its up position. Looking next to FIG. 10E, first follower pivot 210 is in the up position while second follower pivot 230 is now in the downward position.

Figure 11A:
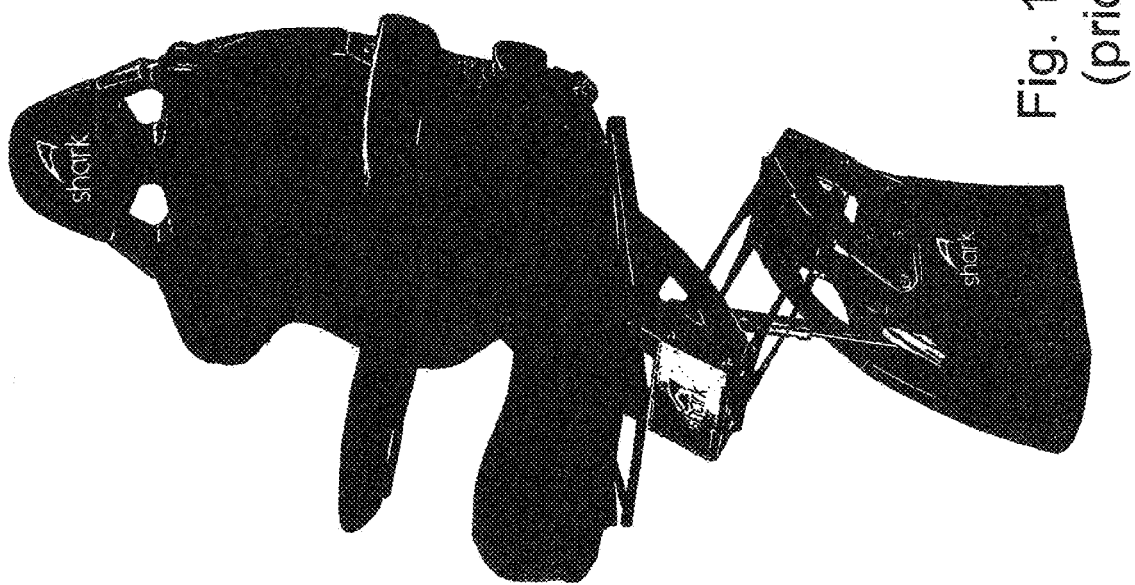
FIG. 11A is a view of a prior art seat suspension system.

FIG. 11A is an illustration of a prior art adjustable seat platform utilizing a quadrilateral parallelogram seat adjustment. With combined reference to FIGS. 11B-F, there is shown a dynamic triangular movement mechanism five axis parallelogram plate movement with shared connector pivot axis and shared follower link. It is generally denoted by the numeral 240 and would act as a replacement for the adjustable seat platform of FIG. 11A, providing greater stability, less weight and more adjustability. FIG. 11B includes a first base pivot 242 attached to a first base link 244. First base link 244 is mounted to the surface onto which the object being supported is mounted. A first connector pivot 246 is connected to a first support link 248. Shared follower pivot axis 250 is directed by first follower rollers 256 through first arcuate path 254.

FIG. 11C shows the dynamic triangular mechanism in a fully closed or retracted position. Second base pivot 262 is connected to second base 264, allowing second support link 268 to move with regards to second connector pivot 266 which is pivotally connected to shared follower link 252. Second follower 276 is shown in greater detail with regards to FIG. 11D, which is generally indicated by numeral 280. Shared follower pivot axis 250 allows first follower rollers 256 that are supported by first follower 258 to follow the path. FIG. 11E is a side elevational view of the mechanism of FIGS. 11B through 11D, indicating the relative placement of all the parts. A washer or bearing 260 is located between shared follower pivot axis 250 to, first follower 258, and second follower 276. Second connector pivot 266 is pivotally connected to shared follower link 252.

Figure 11F:
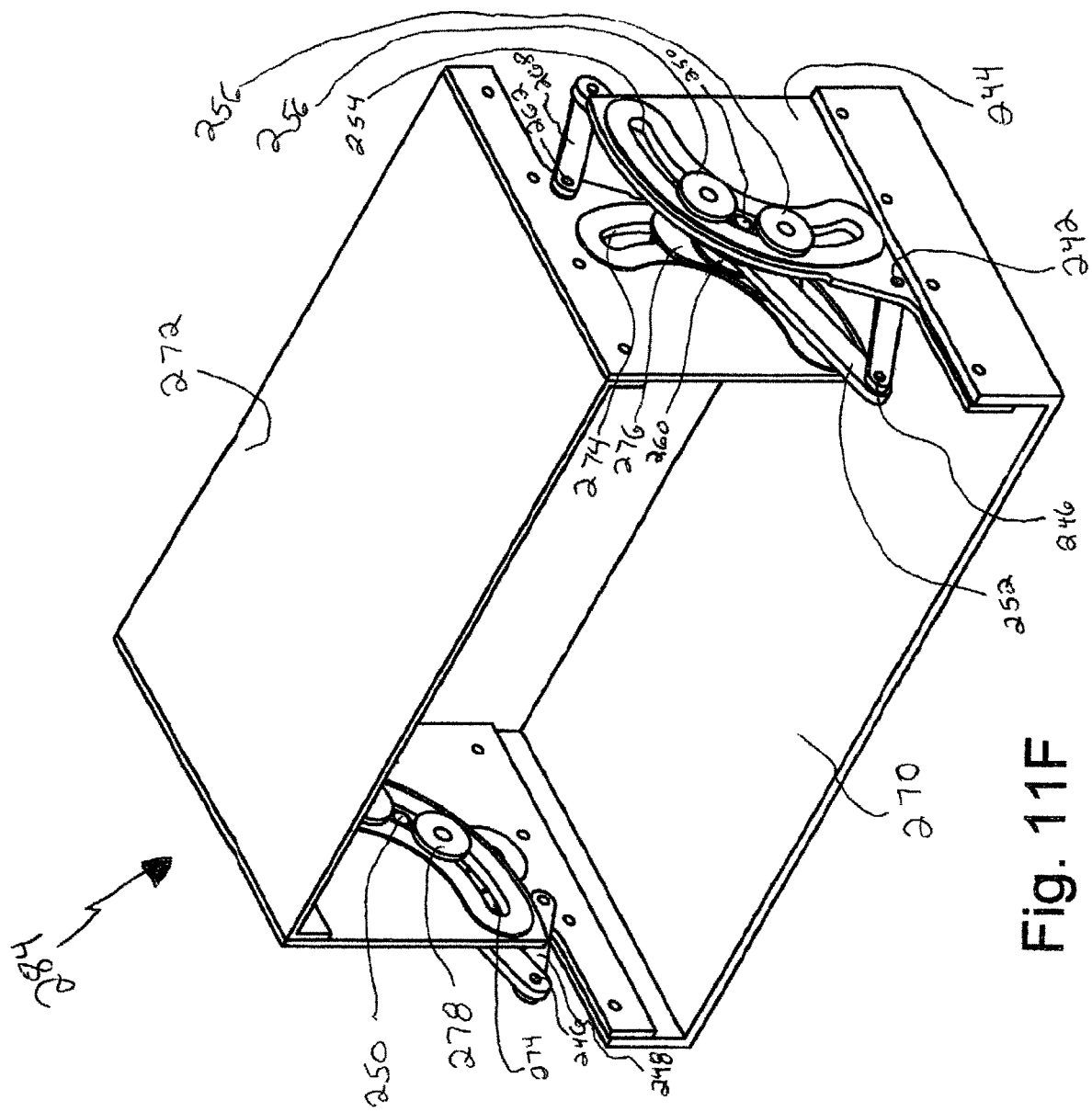
FIG. 11F is a perspective view of the dual dynamic triangular movement in a lifting platform aspect.

Looking now to FIG. 11F, the dynamic triangular mechanism of FIGS. 11B-11E are shown in relation to a platform lifting aspect of the present invention. The lifting platform is generally denoted by numeral 284, and includes a surface 272 for supporting anything and positioning the same. In this aspect, a second arcuate path 274 is the path for second follower 276, movable by second follower rollers 278.

Figure 12A:
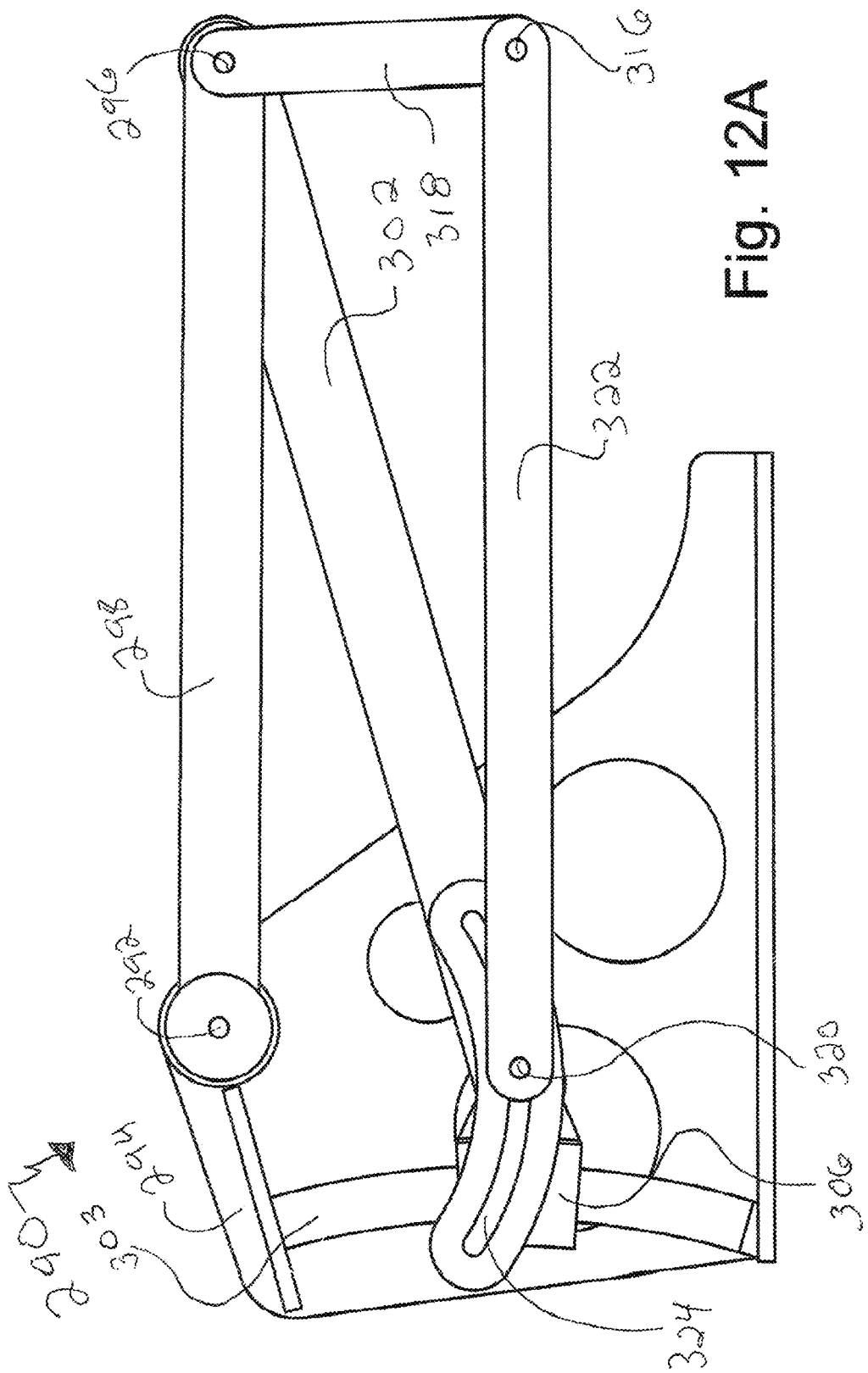
FIG. 12A is a side elevational view of another aspect of the present invention.

FIG. 12A shows yet another aspect of the present invention incorporating a dynamic triangular parallelogram like movement, five axis, independent horizontal and vertical position change system generally denoted by numeral 290. This aspect of the present invention separates vertical and horizontal motion of one plane substantially into two separate three axis arcuate parallelogram movement systems with one pivot and one link being shared. In this aspect, the base pivot 292 is pivotally connected to a vertical base link 294. Vertical follower link 298 has a shared access 296 of vertical connector pivot and horizontal base pivot. Vertical support link 298 is connected by vertical follower pivot 300, shown in FIG. 12B, because it cannot be seen in FIG. 12A as it is covered by horizontal follower link 322 and horizontal base 302. Arcuate bar 303 creates the vertical arcuate path that is rigidly connected to the vertical base 294. As horizontal follower link 322 is moved by horizontal follower pivot 320 along horizontal arcuate path 324, horizontal support link 318 is repositioned. Vertical follower 306 follows the arcuate bar 303 to create the vertical arcuate path 304.

Figure 12B:
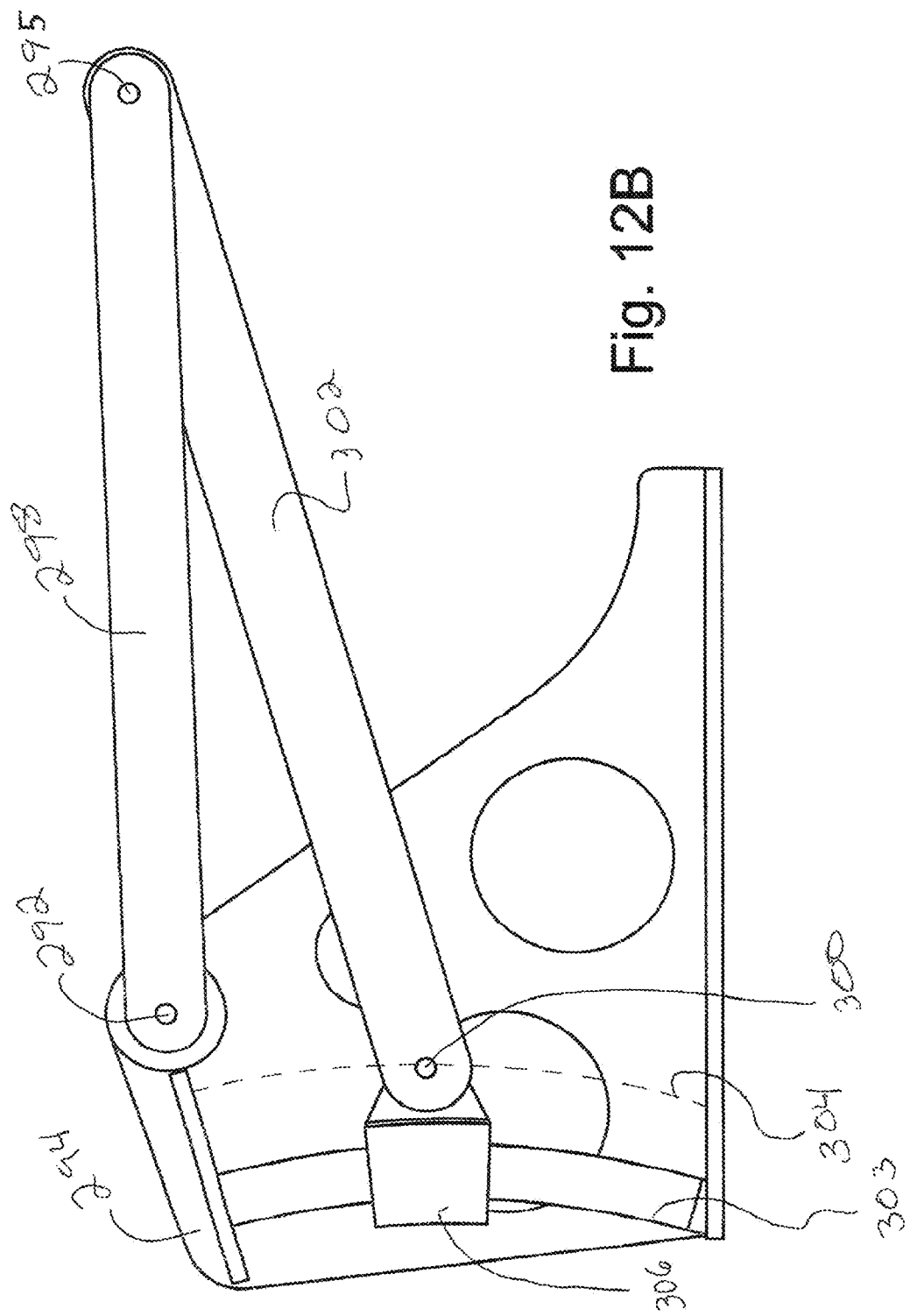
FIG. 12B is a side elevational view of an arcuate path aspect of the present invention.

FIG. 12B is a simplified illustration of the mechanism of FIG. 12A, because horizontal follower link 322 and horizontal arcuate path 324 have been removed. Now that the horizontal movement links have been removed for visibility, one can see the vertical connector pivot 295 that pivotally connects vertical support link 298 to vertical follower link 302. Vertical follower pivot 300 is now visible and is pivotally connected to vertical follower 306.

Figure 12C:
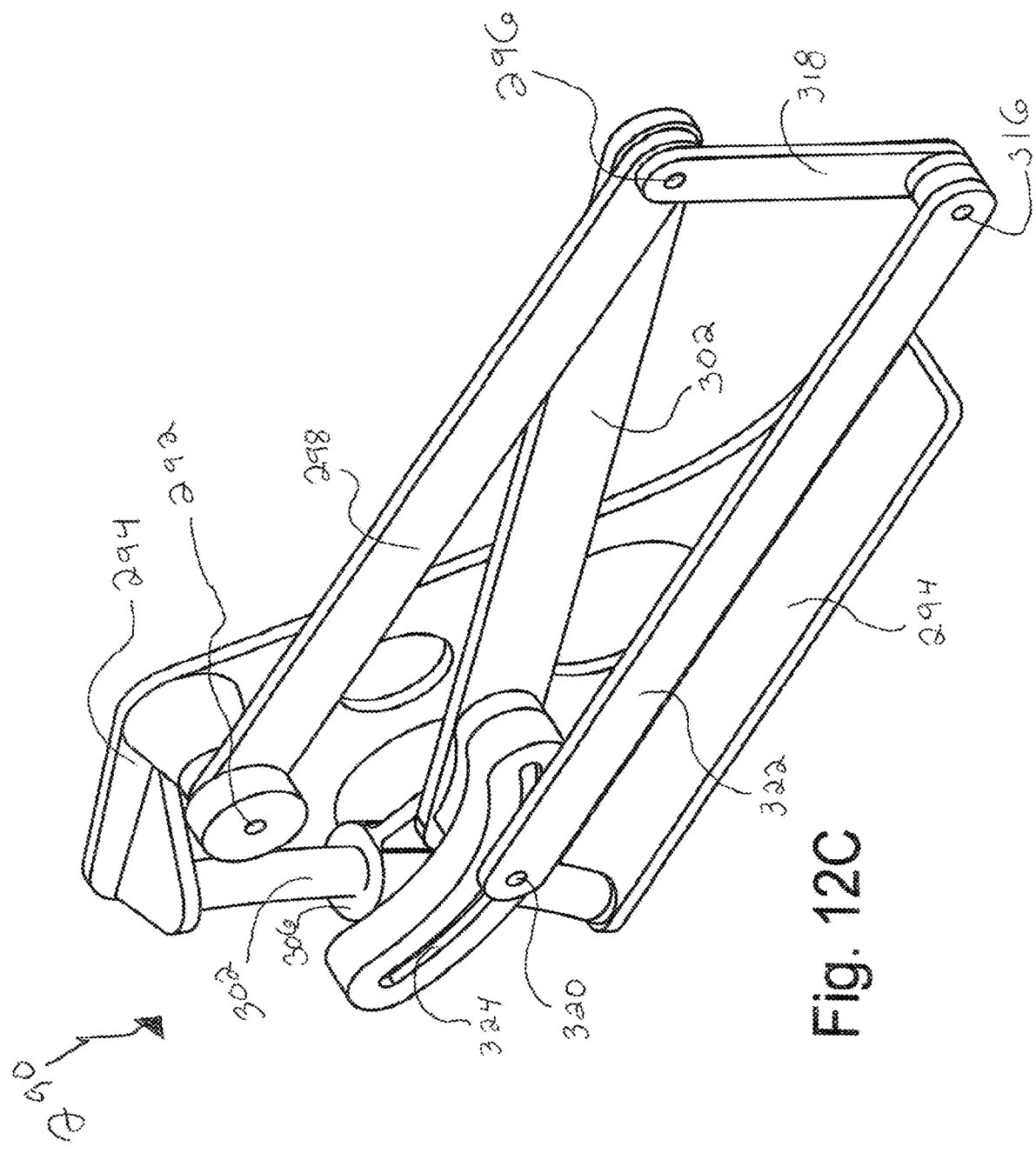
FIG. 12C is a side perspective view of another aspect of the present invention.
Figure 12E:
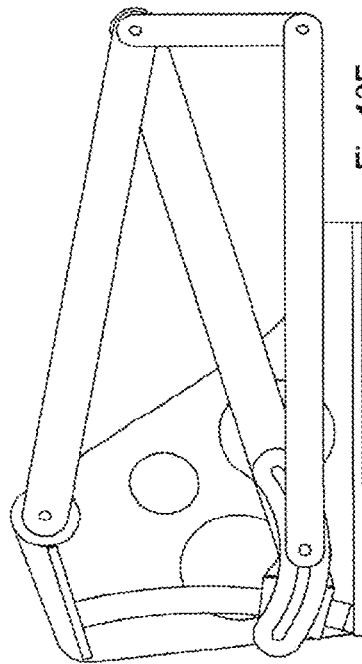
FIG. 12D-G show a dual path dynamic triangular movement in various positions.
Figure 12G:
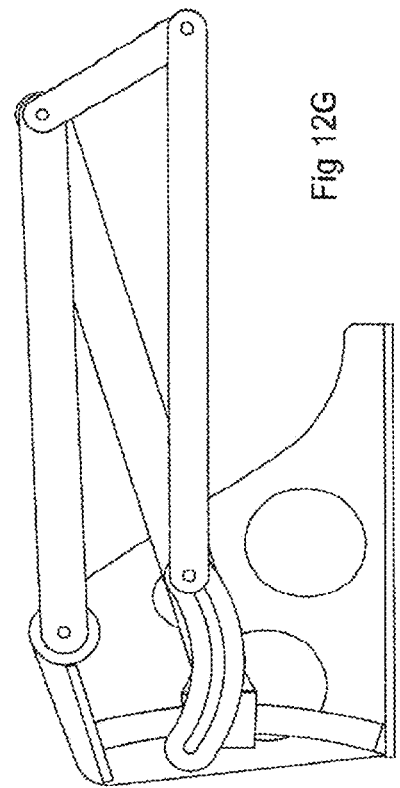
Figure 12D:
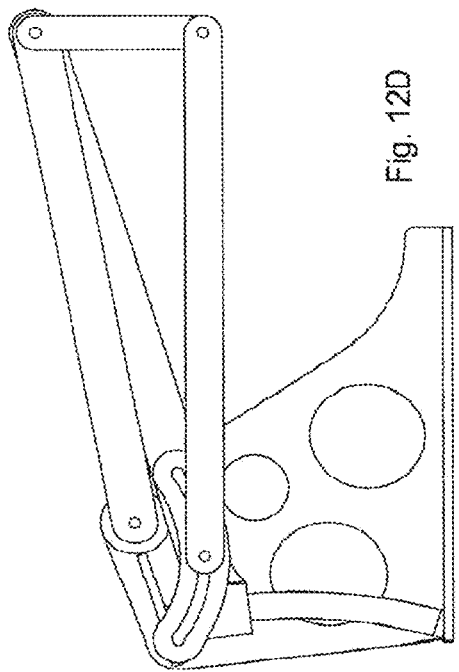
Figure 12F:
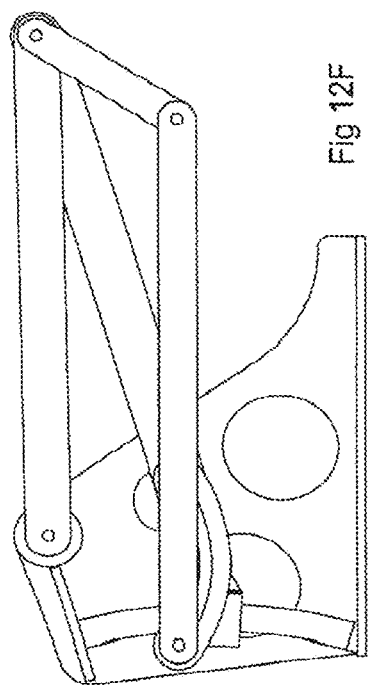
Figure 12H:
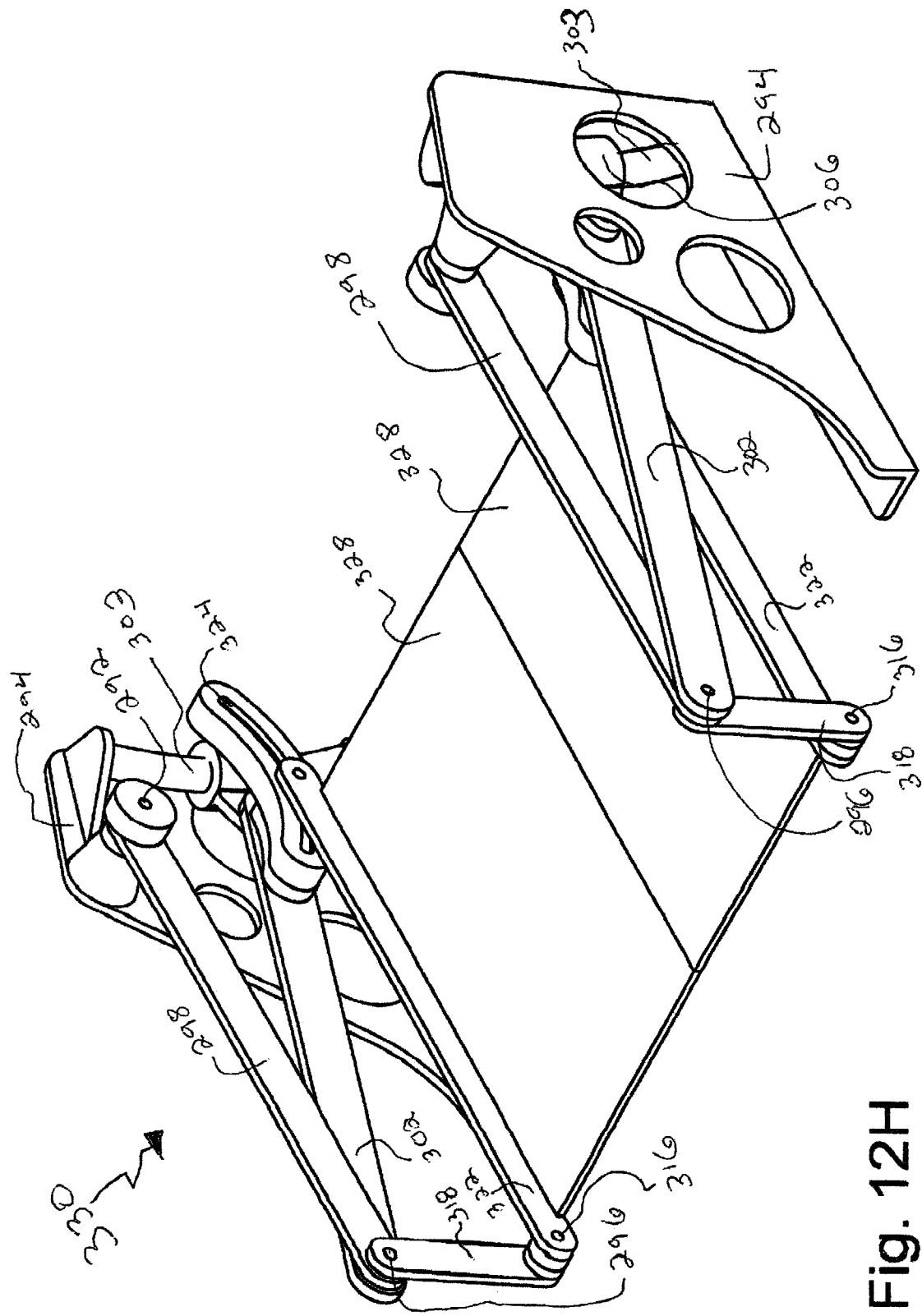
FIG. 12H is a perspective view of the dual dynamic triangular movement of FIGS. 12D-G in another aspect of a vehicle seat platform.
Figure 12I:
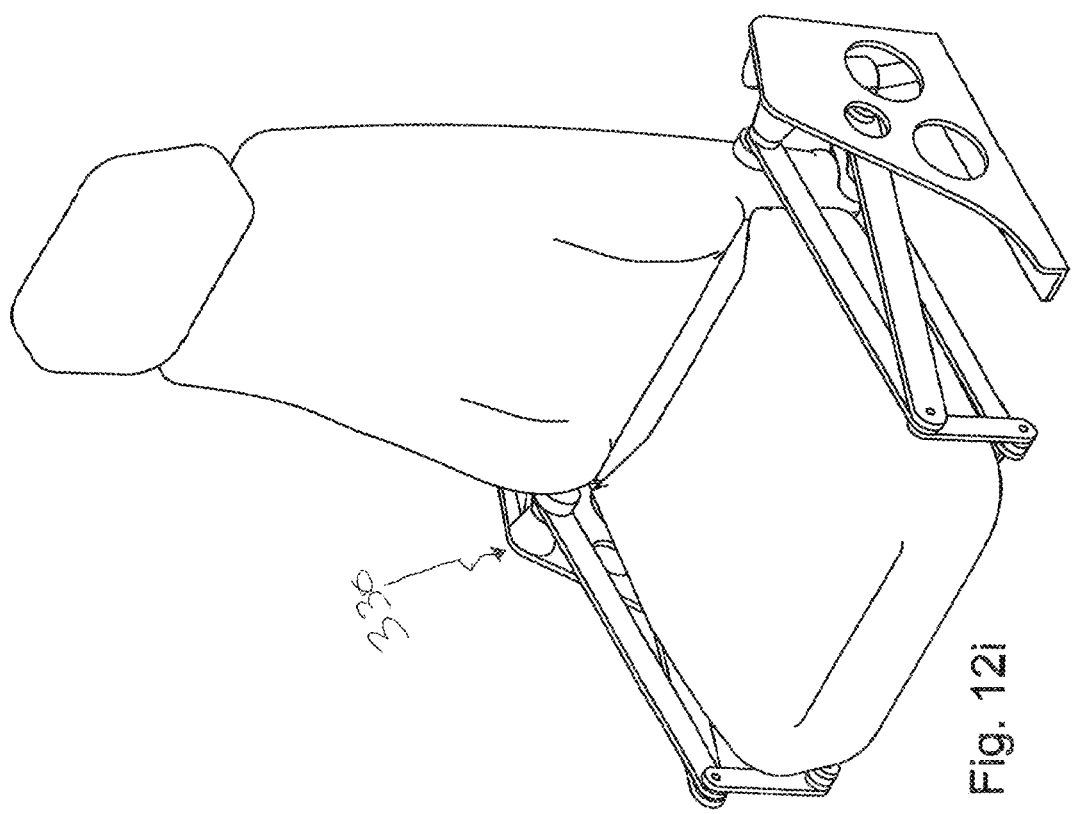
FIG. 12I is a perspective view of the dual dynamic triangular movement of FIG. H in another aspect of a vehicle seat platform with the vehicle seat thereon.

FIG. 12C is a perspective view of the mechanism of FIG. 12A, more clearly illustrating that mechanism. FIG. 12C is another perspective view of FIG. 12A for clarity. FIGS. 12D-12G illustrate the relative movement of this aspect of the present invention.

Figure 13A:
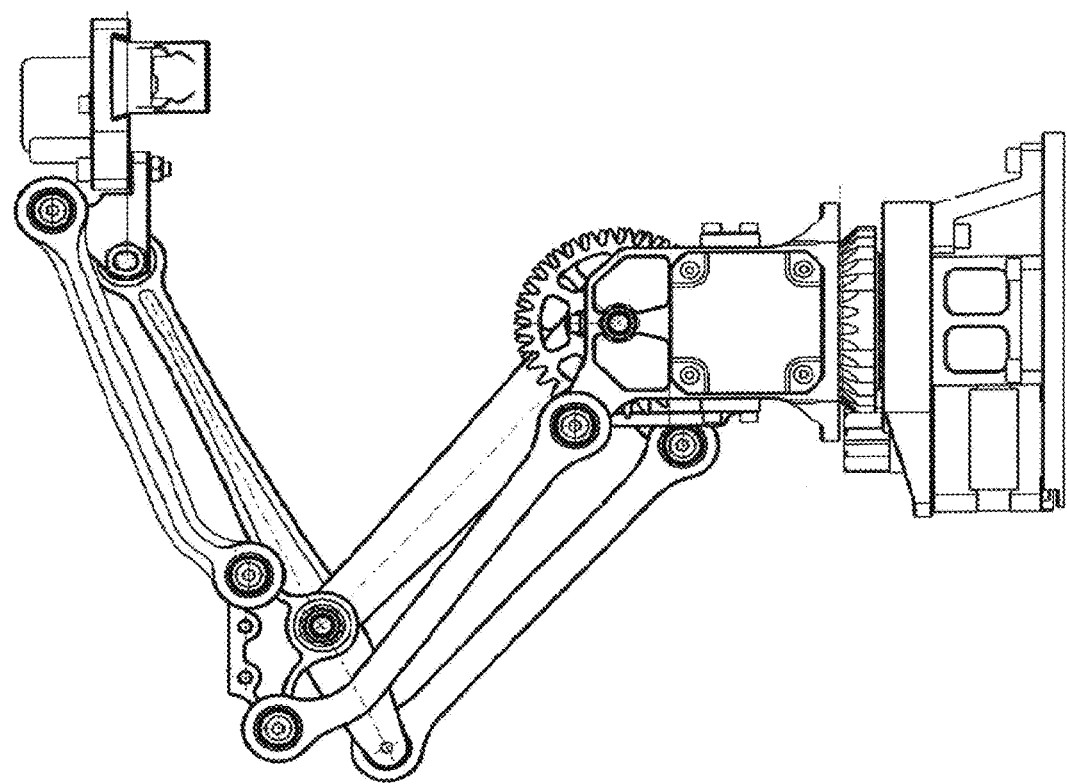
FIG. 13A is a side elevational view of a prior art robotic arm with a parallelogram position moving system.
Figure 13B:
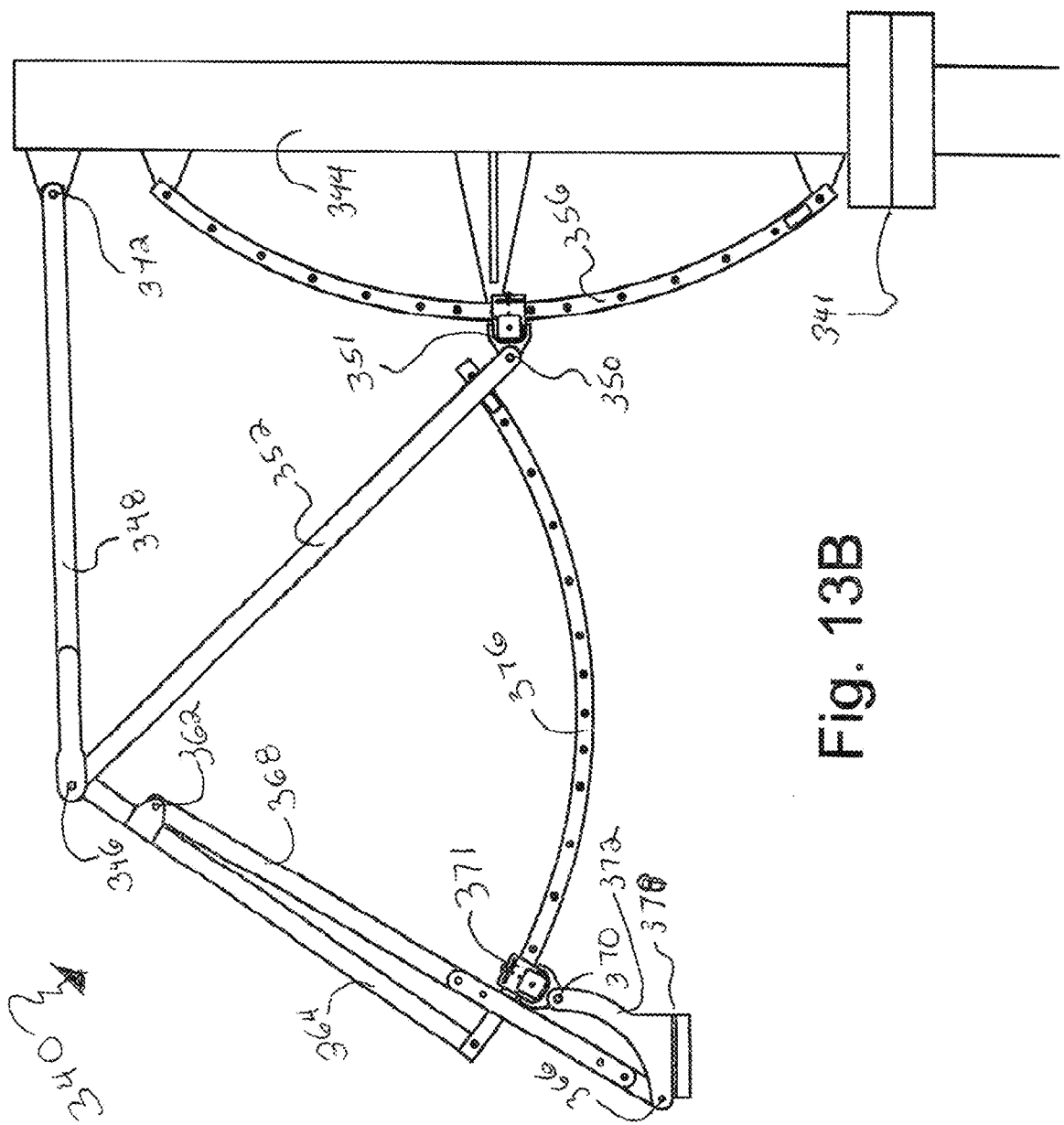
FIG. 13B is a side view of a dual arcuate path dynamic triangular movement made in accordance with the present invention.
Figure 13C:
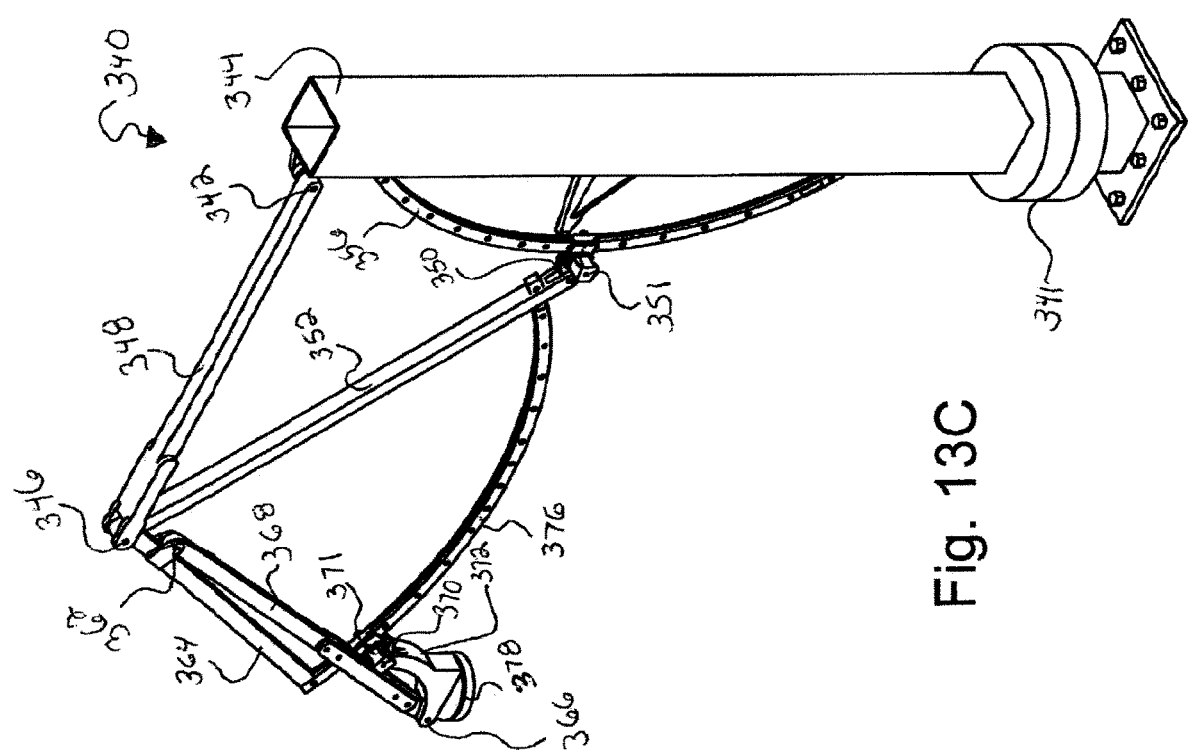
FIG. 13C is a perspective view of the dual arcuate path dynamic triangular movement of FIG. 13B.
Figure 13D:
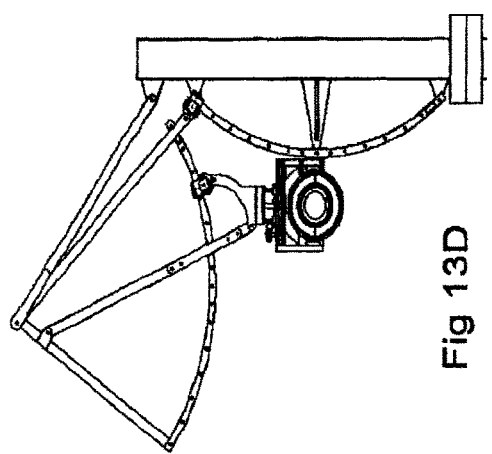
FIGS. 13D-13G are side views of FIG. 13C showing relative motion and position.
Figure 13E:
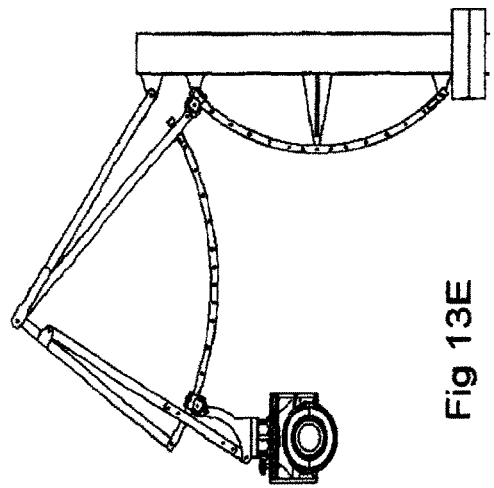
Figure 13F:
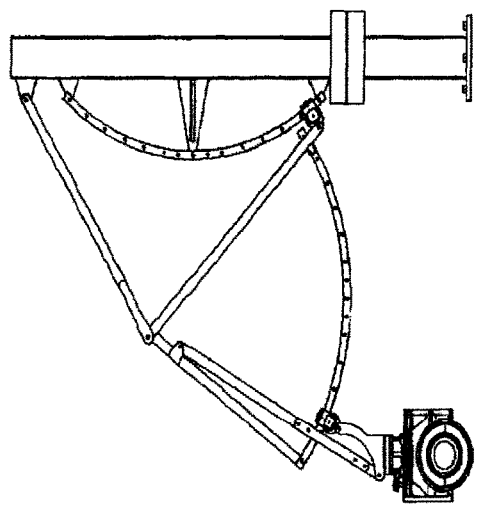
Figure 13G:
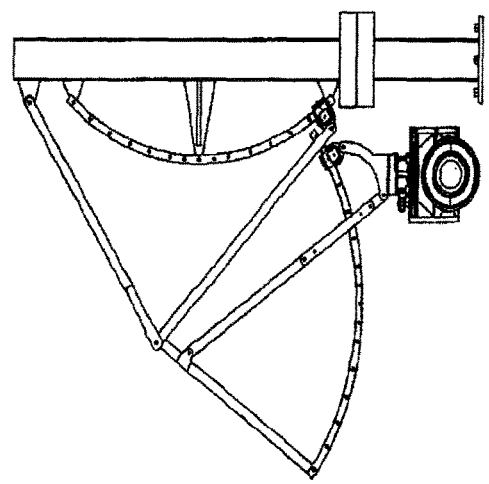

FIG. 13A illustrates a prior art robotic arm utilizing a quadrilateral movement system. FIG. 13B shows yet another aspect of the present invention, generally denoted by numeral 340. A first joint 341 provides 360° of rotation about the base link 344. A second joint base pivot 342 pivotally connects support link 348 to base 344. At the distal end of support link 348, connector pivot 346 simultaneously pivotally connects follower link 352 to a swinging arm acting as base link 364, which is also rigidly connected to arcuate bar 376. Drive system follower 371 is pivotally connected to follower link 372 by follower pivot 370. Support links 368 pivots on base pivot 362 and connect to follower link 372 by connector pivot 366. Follower link 350 to is connected to drive system follower 351 by follower pivot 350. Drive system follower 351 is guided along arcuate bar 356 four up and down movement relative to base 344. As can be seen in FIGS. 13B and 13C, there is great flexibility in positioning for a robotic arm. First joint 341 provides total rotation about a 360° axis, while a first and second drive system, 351 and 371, respectively, provide up and down movement, as well as in and out movement. A fourth joint 378 provides for total rotation about the head of follower link 372. The platform underneath the fourth joint 378 provides a location for a mount for an end of arm tooling and rotation of 360°. FIGS. 13D through 13G illustrate a multitude of positions capable with the mechanism detail hereinabove with regard to FIGS. 13B and 13C. FIGS. 13D-13G are included to show the relative movement during a position change when utilizing the present invention.

Still referring to FIGS. 13A-13G, while some of the followers control orientation for the purpose of positioning, the follower pivot on a desired nonlinear path is not in the center of motion of the follower. Nor will it lock the follower pivot in position. Base pivot 12 connects the base and support links, 14 and 18 respectively.

Figure 14A:
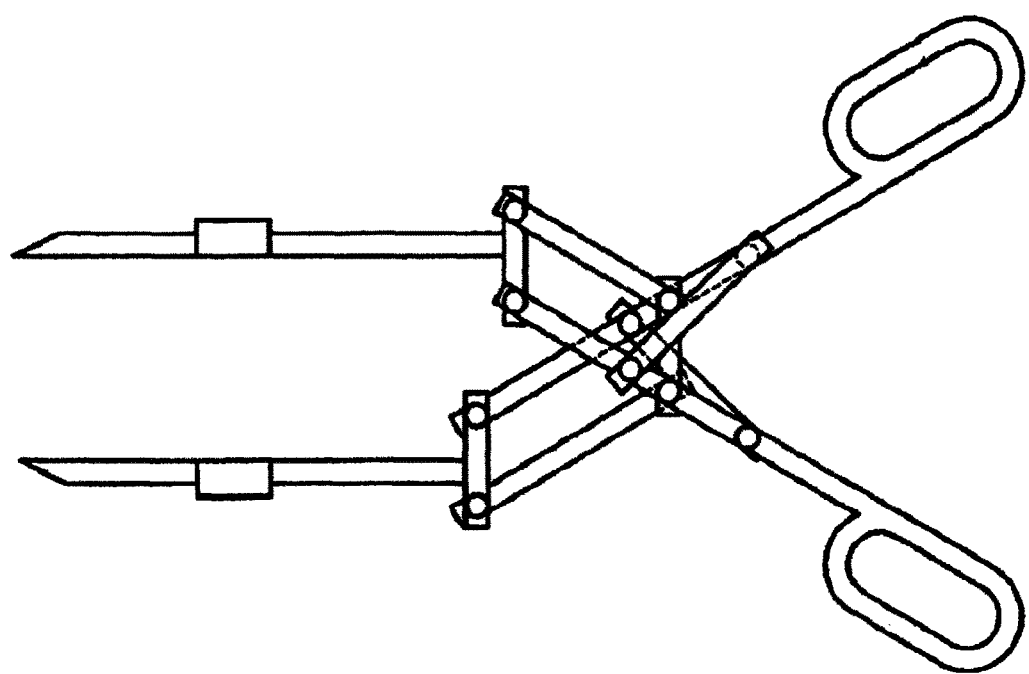
FIG. 14A illustrates a pair of prior art forward thrusting scissors.
Figure 14B:
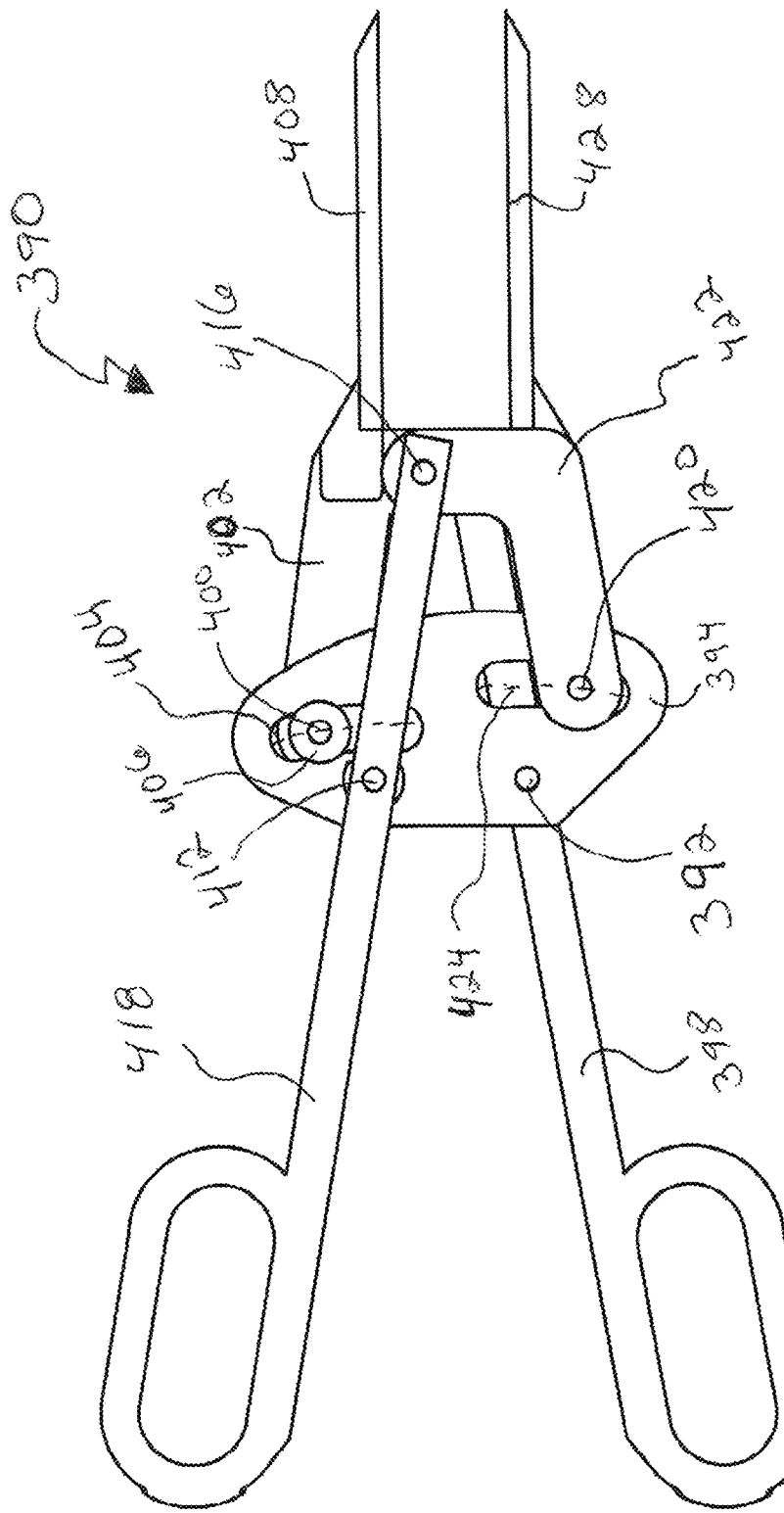
FIG. 14B shows the scissors of FIG. 14A, but with replacement dynamic triangular movement.
Figure 14D:
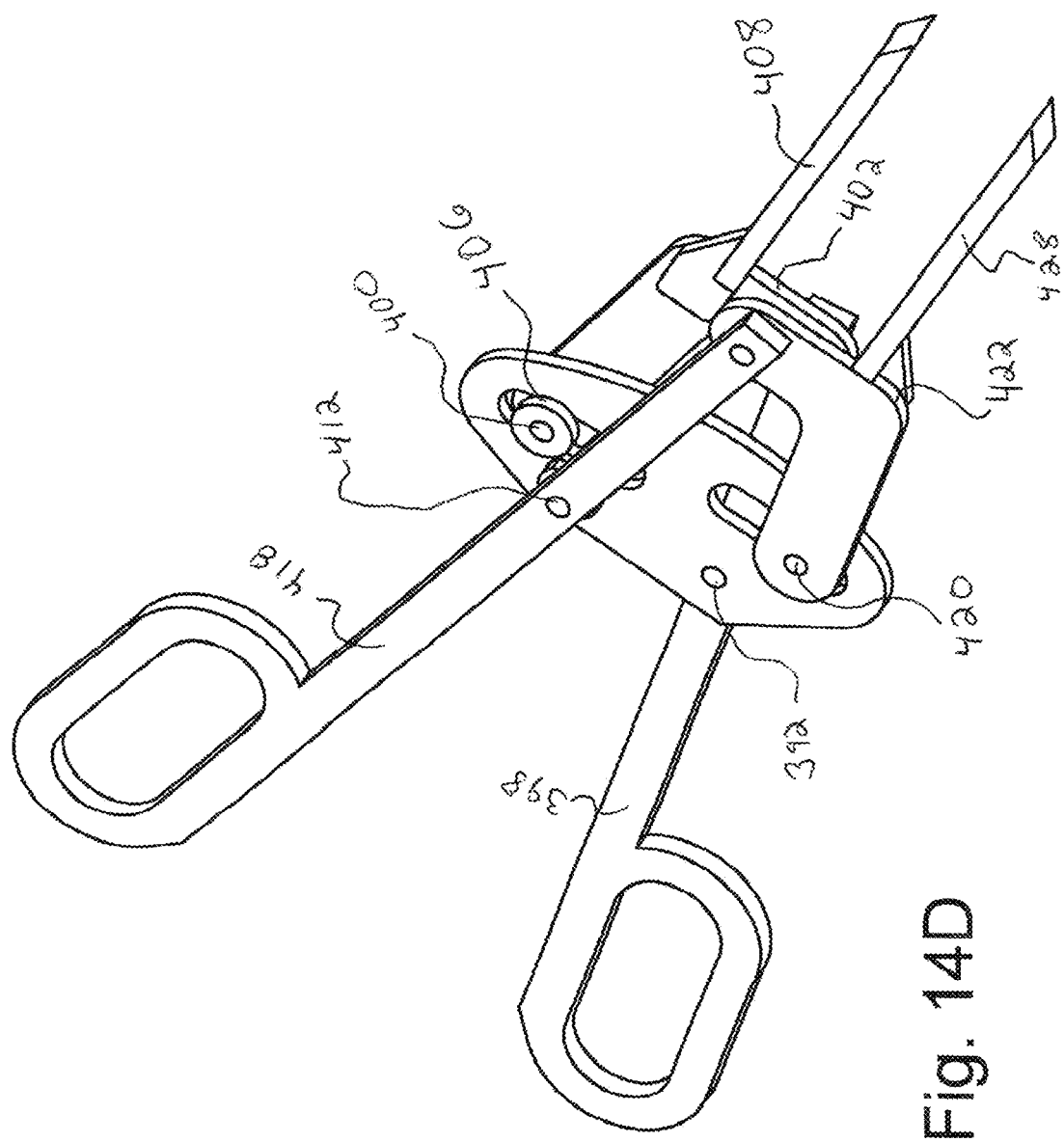
Figure 14E:
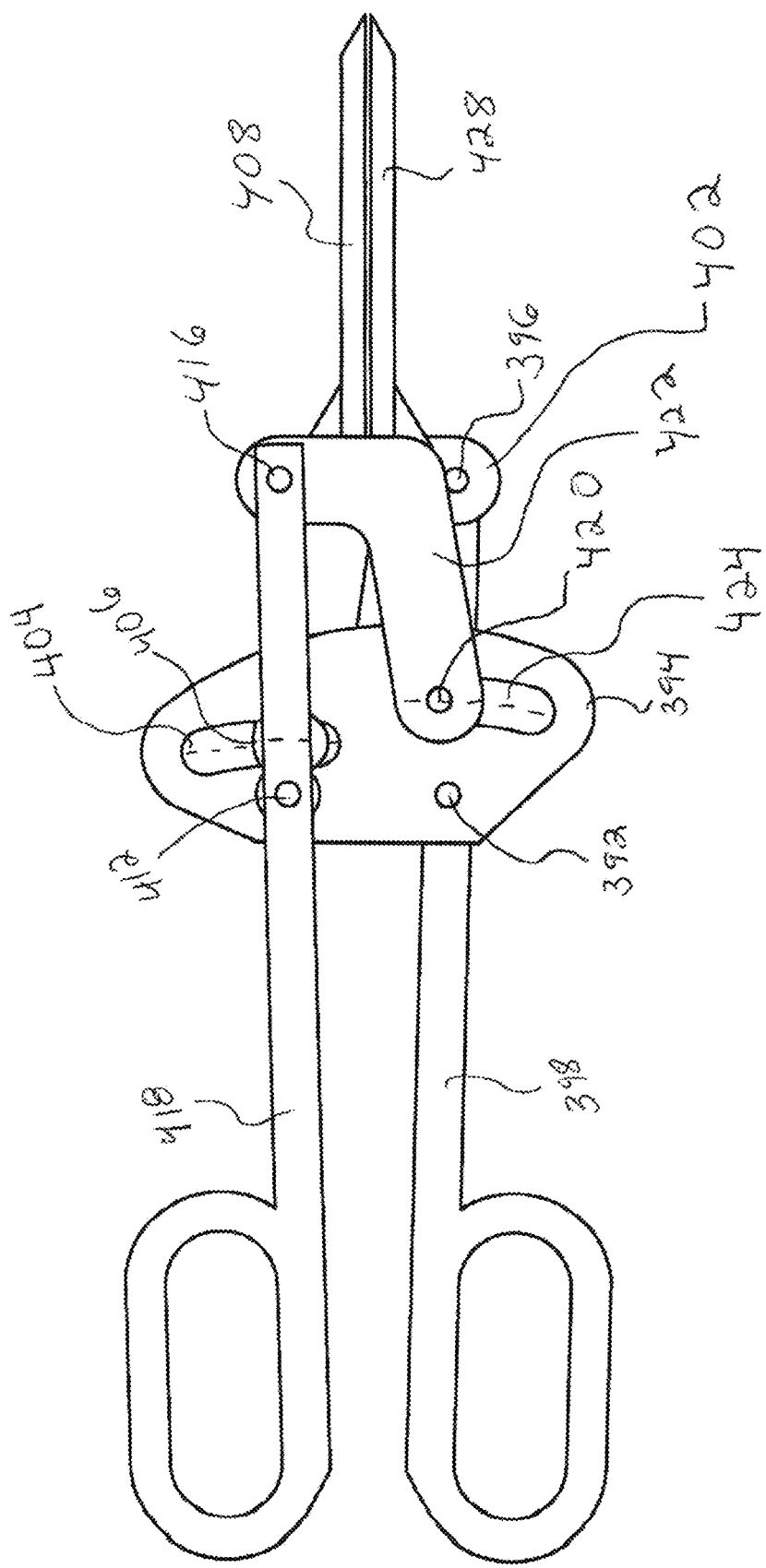

FIG. 14A shows a prior art set of handheld parallel grippers, incorporating a typical parallelogram movement system. With combined reference to FIGS. 14B-E, there is illustrated a medical device including a pair of handheld parallel grippers generally denoted by numeral 390. In this aspect, the parallelogram configuration of FIG. 14A has been replaced by the present invention. Note that the original medical application for the parallelogram grippers had 10 pivot points. The present invention simplifies the ability of the grippers to perform the function. Parallel grippers 390 include a common base 394 attached to a right base pivot 392 which is then connected to right support link and handle 398. A right follower pivot 400 is attached to a right follower link 402 in order to follow along right arcuate path 404 by right follower roller 406. Right gripper 408 is thereby capable of coming closer to left gripper 428. As can be seen, left base pivot 412 connects left support link 418 to left connector pivot 416. Left support link 418 is connected to left follower link 422, which in turn is connected to left follower pivot 420. Left arcuate path 424 guides left follower roller 426 to change position of left gripper 428.

FIG. 15A right connector pivot housing 436 is pivotally connected to right support link 438. This illustrates a dynamic triangular seat positioning and support system generally denoted by numeral 430. FIG. 15A shows a seat positioning system adapted for adjustable motorcycle seats and all-terrain vehicles. Seat support base 442 also acts as the follower link for this triangular seat positioning system. A right base pivot housing 432 is integral with a base 434, which surrounds and houses base pivot crossmember 446. Base pivot crossmember 446 is rigidly attached and pivotally connected to base 434 by the right base pivot housing 432 and the left base pivot housing 452.

Right arcuate path 444 guides driver motor 466 to adjust the seat. Connector pivot crossmember 448 is held in place rigidly by crossmember housing 445. Follower pivot crossmember 450 is rigidly connected to follower pivot crossmember end gear 449 and is pivotally connected to follower pivot. As shown in detail in FIG. 15B, path gear 451 guides follower drive motor 466 into position. In order to provide a synchronous and simultaneous movement along their respective paths, left base pivot housing 452 and left connector pivot housing 456 are integrated with left support link 458.

Figure 16A:
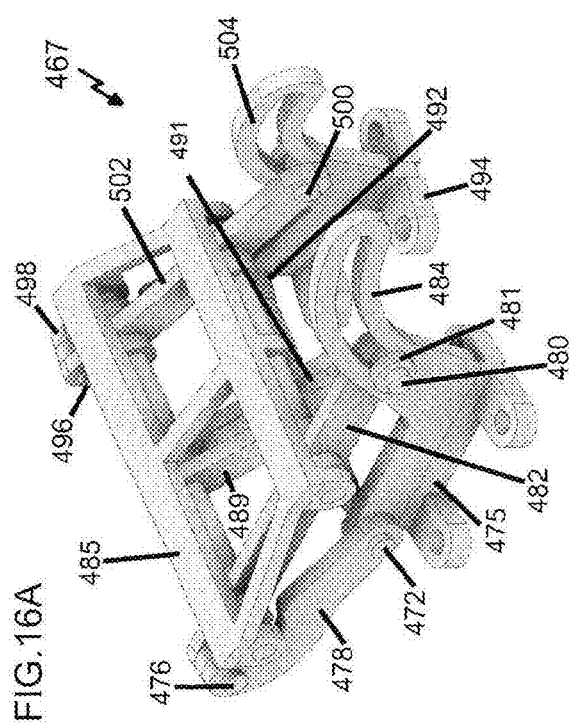
FIG. 16A shows a perspective of yet another aspect of the arcuate path aspect of the present invention.
Figure 16B:
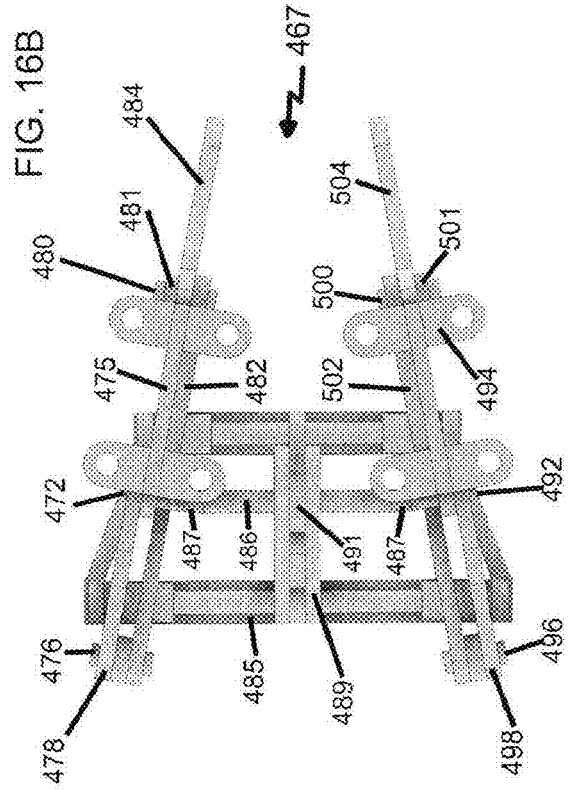
FIG. 16B shows a top plan view of yet another aspect of the arcuate path aspect of the present invention.

FIGS. 16A and 16B illustrate an aspect of the dynamic triangular movement mechanism system that creates a single parallelogram like movement from two parallelogram movements that are not parallel to one another. In this aspect, these 23 axis arcuate parallelogram movement systems are set 20° off parallel from one another. Alterations may be made for clearance issues, in order to support a surface between them efficiently, and to utilize a crossmember to synchronize their movements. FIG. 16A may be used for positioning platform that is made of two complete and separate dynamic triangular movement mechanism that are not parallel to one another. This system is generally denoted by the numeral 467, and is oriented to be made of two dynamic triangular movements that are not parallel to one another. Right base of 475 is connected via base pivot 472 to right support link 478 and right connector pivot 476. Connected to right follower pivot 480 and right follower 481 is right follower link 482 which is guided along right arcuate path 484. Supported surface 485 is parallel to base pivot crossmember 486 and crossmember 486 is pivotally connected by base pivot CPU joint 487 to left base pivot 492. Supported surface centering link 489 connects centering roller on the base crossmember 491 to support surface 485 to keep it centered. Left base pivot 492 connects the left base 494 to left connector pivot 496 this in turn is pivotally connected to left support link 498. Left follower pivot 500 connects left follower 502 to left follower 501 by left follower pivot 500, which follows right arcuate path 504. By this mechanism, synchronous position change follows the left and right arcuate paths 484 and 504 simultaneously.

Figure 17A:
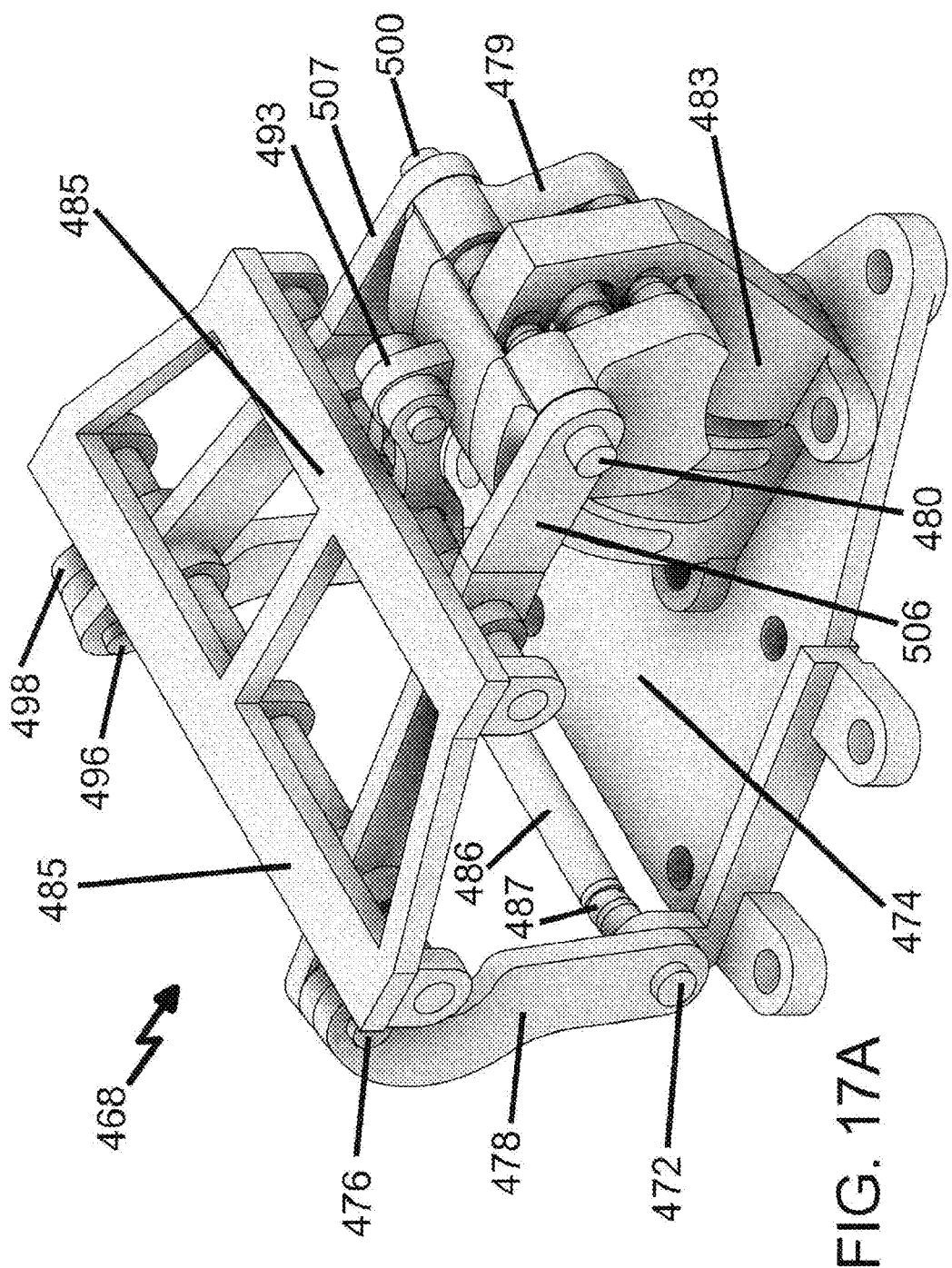
FIG. 17A shows a perspective of yet another aspect of the arcuate path aspect of the present invention.

Looking next with combined reference to FIGS. 17A and 17B, there is another aspect shown of the mechanism of FIGS. 16A and 16B. A platform 485 is to be positionable by use of the dynamic triangular movement mechanism with relation to a base 474.

FIG. 17A is a perspective view of the Parallelogram Movement System made of two Dynamic Triangular Movements that are not parallel to one another, although they share an arcuate path and follower. FIG. 17B is a Top view of the same and utilizes the same element numbers for like components.

Assembly 468 shown in FIGS. 17a and 17b are quite similar to FIGS. 16a and 16b except there is one arcuate path between the pair of dynamic triangular movements that operate in parallel though they are not parallel to one another. Most elements operate precisely as they did in FIGS. 16A and 16B.

The difference with FIGS. 16A and 16B is that right and left follower links are now bent to accommodate one wider follower and the arcuate path assembly. A new base 474 includes right base pivot 472 and left base pivot 492 and shared arcuate path body 483 is rigidly mounted to base 474. Shared follower 479 moves along the arcuate path body 483 as shown in FIGS. 17D though 17F and described later. Left follower pivot 500 and right follower pivot 480 are fixed to the right and left sides respectively of shared follower 472. Centering link and pivoting bracket 493 are connected to shared pivot 479 and supported surface 485 in such a way as to keep supported surface 485 centered. The rest of the elements function as they did in FIGS. 16A and 16B FIG. 17C is a perspective view of eight dynamic triangular movement systems as shown in FIGS. 17A & 17B in a circular arrangement. FIG. 17E is a perspective view of the shared arcuate path and follower assembly 503 shown in FIGS. 17A and 17B. FIG. 17D is a perspective view of 503 without one side of the follower 505 to show the detail inside. FIG. 17F is a side elevation of the same follower 505.

Rollers 497 and 488 are positioned on both sides of shared arcuate path body 483 in sufficient quantities and in their respective paths 488, 490, and 495 to cause shared follower 479 to move smoothly along said paths. Partial follower 479 has one side removed to allow a view of the rollers paths and function.

Figure 18D:
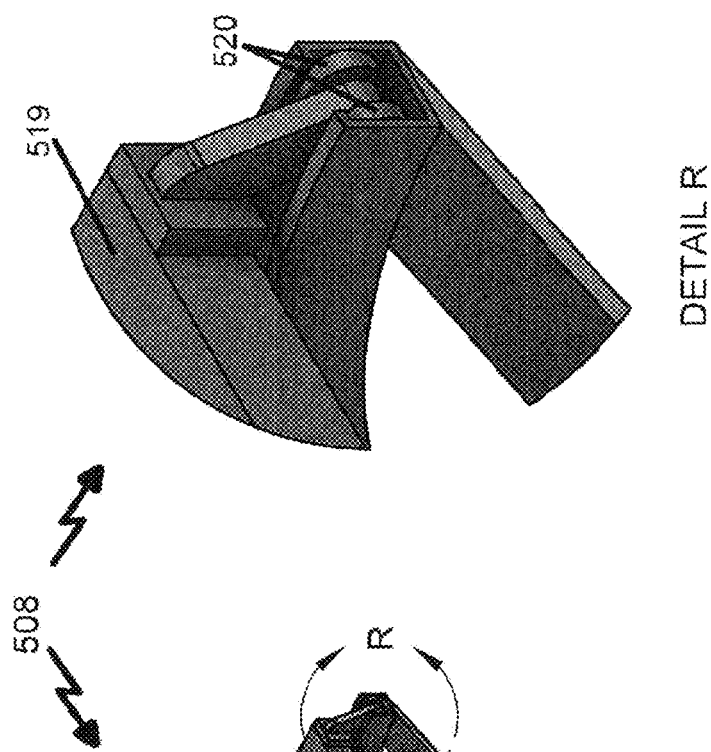
FIGS. 18C-D show more detail of FIG. 18A, with a platform.
Figure 18C:
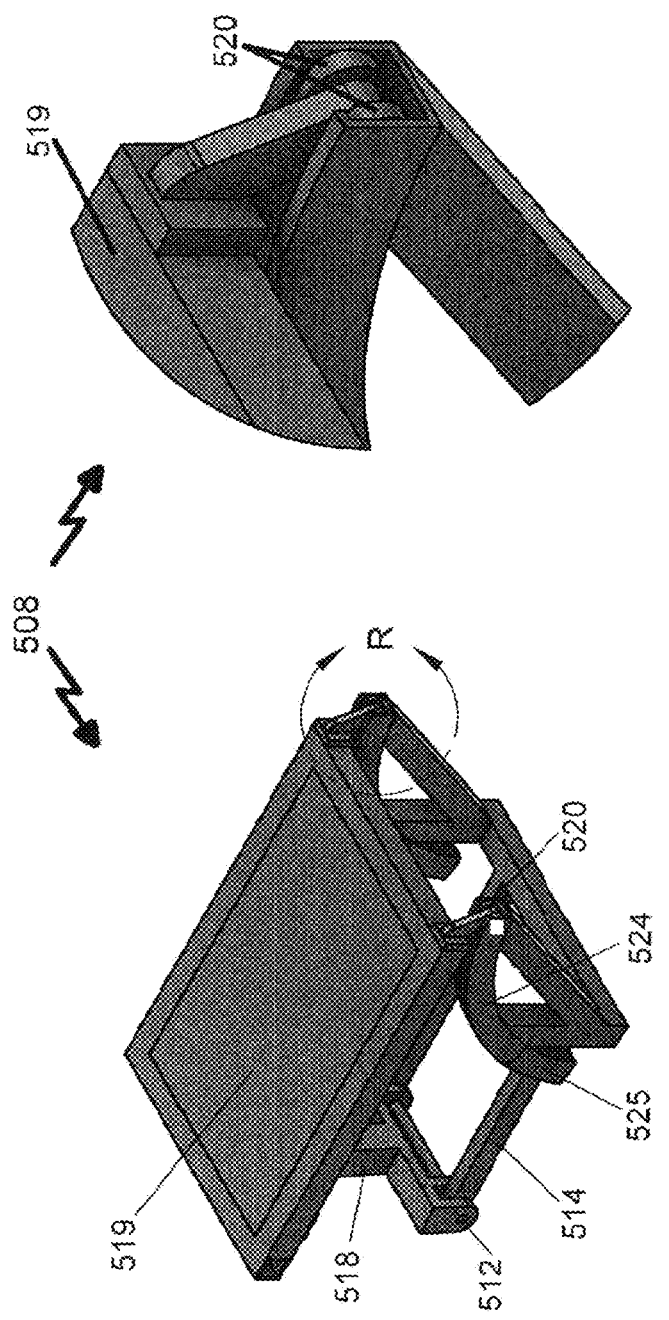

FIGS. 18A and 18B collectively illustrate a U-channel dynamic triangular movement lift system generally denoted by numeral 509. A base pivot 512 is pivotally connected to a base 514. Connector pivot 516 is connected to a support link 518 at one and, while base pivot 512 is attached to an arcuate path C-channel at the other by arcuate path C-channel extension 525. Connector pivot 516 is connected to support link 518, which in turn, is pivotally connected to support surface 522. Support surface 522 acts as a follower link in this aspect. FIG. 18C includes a platform 519 mounted on top of the mechanism of FIGS. 18A and 18B. As generally denoted by the numeral 508, FIGS. 18C and 18D show the interrelationship between these components. FIG. 18D illustrates the relative placement of follower pivot 520 in greater detail.

FIGS. 19A and 19B illustrate another aspect of the present invention utilizing a loading ramp 529 for moving materials. Following like element numbers, this lifting system generally denoted by numeral 510 includes a platform 519 attached to the "easy" loading ramp 529. Base 514 is permanently affixed to arcuate path U-channels 526 that guide follower pivots 520 from an initial position on the "easy" ramp U-channel extension 528 across extension path 527 of the follower pivot to its final position 526. This aspect is especially useful for lifting and positioning items to be loaded onto the loading ramp 529.

FIG. 20A illustrates a straddle seat positioning system generally denoted by the numeral 532. Handlebars 533 are attached to all-terrain vehicle frame 551 on top of wheels 549. Follower pivot 534 is attached to follower 536, which is fixedly attached to latch pulling device 546 which can be positioned along arcuate path 538 to position seat support 553.

FIGS. 20B and 20C are detail illustrations of the arcuate path 538 which includes latch holes 544. Follower pivot 534 is attached to follower 536 having latch pulling device 546 incorporated therein. Rails 540 provide stability for arcuate path 538. Follower 536 includes a housing for follower pivot 534 and is secured in place by latch pulling device 546 once it is lodged inside latch holes 544. Slide bearing 548 may be a roller bearing, a bushing, or any other type of suitable bearing that will cause follower 536 to remain tangentially oriented on arcuate path 538. The top surface of follower 536 can be a surface that supports anything needing re-orientation, such as for an airplane wing or other surface re-orientation.

With combined reference to FIGS. 20D-20F with like element numbers, and looking first to FIG. 20D, there is shown yet another means for following arcuate path 538 on rails 540. Latch holes 544 receive latch pins. Follower side plate 537 secures first roller pivots 557 and second roller pivots 558. Follower pivot 534 is secured by follower pivot offset extension 539. Although in this FIG. 20D, follower pivot 534 is not shown attached to anything, note that we look back to FIG. 20A for locational reference.

FIG. 20E illustrates yet another aspect of the invention shown in FIGS. 20A-20D, but now includes a first roller 547 for rolling on arcuate path 538. As discussed above, any suitable type of roller mechanism may be useful. In FIG. 20E, a second roller 550 merely illustrates yet another suitable roller mechanism. FIG. 20F is another view of the device of FIG. 20E, but shown in a perspective for clarity.

FIG. 21A is a top plan view of a round rail arcuate path aspect of the present invention, generally denoted by numeral 577. Follower pivot housing 583 is fixedly connected to follower 578 and rail 588 guides follower pivot 582. The shape and configuration of rail 588 acts as an arcuate path terminated at both ends by bumpers 586. A mount 590 can be used for attachment in appropriate conditions. FIG. 21C is a detail of the follower 578 of FIG. 21A, while FIG. 21D is a cross section taken along lines U-U of FIG. 21C. FIG. 21D shows a cross-section of follower 584 which has embedded therein a slide bearing 592. In phantom, follower pivot housing 583 and follower pivot 582 are shown.

FIG. 21E is a cross-section taken along lines U-U of FIG. 21C with an alternative method of movement, including rollers 594 within a seal 598. Follower 584 houses different roller configurations, including different bearings or any suitable means for smooth movement along. FIG. 21F is also a cross-section taken along lines U-U of FIG. 21C including rollers in a curved row 596 within follower 584. Any suitable means for controlling smooth movement along an arcuate path is envisioned by the present inventor and is incorporated into this patent application.

FIG. 22A details an arcuate path within a guide using rollers to control the movement and provide stability. Arcuate path is generally denoted by numeral 560 and includes a follower pivot 562 incorporated into follower 564. Follower pivot 562 will be connected to another part, not shown in this FIG. Mounting and assembly holes 566 are recessed into outer plate 568, while inner plate 570 is sandwiched between outer plates 568 to secure follower 564.

FIG. 22B shows the inner workings of FIG. 22A, including rollers 574 in the lower portion of follower 564. Rollers 574 are received by rollers path 572 to provide guidance through the arcuate path defined by the outer plates 568 and inner plate 570. Upper surface 576 of inner plate 570 provides additional support for the bottom portion of follower 564. FIG. 22C is a side elevational of FIG. 22A. FIG. 22D is a cross-section taken along lines U-U of FIG. 22C, and shows the relative placement of follower pivot 562, follower 564, outer plates 568, inner plate 570, upper surface 576 of inner plate 577, rollers 574 and rollers path 572.

FIG. 23A shows a trapped roller path follower, with a center follower pivot generally denoted by numeral 600. In this aspect of the present invention, an arcuate path is followed by trapped rollers or slides. Any suitable method for guiding follower 608 through a track such as the one shown in FIGS. 23A-23G is to be incorporated into this invention.

With combined reference to FIGS. 23A-23G, in which like numbers are used for like elements, and although each FIG. illustrates a different aspect, the functionality is similar with specific differences. Each assembly is slightly different from each other because the follower is located in a different place. For example, assembly 600 of FIG. 23A has its follower pivot 613 directly between rollers 624. Follower pivot 613 and rollers 624 follow its arcuate path. Assembly 602 of FIG. 23E has its follower pivot 613 still on the arcuate path but offset to one end. Assembly 604 of FIG. 23F is still another aspect, but its follower pivot 613 is adjusted outward from the center of the arcuate path of rollers 624 to increase the radius. Assembly 606 of FIG. 23G decreases the radius of the follower pivot arcuate path.

With combined reference to FIGS. 23A and 23D, which includes assembly 600, in which follower pivot adjustment plate 608 is adapted to position follower pivot 613 between the pair of roller axes 615. Front and back arcuate path plates, 627 and 626 respectively, secure and trap rollers 624 of FIG. 23D, and cause them to follow arcuate path 616, which has a roller path axial load surface thereon. Mount holes 628 provide a secure place for mounting the assembly.

Referring to FIGS. 23B and 23D in combination now, FIG. 23B is a cross-section taken along lines W-W of FIG. 23A, and FIG. 23D is a perspective detail view of FIG. 23C, but without front follower plate 627 or follower pivot adjustment plate 608, in order to show the relative placement of its internal components. Follower roller 624 has a pair of axial load surfaces 619 and a pair of side load surfaces 617. Front and rear arcuate path plates, 627 and 626, respectively, are positioned to follow arcuate path 616. FIG. 23B shows a needle bearing 625 and roller bearing 623.

Referring again to FIGS. 23E through 23G, various aspects of radial adjustment possibilities are envisioned. Any obvious variant from the disclosed aspects are also within the scope and breadth of this invention.

In summary, numerous benefits have been described which result from employing any or all of the concepts and the features of the various specific aspects of the present invention, or those that are within the scope of the invention.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated. It is intended that the scope of the invention be defined by the claims which are appended hereto.

What is claimed is:

1. A position control system, comprising:
a dynamic triangular mechanism for movement from a first position to at least a second position,
said dynamic triangular mechanism including at least three (3) link members interconnected by pivots;
said at least three (3) link members of the dynamic triangular mechanism interconnected by three (3) pivots, comprising
a first base link member defining a non-linear path, said first base link member having a fixed base pivot and a follower pivot that moves along the non-linear path;
a second fixed length support link member pivotally connected to the fixed base pivot;
a third follower link member pivotally connected to, and located between, the follower pivot and a connector pivot;
wherein the follower link member is adapted for following the non-linear path, thereby creating a virtual triangle defined by the three link members while the follower pivot, fixed base pivot and the connector pivot interconnect the first base link member, the second fixed length support link member and the third follower link member.

2. The position control system of claim 1, wherein the first base link member is adapted for moving from a first position to a second position along the non-linear path while the second fixed length support link member remains pivotally connected to the fixed base pivot.

3. The position control system of claim 1, wherein the non-linear path is an arcuate path.

4. The position control system of claim 1, wherein the non-linear path includes a path defined by a rail, track, slotted opening, route, way, course, or any other designated path of movement to be followed.

5. The position control system of claim 1, wherein the second fixed length support link member has a constrained dimension.

6. The position control system of claim 1, wherein the third follower link member has a constrained dimension.

7. A position changing system, comprising:
at least 3 pivots;
at least 2 linking members interconnected by the at least three pivots and having constrained dimensions;
a follower;
a third linking member being a track defining a substantially circular arcuate path;
one of said at least two linking members being a base;
one of the other two linking members being a support link; and
where the track and two links are connected by the at least 3 pivot points and the follower follows the substantially circular arcuate path;
said position changing system being capable of substantially parallelogram like movement without 4 linking members.

8. The position changing system of claim 7, wherein the position changing system that is adapted for exhibiting substantially quadrilateral-like movement is a dynamic triangular movement device.

9. The position changing system of claim 1, wherein the position changing system comprises a seat suspension system for changing positions of a seat.

10. The position changing system of claim 1, wherein the base of the position changing system comprises a fixed base.

11. The position changing system of claim 1, wherein the arcuate path/track is non-circular.

12. The position changing system of claim 1, wherein the position changing system comprises a roller bearing.

13. The position changing system of claim 1, wherein the position changing system comprises a slide bearing.

14. The position changing system of claim 1, wherein the rail is a track/ball bearing/worm screw.

15. The position changing system of claim 1, wherein the position changing system further comprises an offset follower.

16. The position changing system of claim 1, wherein at least one of the linking mechanisms is adapted for radial adjustment.

* * * * *